US012448001B2

(12) United States Patent
Bagnell et al.

(10) Patent No.: US 12,448,001 B2
(45) Date of Patent: Oct. 21, 2025

(54) AUTONOMOUS VEHICLE MOTION PLANNING

(71) Applicant: Aurora Operations, Inc., Pittsburgh, PA (US)

(72) Inventors: J. Andrew Bagnell, Pittsburgh, PA (US); Michael William Bode, Pittsburgh, PA (US); Micol Marchetti-Bowick, Pittsburgh, PA (US); Sanjiban Choudry, Ithaca, NY (US); Pengju Jin, San Francisco, CA (US); Sumit Kumar, Sunnyvale, CA (US); Yuhang Ma, Pittsburgh, PA (US); Venkatraman Narayanan, Mountain View, CA (US); Arun Venkatraman, Mountain View, CA (US); Carl Wellington, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/903,361

(22) Filed: Oct. 1, 2024

(65) Prior Publication Data

US 2025/0214618 A1 Jul. 3, 2025

Related U.S. Application Data

(60) Provisional application No. 63/616,284, filed on Dec. 29, 2023.

(51) Int. Cl.
*B60W 60/00* (2020.01)
*B60W 50/00* (2006.01)
*G05B 13/02* (2006.01)

(52) U.S. Cl.
CPC .... *B60W 60/0011* (2020.02); *B60W 50/0097* (2013.01); *B60W 60/00272* (2020.02); *G05B 13/027* (2013.01); *B60W 2554/4045* (2020.02)

(58) Field of Classification Search
CPC ......... B60W 60/0011; B60W 50/0097; B60W 60/00272; B60W 2554/4045; G05B 13/027
See application file for complete search history.

(56) References Cited

U.S. PATENT DOCUMENTS 10,310,087 B2 6/2019 Laddha et al.
10,809,361 B2 10/2020 Vallespi-Gonzalez et al.
(Continued)

FOREIGN PATENT DOCUMENTS

CN 114154545 A 3/2022
EP 4095812 A1 11/2022

OTHER PUBLICATIONS

Ballan et al., "Knowledge Transfer for Scene-Specific Motion Prediction", European Conference on Computer Vision, 2016, pp. 697-713.

(Continued)

*Primary Examiner* — Khoi H Tran
*Assistant Examiner* — Tien Minh Le
(74) *Attorney, Agent, or Firm* — Dority & Manning, P.A.

(57) ABSTRACT

The present disclosure provides an example method that includes: (a) obtaining context data descriptive of an environment surrounding an autonomous vehicle, the context data based on map data and perception data; (b) generating, by a proposer and based on the context data: (i) a plurality of candidate trajectories, and (ii) a plurality of actor forecasts for a plurality of actors in the environment; (c) generating, by a ranker and based on the context data, the plurality of candidate trajectories, and the plurality of actor forecasts, a ranking of the plurality of candidate trajectories; and (d) controlling a motion of the autonomous vehicle based on a candidate trajectory selected based on the ranking of the plurality of candidate trajectories, wherein the proposer comprises a first machine-learned model and the (Continued)

ranker comprises a second machine-learned model, and wherein the first machine-learned model and the second machine-learned model use a common backbone architecture.

20 Claims, 30 Drawing Sheets

(56) References Cited

U.S. PATENT DOCUMENTS

| | | | |
|---|---|---|---|
| 11,370,423 | B2 | 6/2022 | Casas et al. |
| 11,577,722 | B1 | 2/2023 | Packer et al. |
| 11,801,871 | B1 | 10/2023 | Choudhury et al. |
| 12,065,140 | B1* | 8/2024 | Pronovost ............. B60W 40/04 |
| 2016/0189035 | A1 | 6/2016 | Shakeri et al. |
| 2018/0373247 | A1 | 12/2018 | Wang et al. |
| 2019/0025841 | A1 | 1/2019 | Haynes et al. |
| 2019/0302767 | A1 | 10/2019 | Sapp et al. |
| 2019/0382007 | A1 | 12/2019 | Casas et al. |
| 2020/0089238 | A1 | 3/2020 | McGill et al. |
| 2020/0209860 | A1 | 7/2020 | Zhang |
| 2020/0249674 | A1* | 8/2020 | Dally .................... G05D 1/0221 |
| 2020/0298891 | A1 | 9/2020 | Liang et al. |
| 2021/0139026 | A1 | 5/2021 | Phan et al. |
| 2022/0017122 | A1 | 1/2022 | Malla et al. |
| 2022/0169278 | A1 | 6/2022 | Refaat et al. |
| 2022/0266822 | A1 | 8/2022 | Nardi et al. |
| 2022/0274625 | A1* | 9/2022 | Garimella ................ G06N 3/04 |
| 2022/0300764 | A1* | 9/2022 | Liu ...................... G06F 18/2148 |
| 2022/0355825 | A1* | 11/2022 | Deo .................. B60W 50/0097 |
| 2023/0169852 | A1* | 6/2023 | Janjos ...................... G06N 3/09 706/25 |
| 2023/0347934 | A1 | 11/2023 | Kim |
| 2023/0360379 | A1* | 11/2023 | Zhou ........................ G06T 7/248 |
| 2023/0367318 | A1 | 11/2023 | Zeng et al. |
| 2023/0415772 | A1* | 12/2023 | Wolff ................. B60W 60/0011 |
| 2024/0378799 | A1* | 11/2024 | Li ......................... G06T 15/205 |

OTHER PUBLICATIONS

Chen et al., "Multi-View 3D Object Detection Network for Autonomous Driving", 2017 IEEE Conference on Computer Vision and Pattern Recognition, 2017, p. 3.
Dai et al., "R-FCN: Object Detection Via Region-Based Fully Convolutional Networks", Advances in Neutral Information Processing Systems, 2016, pp. 379-387.
Engelcke et al., "Vote3Deep: Fast Object Detection In 3D Point Clouds Using Efficient Convolutional Neural Networks", 2017 IEEE International Conference on Robotics and Automation (IRCA), 2017, pp. 1355-1361.
Fathi et al., "Learning to Recognize Daily Actions Using Gaze", European Conference on Computer Vision, 2012, pp. 314-327.
Geiger et al., "Vision Meets Robotics: The KITTI Dataset", The International Journal of Robotics Research, 2013, pp. 1231-1237.
Girshick et al., "Rich Feature Hierarchies for Accurate Object Detection and Semantic Segmentation", Proceedings of the IEEE Conference on Computer Vision and Pattern Recognition, 2014, pp. 580-587.
He et al., "Deep Residual Learning for Image Recognition", Proceedings of the IEEE Conference on Computer Vision and Pattern Recognition, 2016, pp. 770-778.
Hoermann et al., "Dynamic Occupancy Grid Prediction for Urban Autonomous Driving: A Deep Learning Approach with Fully Automatic Labeling", 2018 IEEE International Conference on Robotics and Automation (IRCA), 2017, pp. 2056-2063.
Howard et al., "MobileNets: Efficient Convolutional Neural Networks for Mobile Vision Applications", arXiv preprint arXiv: 1704.04861, 2017.
Hu et al., "Probabilistic Prediction of Vehicle Semantic Intention and Motion", 2018 IEEE Intelligent Vehicles Symposium (IV), 2018, pp. 307-313.

Iandola et al., "SqueezeNet: AlexNet-level Accuracy With 50x Fewer Parameters And <0.5 Mb Model Size", arXiv preprint arXiv: 1602.07360, 2017.
Jain et al., "Car That Knows Before You Do: Anticipating Maneuvers Via Learning Temporal Driving Models", Proceedings of the IEEE International Conference on Computer Vision, 2015, pp. 3182-3190.
Kim et al., "Prediction of Drivers Intention of Lane Change By Augmenting Sensor Information Using Machine Learning Techniques", Sensors, 2017.
Kingma et al., "Adam: A Method for Stochastic Optimization", Machine Learning, 2014.
Lee et al., "Desire: Distant Future Prediction in Dynamic Scenes with Interacting Agents", 2017 IEEE Conference on Computer Vision and Pattern Recognition (CVPR), 2017, pp. 2165-2174.
Lewis et al., "Sensor Fusion Weighting Measures in Audio-Visual Speech Recognition", Proceedings of the $27^{th}$ Australasian Conference on Computer Science, 2004, pp. 305-304.
Li et al., "Vehicle Detection From 3D Lidar Using Fully Convolutional Network", arXiv prepring arXiv: 1608.07916, 2016.
Lin et al., "Focal Loss for Dense Object Detection", 2017 IEEE International Conference on Computer Vision (ICCV), 2017, pp. 2999-3007.
Liu et al., "SSD: Single Shot Multibox Detector", European Conference on Computer Vision, 2016, pp. 21-37.
Luo et al., "Fast and Furious: Real Time End-To-End 3d Detection, Tracking and Motion Forecasting with A Single Convolutional Net", The IEEE Conference on Computer Vision and Pattern Recognition (CVPR), 2018, pp. 3569-3577.
Luo et al., "Understanding The Effective Receptive Field In Deep Convolutional Neural Networks", Advances in Neural Information Processing Systems, 2016, pp. 4898-4906.
Ma et al., "Forecasting Interactive Dynamics of Pedestrians with Fictitious Play", 2017 IEEE Conference on Computer Vision and Pattern Recognition (CVPR), 2017, pp. 4643-4644.
Park et al., "Egocentric Future Localization", Proceedings of the IEEE Conference on Computer Vision and Pattern Recognition, 2016, pp. 4697-4705.
Phillips et al., "Generalizable Intention Prediction of Human Drivers At Intersections", Intelligent Vehicles Symposium (IV), 2017, pp. 1665-1670.
Qi et al., "Pointnet: Deep learning on point sets for 3d classification and segmentation", Proceedings of the IEEE Conference on Computer Vision and Pattern Recognition, 2017, pp. 652-660.
Redmon et al., "You Only Look Once: Unified, Real-Time Object Detection", Proceedings of the IEE Conference on Computer Vision and Pattern Recognition, 2016, pp. 779-788.
Ren et al., "Faster R-CNN: Towards Real-Time Object Detection with Region Proposal Networks", Advances in Neural Information Processing Systems, 2015, pp. 91-99.
Simon et al., "Complex-YOLO: Real-Time 3D Object Detection on Point Clouds", European Conference on Computer Vision, 2018, pp. 197-209.
Snoek et al., "Early Versus Late Fusion in Semantic Video Analysis", Proceedings of the $13^{th}$ Annual ACM International Conference on Multimedia, 2005, pp. 399-402.
Streubel et al., "Prediction of Driver Intended Path At Intersections", Intelligent Vehicles Symposium (IV), 2014, pp. 134-139.
Sutton et al., "Reinforcement Learning: An Introduction", MIT Press, 1998, 179 pages.
Tran et al., "Learning Spatiotemporal Features With 3D Convolutional Networks", 2015 IEEE International Conference on Computer Vision (ICCV), 2015, pp. 4489-4497.
Yang et al., "Pixor: Real-Time 3D Object Detection from Point Clouds", The IEEE Conference on Computer Vision and Pattern Recognition (CVPR), 2018, pp. 7652-7660.
Zhang et al., "Sensor Fusion for Semantic Segmentation Of Urban Scenes", 2015 IEEE International Conference on Robotics and Automation (ICRA), 2015, pp. 1850-1857.
International Search Report and Written Opinion for Application PCT/US2024/057618, mailed Mar. 19, 2025, 13 pages.

* cited by examiner

AUTONOMOUS VEHICLE MOTION PLANNING

PRIORITY

This application claims the benefit of and priority to U.S. Provisional Patent Application No. 63/616,284, filed Dec. 29, 2023. U.S. Provisional Patent Application No. 63/616,284 is hereby incorporated by reference herein in its entirety.

BACKGROUND

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Example implementations of the present disclosure relate to autonomous vehicle motion planning. Example aspects provide a multistage machine-learned model architecture for autonomous vehicle motion planning. A first stage can process full scene context and generate candidate trajectories with high recall. A high-recall configuration can increase a likelihood that the output set of candidate trajectories includes a good trajectory for moving through the current environment. A second stage can rank the candidate trajectories with high precision in view of the full scene context. The trajectory ranker can operate at high precision by ranking candidate trajectories that closely represent the actual movements to be executed by the autonomous vehicle to traverse the trajectories. Because the input trajectories can more precisely represent the autonomous vehicle's actual movements, evaluations of the candidate trajectories by the ranker can more precisely correspond to evaluations of actual execution of the candidate trajectories. Furthermore, a trajectory ranker configured to reason over the full scene context data can leverage the full context to improve the quality of the ranking, thereby increasing a likelihood of selecting a true positive optimal trajectory from among the set of candidates.

The first stage can contain a machine-learned model configured to process context data (e.g., map data, perception data) and generate estimations regarding actions that objects or actors in the scene are likely to take. The first stage can evaluate, using the model, one or more decisions that the autonomous vehicle can implement to navigate the environment based on the generated estimations. For instance, the decisions can include high-level decisions regarding whether to yield or not yield to an actor, whether to change lanes, etc. The first stage can "pin" high confidence decisions to the high confidence value and allow lower confidence decisions to branch over multiple candidate decision values downstream for further evaluation. This pinning can help prioritize computing resources for the decisions that most warrant further evaluation.

The first stage can interface with the second stage by passing the generated trajectories and the high-level decisions to the second stage. The generated trajectories can be evaluated in view of the high-level decisions. For example, a trajectory that changes lanes across crosses multiple lanes of traffic can be evaluated as less preferred in view of a decision to move into an adjacent lane. The decisions can correspond to different surfaces of an evaluation function (e.g., local basins of a costing function). Different values for a given decision can provide for different sets of constraints that are to be satisfied, and different costing functions can be configured to encourage satisfaction of those different constraints. For instance, for a given trajectory that would place the ego vehicle in front of an actor, a costing function associated with a decision to yield to the actor can evaluate the trajectory at a high cost (as it is inconsistent with the decision value), whereas a costing function associated with a decision to not yield can evaluate the trajectory at a lower cost.

The first stage can help guide evaluation of the trajectories by outputting the trajectories in a lane-associated trajectory set. The lane-associated trajectory set can include a listing of the generated trajectories along with lane indicators that point to lanes in the roadway that are associated with the generated trajectories. In this manner, for instance, knowledge of the associated lanes can guide selection of appropriate evaluation functions to apply to the generated trajectories (e.g., omission of irrelevant costing functions), which can help prioritize computing resources for the functions that most affect the evaluation of the trajectory.

The second stage can process the candidate trajectories in view of the context data to determine a ranking of the candidates for selecting a preferred trajectory. The second stage can include a second machine-learned model configured to process the context data and generate data that evaluates an interaction between the trajectory and the environment (e.g., cost data). The second machine-learned model can explicitly or implicitly generate values describing one or more forecasts for objects or actors in the environment. The second machine-learned model can share one or more attributes with the machine-learned model in the first stage. For instance, the first stage and the second stage can leverage a common backbone architecture used for processing and understanding the context data. In this manner, for instance, development of the backbone architecture to improve world state understanding can be similarly leveraged at both stages in the motion planner. In some cases, the first stage and the second stage can use different output heads or decoders built on the backbone architecture.

Example multistage motion planning architectures according to the present disclosure can provide higher quality outputs at lower latency than some traditional motion planning architectures. For instance, some prior approaches narrow down a pool of candidate trajectories by selecting one or a few preferred candidates from the pool for further optimization. Such an approach generally requires early commitment to a small set of preferred candidates without yet knowing what those candidates will look like once optimized. Further, when performing final evaluation and selection of the optimized candidates, complete information is limited to the narrow pool of optimized candidates. This results in imperfect information at each stage: the initial pruning of the candidate trajectories is performed without knowledge of how those trajectories will actually be implemented by the vehicle, and the final evaluation and selection is performed without knowledge of what other trajectories—had they been optimized—might have evaluated favorably against the limited pool of optimized candidates.

To mitigate the limitations of such prior approaches, some prior techniques have simply optimized larger and larger numbers of preferred candidates to improve recall of the optimal trajectories. But optimizing trajectories (e.g., with iterative optimizers, such as with an Iterative Linear Quadratic Regulator, or "iLQR") can be very expensive computationally. Such prior approaches can thus suffer from high energy usage (e.g., to power the motion planning compute resources), high latency, or both.

Advantageously, example implementations of the present disclosure can offer lower latency by effectively deconstructing and front-loading the trajectory optimization task. For instance, in lieu of generating, in series, sequentially optimized iterations of a few trajectories of interest by incrementing values of trajectory parameters, example implementations of the present disclosure can generate a batch of trajectories with parameter values across the range of the trajectory parameters. Generated with sufficient recall, the batch of trajectories can effectively contain the same output trajectory as would be obtained from the computationally expensive sequential optimization. However, the batch generation can be highly parallelizable, since each trajectory in the batch need not be conditioned on any prior trajectory. Scoring and ranking the batch of trajectories—which can also be highly parallelizable—can identify the values for the trajectory parameters associated with the preferred trajectory. The efficient evaluation techniques of example implementations of the present disclosure can facilitate rapid identification of a preferred candidate trajectory from among the generated set of candidates.

Similarly, example implementations of the present disclosure can also offer higher quality by allowing each stage of the planning process to access more information. For instance, because the motion planning architecture need not substantially transform the candidate trajectories in downstream optimization, the output set of candidate trajectories can be evaluated with much greater correlation to an evaluation of the actual executed motions of the autonomous vehicle. In this manner, for instance, the trajectory ranker can better evaluate and select trajectories for execution. Further, because the trajectory generator is configured to operate with high recall, the trajectory ranker can be exposed to a wide range of possible maneuvers without unduly limiting the scope of action with premature commitment to a small set of candidates. Further, example implementations provide equal access to scene context at both the generation and ranking stages, and in some examples both stages can leverage shared backbone architecture to process the scene context. In this manner, for instance, each stage can leverage full scene awareness in performing the tasks of each stage.

In this manner, for example, example implementations of the present disclosure can improve the operation of autonomous vehicles and advance the field of autonomous navigation as a whole. Example implementations of the present disclosure can decrease energy expenditure of motion planners and enable motion planning to be performed on smaller, lighter, more energy-efficient devices, thereby improving access to and operation of such equipment. In this manner, for instance, example implementations of the present disclosure can accelerate the adoption of autonomous vehicles, thereby facilitating improved traffic flow, decreasing opportunity for human driver error, increasing energy-efficient driving behavior, etc. across greater numbers of vehicles, thereby achieving not only individual performance gains but also significant population-wide improvement.

For example, in an aspect, the present disclosure provides a first example method. The first example method includes (a) obtaining context data descriptive of an environment surrounding an autonomous vehicle, the context data based on map data and perception data. The first example method includes (b) generating, by a proposer and based on the context data: (i) a plurality of candidate trajectories, and (ii) a plurality of actor forecasts for a plurality of actors in the environment. The first example method includes (c) generating, by a ranker and based on the context data, the plurality of candidate trajectories, and the plurality of actor forecasts, a ranking of the plurality of candidate trajectories. The first example method includes (d) controlling a motion of the autonomous vehicle based on a candidate trajectory selected based on the ranking of the plurality of candidate trajectories. In the first example method, the proposer includes a first machine-learned model and the ranker includes a second machine-learned model, and wherein the first machine-learned model and the second machine-learned model use a common backbone architecture.

In some implementations of the first example method, (i) includes generating a basis trajectory based on the context data; and sampling a plurality of values for one or more parameters of the basis trajectory to generate the plurality of candidate trajectories.

In some implementations of the first example method, the plurality of values are sampled based on at least one of the perception data or state data of the autonomous vehicle.

In some implementations of the first example method, (i) is at least partially performed in parallel with (ii).

In some implementations of the first example method, the common backbone architecture includes a graph neural network architecture.

In some implementations of the first example method, the environment includes a roadway with one or more lanes; and the graph neural network architecture includes an actor node associated with an actor of the plurality of actors and one or more goal nodes associated with one or more goal locations of the actor in the one or more lanes.

In some implementations of the first example method, (c) includes generating the ranking of the plurality of candidate trajectories by processing a latent output of the common backbone architecture using the second machine-learned model.

In some implementations of the first example method, the common backbone architecture used by the first machine-learned model and the common backbone architecture used by the second machine-learned model share a same set of parameters.

In some implementations of the first example method, the first machine-learned model includes a first decoder that processes outputs of the common backbone architecture; and the second machine-learned model includes a second decoder that processes outputs of the common backbone architecture and the plurality of candidate trajectories.

In some implementations of the first example method, (b) includes processing the context data to determine one or more probabilities of an actor in the environment performing one or more actor actions; and sampling the plurality of candidate trajectories based on the determined probabilities.

In some implementations, the first example method includes controlling the motion of the autonomous vehicle by executing one or more control parameters of the selected candidate trajectory proposed in (b).

In some implementations, the first example method includes determining, based on the context data, whether to apply an iterative optimization routine to at least one parameter of the selected candidate trajectory.

In some implementations of the first example method, the iterative optimization routine optimizes a steering control profile of the candidate trajectory.

In some implementations of the first example method, (c) includes: for a respective candidate trajectory of the plurality of candidate trajectories: processing the context data to generate a forecasted action for the actor based on the autonomous vehicle executing the respective candidate trajectory; and determining a cost associated with the respective candidate trajectory based on the forecasted action.

In some implementations of the first example method, the forecasted action includes a motion along a path over time.

In some implementations of the first example method, (c) includes processing, using the common backbone architecture, the plurality of candidate trajectories, wherein the ranker generates forecasts for the one or more actors in the environment that are conditioned on the plurality of candidate trajectories.

In some implementations of the first example method, the perception data includes object tracking data.

In some implementations of the first example method, (ii) includes at least one of: determining an actor goal; determining an interaction between an actor and another portion of the environment; or determining an actor trajectory.

In an aspect, the present disclosure provides a second example method. The second example method includes (a) obtaining context data descriptive of an environment surrounding an autonomous vehicle, wherein the context data is based on map data and perception data. The second example method includes (b) generating, using a first machine-learned model component, and based on the context data, a plurality of strategies for controlling the autonomous vehicle. In the second example method, a respective strategy includes a pinned decision value that is shared across the plurality of strategies based on a score associated with the pinned decision value. The second example method includes (c) generating, based on the context data, a plurality of candidate trajectories for controlling the autonomous vehicle. The second example method includes (d) ranking the plurality of candidate trajectories by generating costs for the plurality of candidate trajectories, wherein different strategies of the plurality of strategies are used to generate different cost values for the ranking. The second example method includes (e) controlling a motion of the autonomous vehicle based on a candidate trajectory selected based on the ranked plurality of candidate trajectories.

In some implementations of the second example method, the score corresponds to a confidence.

In some implementations of the second example method, the plurality of strategies each include a plurality of decision values for a respective plurality of decisions. In some implementations of the second example method, for a pinned decision of the plurality of decisions, each strategy includes the pinned decision value. In some implementations of the second example method, for a branched decision of the plurality of decisions, the plurality of strategies include a plurality of different candidate decision values.

In some implementations, the second example method includes branching the branched decision across the plurality of different candidate decision values based on scores respectively associated with the plurality of different candidate decision values.

In some implementations, the second example method includes pinning the pinned decision to the pinned decision value based on the score associated with the pinned decision value indicating a confidence that satisfies a threshold. In some implementations, the second example method includes branching the branched decision across the plurality of different candidate decision values based on scores respectively associated with the plurality of different candidate decision values indicating confidence that does not satisfy the threshold.

In some implementations of the second example method, the threshold is satisfied based on a difference between scores for candidate decision values for a given decision.

In some implementations of the second example method, the threshold is satisfied based on a magnitude of a score.

In some implementations, the second example method includes generating the score by processing the context data using the first machine-learned model component.

In some implementations of the second example method, different strategies of the plurality of strategies correspond to different cost surfaces of one or more cost functions used to rank the plurality of candidate trajectories.

In some implementations of the second example method, (d) includes determining, for at least one candidate trajectory, different cost values based on the different strategies.

In some implementations of the second example method, (d) includes determining, based on the plurality of candidate trajectories, a plurality of different forecasts for an object in the environment.

In some implementations of the second example method, (c) includes sampling the plurality of candidate trajectories independently of the plurality of strategies.

In some implementations of the second example method, (d) includes forecasting, using a second machine-learned model component, a plurality of candidate object states for one or more objects in the environment, wherein the plurality of candidate object states respectively correspond to the plurality of candidate trajectories.

In some implementations of the second example method, the second machine-learned model component and the first machine-learned model component use a shared backbone architecture to process the context data.

In some implementations of the second example method, the shared backbone architecture includes a graph neural network architecture including nodes that correspond to positions in lanes of a roadway in the environment.

In some implementations of the second example method, (e) includes executing parameter values that were generated in (c) for the candidate trajectory.

In some implementations of the second example method, one or more of the parameter values were not optimized after generation in (c).

In some implementations of the second example method, none of the parameter values were optimized after generation in (c).

In an aspect, the present disclosure provides a third example method. The third example method includes (a) obtaining context data descriptive of an environment containing a roadway and surrounding an autonomous vehicle, the context data based on map data and perception data. The third example method includes (b) generating, using a proposer that processes the context data, a lane-associated trajectory set that includes a plurality of candidate trajectories that are respectively associated with a plurality of lane indicators corresponding to lanes in the roadway. The third example method includes (c) ranking, using a ranker that processes the lane-associated trajectory set and the context data, the plurality of candidate trajectories, wherein the ranker is structured based on spatial associations between lane positions in the roadway. The third example method includes (d) controlling a motion of the autonomous vehicle based on a candidate trajectory selected based on the ranked plurality of candidate trajectories.

In some implementations of the third example method, (c) includes costing the plurality of candidate trajectories using one or more cost functions selected based on the corresponding plurality of lane indicators.

In some implementations of the third example method, costing the plurality of candidate trajectories using the one or more cost functions selected based on the corresponding plurality of lane indicators includes: determining at least one lane indicated by a lane indicator for a respective candidate trajectory; and determining to not apply a cost function to the respective candidate trajectory based on the cost function not being associated with the at least one lane.

In some implementations of the third example method, the lane-associated trajectory set includes a first list indexed with a second list. In some implementations of the third example method, the first list includes the plurality of candidate trajectories. In some implementations of the third example method, the second list includes the plurality of lane indicators.

In some implementations of the third example method, a respective entry in the first list includes one or more trajectory parameter values mapped over time.

In some implementations of the third example method, the one or more trajectory parameter values include at least one control parameter value.

In some implementations of the third example method, values for the one or more trajectory parameter values are indexed over a plurality of discrete time values.

In some implementations of the third example method, a respective lane indicator points to a lane of the roadway into which a corresponding candidate trajectory travels.

In some implementations of the third example method, the respective lane indicator corresponds to a lane node on a lane graph obtained from the map data.

In some implementations of the third example method, a neural network architecture used by the ranker includes a graph neural network that includes a network node that corresponds to a goal position in a respective lane.

In some implementations of the third example method, the graph neural network includes a plurality of network nodes that respectively correspond to a plurality of lane positions in the roadway.

In some implementations, the third example method includes generating the lane-associated trajectory set by: probabilistically sampling a first plurality of candidate trajectories based on the processed context data; and deterministically selecting a second plurality of candidate trajectories, wherein the second plurality of candidate trajectories respectively describe a plurality of default actions.

In some implementations of the third example method, the plurality of default actions include: a stop; an evasive maneuver; a maneuver to a roadway shoulder; a deceleration above a threshold magnitude; or a continuation of a current heading.

In some implementations of the third example method, (e) includes executing parameter values that were generated in (c) for the candidate trajectory.

In some implementations of the third example method, one or more of the parameter values were not optimized after generation in (c).

In some implementations of the third example method, none of the parameter values were optimized after generation in (c).

In an aspect, the present disclosure provides a neural network configured to execute any implementation of the first example method, any implementation of the second example method, any implementation of the third example method, or any implementation of any combination of the first example method, the second example method, or the third example method.

In an aspect, the present disclosure provides an autonomous vehicle control system for controlling an autonomous vehicle, the autonomous vehicle control system including one or more processors and one or more non-transitory computer-readable media storing instructions that are executable by the one or more processors to cause the autonomous vehicle control system to perform operations, the operations including any implementation of the first example method, any implementation of the second example method, any implementation of the third example method, or any implementation of any combination of the first example method, the second example method, or the third example method.

In an aspect, the present disclosure provides one or more non-transitory computer-readable media storing instructions that are executable by one or more processors to cause an autonomous vehicle control system to perform operations, the operations including any implementation of the first example method, any implementation of the second example method, any implementation of the third example method, or any implementation of any combination of the first example method, the second example method, or the third example method.

Other example aspects of the present disclosure are directed to other systems, methods, vehicles, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems.

Figure 1:
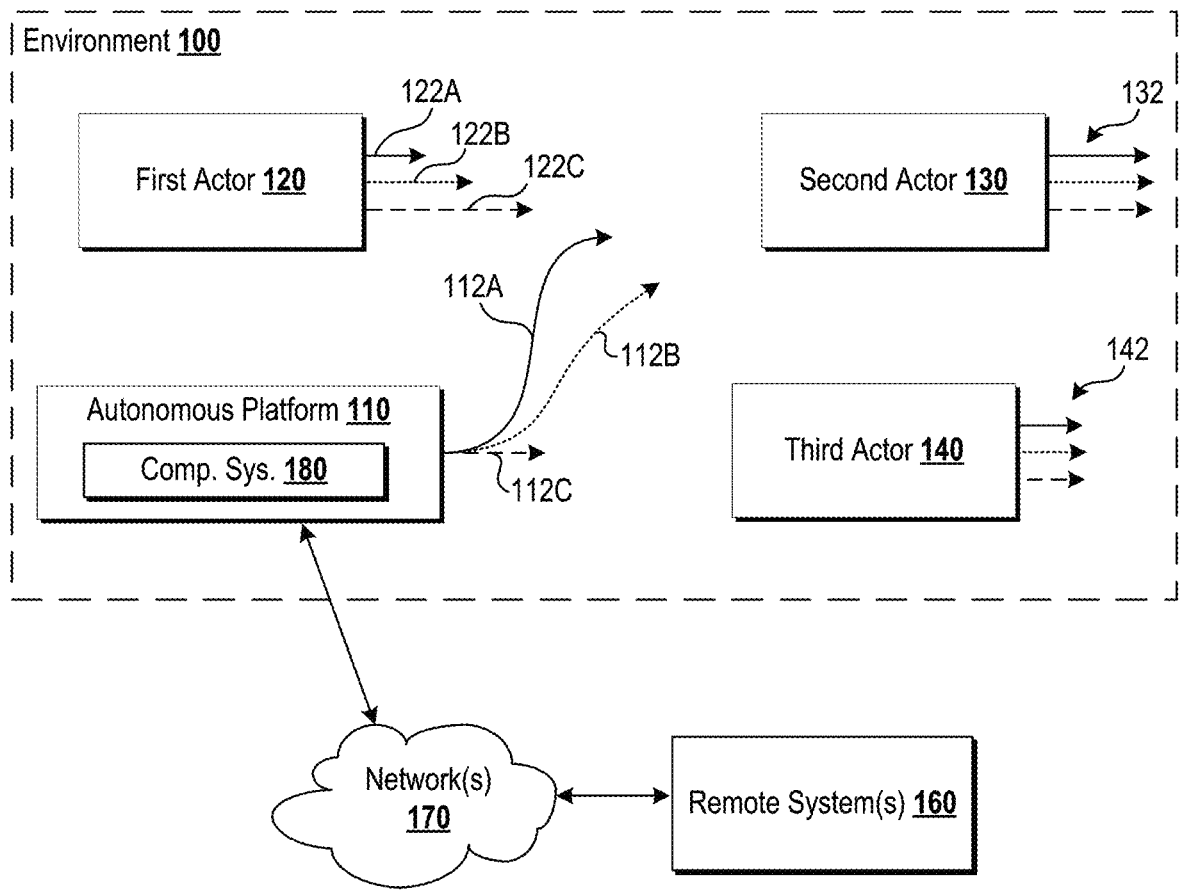
FIG. 1 is a block diagram of an example operational scenario, according to some implementations of the present disclosure.

With reference to FIGS. 1-32, example implementations of the present disclosure are discussed in further detail. FIG. 1 is a block diagram of an example operational scenario, according to some implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 may be or include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 may be any type of platform configured to operate within the environment 100. For example, the autonomous platform 110 may be a vehicle configured to autonomously perceive and operate within the environment 100. The vehicles may be a ground-based autonomous vehicle such as, for example, an autonomous car, truck, van, etc. The autonomous platform 110 may be an autonomous vehicle that can control, be connected to, or be otherwise associated with implements, attachments, and/or accessories for transporting people or cargo. This can include, for example, an autonomous tractor optionally coupled to a cargo trailer. Additionally, or alternatively, the autonomous platform 110 may be any other type of vehicle such as one or more aerial vehicles, water-based vehicles, space-based vehicles, other ground-based vehicles, etc.

The autonomous platform 110 may be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, environment 100 can include one or more objects. The object(s) may be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s).

Figure 2:
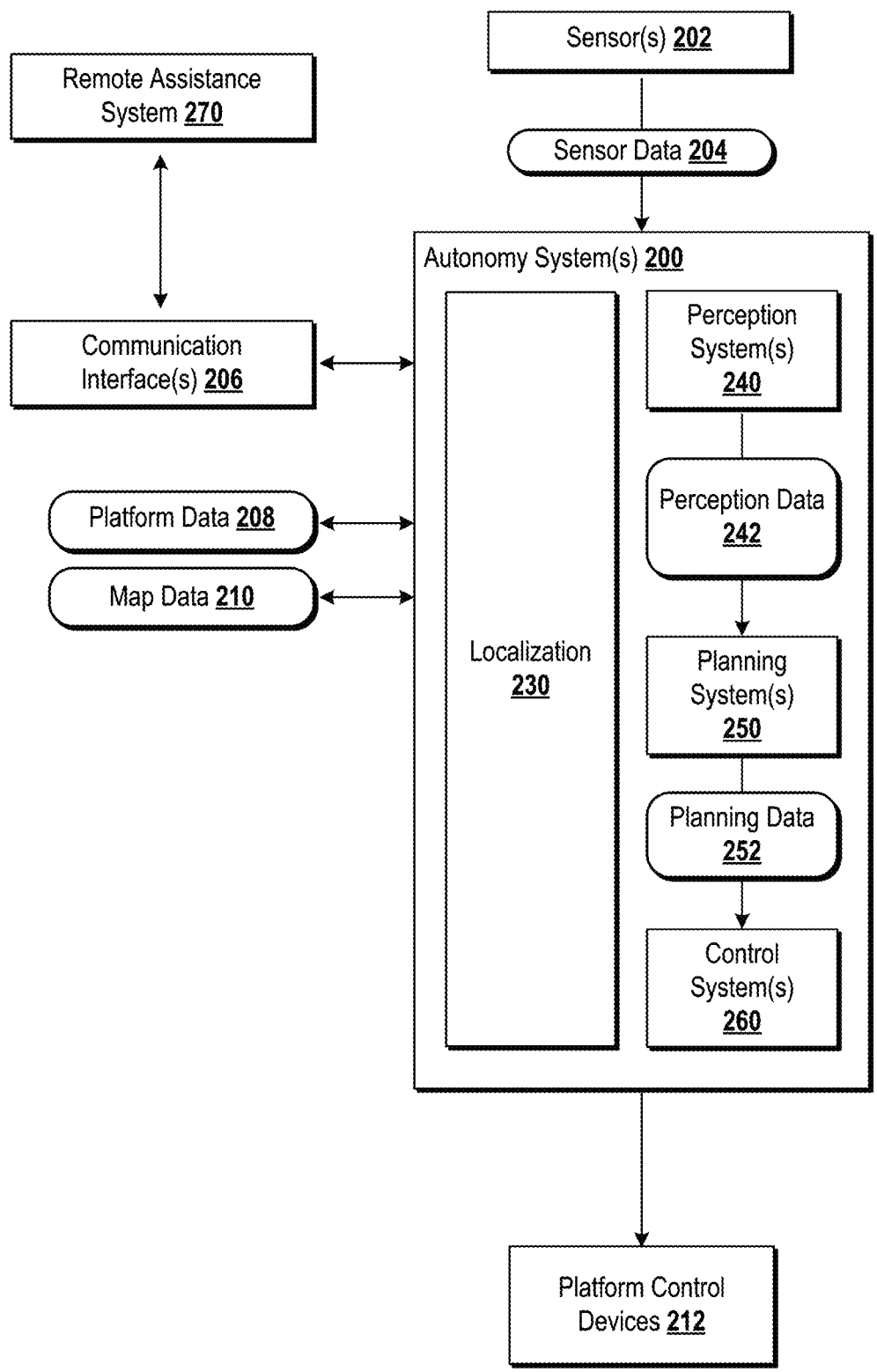
FIG. 2 is a block diagram of an example system, according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 may include different subsystems for performing various autonomy operations. The subsystems may include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

Autonomy system 200 can be located onboard (e.g., on or within) an autonomous platform and can be configured to operate the autonomous platform in various environments. The environment may be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of localization system 230, perception system 240, planning system 250, or control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally, or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally, or alternatively, the map data 210 can include sparse map data (e.g., lane graphs, etc.). In some implementations, the sensor data 204 can be fused with or used to update the map data 210 in real-time.

The autonomy system 200 can include the localization system 230, which can provide an autonomous platform with an understanding of its location and orientation in an environment. In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can generate perception data 242 that describes one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned models. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 can include the planning system 250, which can be configured to determine how the autonomous platform is to interact with and move within its environment. The planning system 250 can generate planning data 252 that describes one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally, or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally, or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans.

By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). The autonomous platform 110 can evaluate each of the potential platform trajectories and predict its impact on the environment.

For example, the autonomous platform 110 (e.g., using its autonomy system 200) can determine that a platform trajectory 112A would move the autonomous platform 110 more quickly into the area in front of the first actor 120 and is likely to cause the first actor 120 to decrease its forward speed and yield more quickly to the autonomous platform 110 in accordance with a first actor trajectory 122A.

Additionally or alternatively, the autonomous platform 110 can determine that a platform trajectory 112B would move the autonomous platform 110 gently into the area in front of the first actor 120 and, thus, may cause the first actor 120 to slightly decrease its speed and yield slowly to the autonomous platform 110 in accordance with a first actor trajectory 122B.

Additionally or alternatively, the autonomous platform 110 can determine that a platform trajectory 112C would cause the autonomous vehicle to remain in a parallel alignment with the first actor 120 and, thus, the first actor 120 is unlikely to yield any distance to the autonomous platform 110 in accordance with first actor trajectory 122C.

Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger may be an alert, an error signal, a map feature, a request, a location, a traffic condition, a road condition, etc.

After initiating the session, the autonomy system 200 can provide context data to the remote assistance system 270. The context data may include sensor data 204 and state data of the autonomous platform. For example, the context data may include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

Autonomy system 200 can use the assistive signal(s) for input into one or more autonomy subsystems for performing autonomy functions. For instance, the planning subsystem 250 can receive the assistive signal(s) as an input for generating a motion plan. For example, assistive signal(s) can include constraints for generating a motion plan. Additionally, or alternatively, assistive signal(s) can include cost or reward adjustments for influencing motion planning by the planning subsystem 250. Additionally, or alternatively, assistive signal(s) can be considered by the autonomy system 200 as suggestive inputs for consideration in addition to other received data (e.g., sensor inputs, etc.).

The autonomy system 200 may be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
FIG. 3A is a representation of an example operational environment, according to some implementations of the present disclosure.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
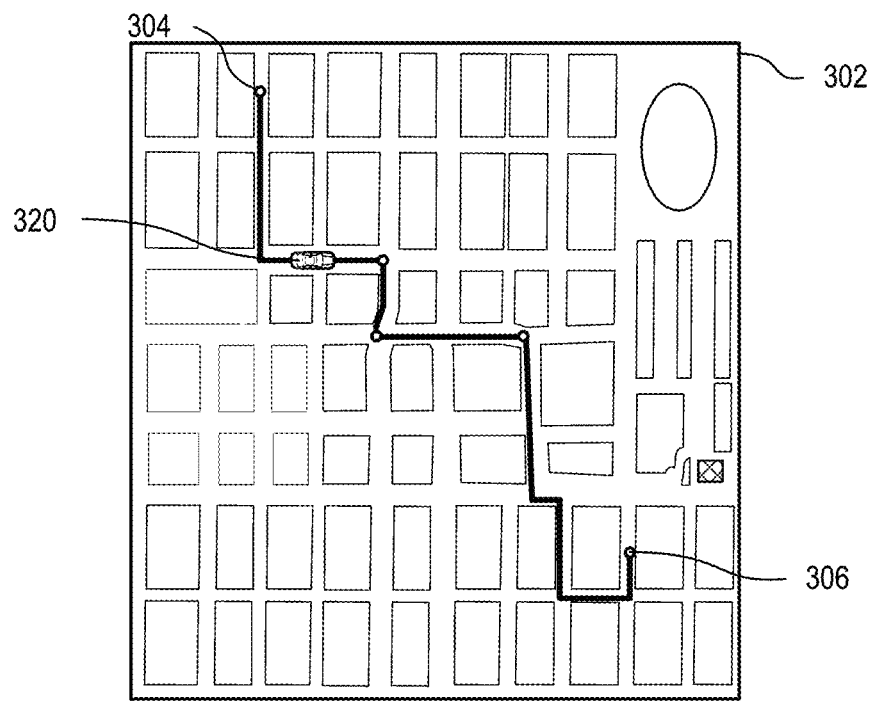
FIG. 3B is a representation of an example map of an operational environment, according to some implementations of the present disclosure.

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
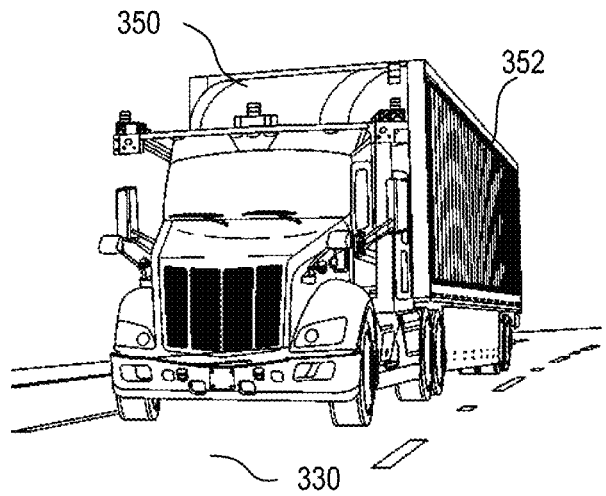
FIG. 3C is a representation of an example operational environment, according to some implementations of the present disclosure.

With reference to FIG. 3C, in another example, an operational environment can include an open travel way environment 330. An autonomous platform can include an autonomous vehicle 350 controlled by the autonomy system 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
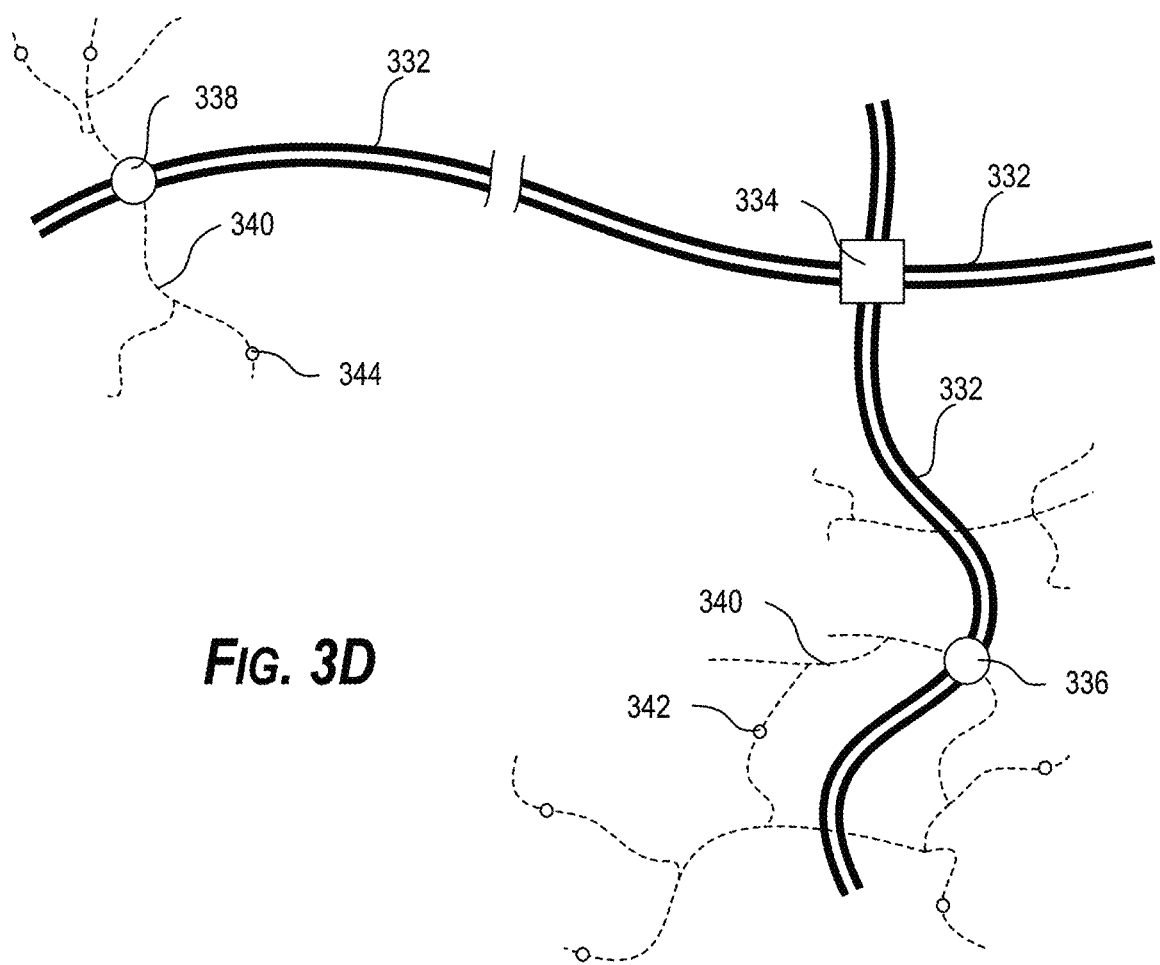
FIG. 3D is a representation of an example map of an operational environment, according to some implementations of the present disclosure.

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338 and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To improve the performance of an autonomous platform, such as an autonomous vehicle controlled at least in part using autonomy system 200 (e.g., the autonomous vehicles 310 or 350), the autonomous platform can implement multistage motion planning techniques as described herein.

Figure 4:
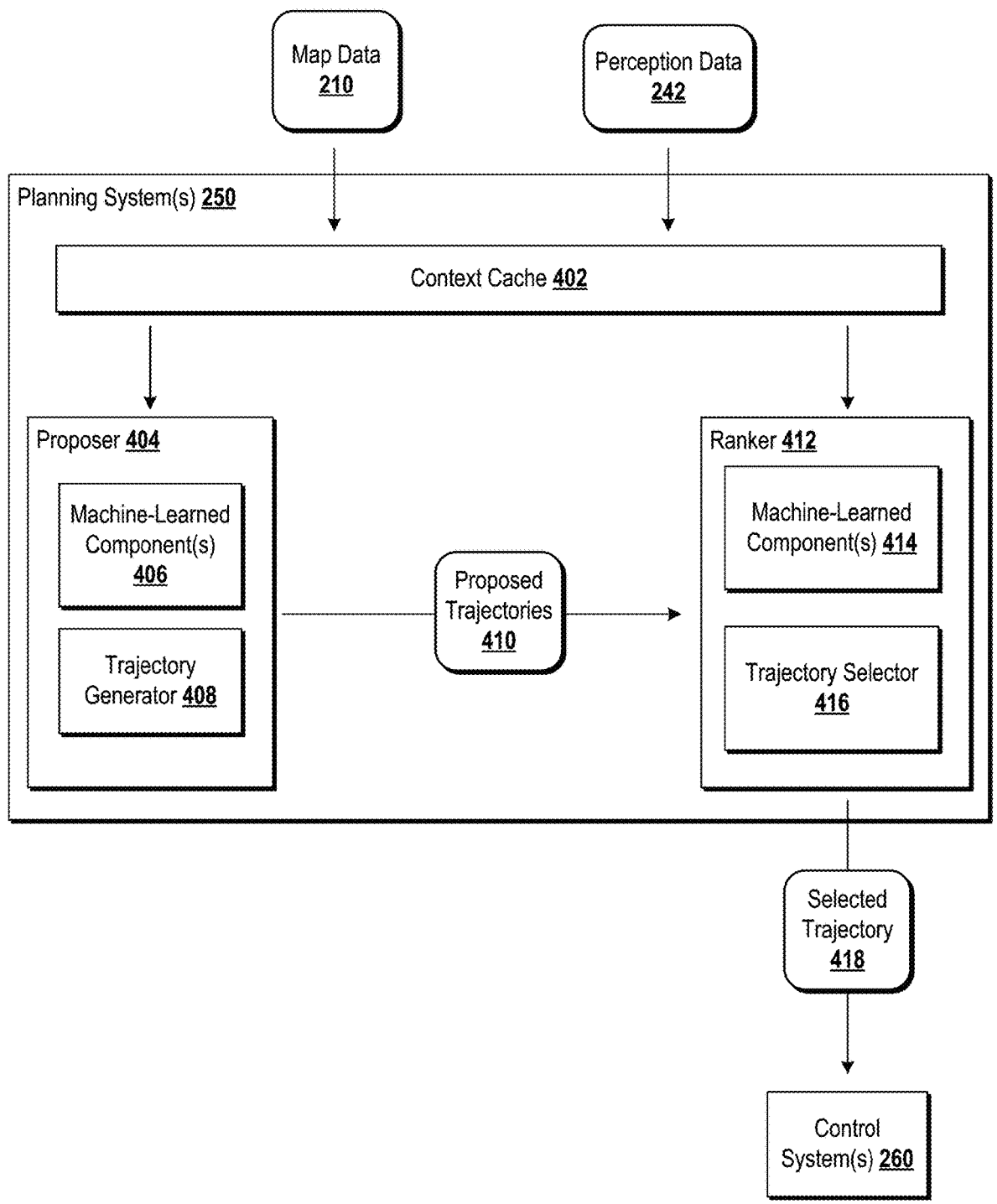
FIG. 4 is a block diagram of an example motion planning system, according to some implementations of the present disclosure.

FIG. 4 is a block diagram of an example multistage motion planning system according to some aspects of the present disclosure. Planning system 250 can receive map data 210 and perception data 242 from perception system 240 that describes an environment surrounding an autonomous vehicle. Planning system 250 can process map data 210 and perception data 242 to populate a context cache 402.

A proposer 404 can use one or more machine-learned components 406. Machine-learned components 406 can process data from context cache 402 to generate an understanding of the environment. Proposer 404 can use a trajectory generator 408 that can generate proposed trajectories 410 that describe motion plans for the autonomous vehicle.

A ranker 412 can rank proposed trajectories 410 using one or more machine-learned components 414 and select a ranked trajectory using a trajectory selector 416. For example, machine-learned components 414 can process data from context cache 402 to generate an understanding of the environment. Machine-learned components 414 can leverage upstream data from proposer 404 to obtain a better understanding of the environment. One or more cost models (e.g., learned cost models, heuristic-based cost models, etc.) can generate scores or costs for proposed trajectories 410 as a part of, or in view of outputs from, machine-learned components 414.

Based on the costs, ranker 412 can output a selected trajectory 418 based on selection logic implemented in trajectory selector 416 (e.g., selecting a lowest-cost trajectory). Selected trajectory 418 can have an optimal or preferred score based on a ranking of proposed trajectories 410. Control system 260 can receive selected trajectory 418 and control a motion of the autonomous vehicle based on selected trajectory 418.

Context Cache

Context cache 402 can store map data 210 and perception data 242 in its original format. Context cache 402 can retrieve and organize map data 210 and perception data 242 in a manner configured for efficient processing by proposer 404 and ranker 412. For example, context cache 402 can include a rolling buffer of map data 210 and perception data 242. For example, context cache 402 can maintain a rolling buffer of map tiles or other map regions from map data 210 based on a time horizon or threshold distance from the autonomous vehicle. Context cache 402 can maintain a buffer of nearby actors and their corresponding states and associated actor tracking data.

Additionally or alternatively, context cache 402 can store data derived from map data 210 or perception data 242. For instance, context cache 402 can include latent embeddings of map data 210 or perception data 242 that encode an initial understanding of the scene surrounding the autonomous vehicle. Planning system 250 can perform preprocessing on map data 210 to preprocess the map layout into streams. Streams can correspond to lanes or other nominal paths of traffic flow. Planning system 250 can associate traffic permissions to the streams. In this manner, for instance, context cache 402 can include preprocessed data that encodes an initial understanding of the surrounding environment.

Planning system 250 can also perform other once-per-cycle preprocessing operations and store any results in context cache 402 to reduce or eliminate redundant processing by proposer 404 or ranker 412.

Proposer

Proposer 404 can be or include a model that ingests scene context (e.g., from context cache 402) and outputs a plurality of candidate trajectories for the autonomous vehicle to consider following. Proposer 404 can include machine-learned components 406. Machine-learned components 406 can perform inference over inputs to generate outputs. For instance, machine-learned components 406 can infer, based on patterns seen across many training examples, that a particular input maps to a particular output. Proposer 404 can include hand-tuned or engineered components. Engineered components can implement inductive or deductive operations. For instance, an example implementation of engineered logic or rules can be deduced a priori from laws of physics, kinematics, known constraints, etc. Proposer 404 can include multiple different types of components to robustly achieve various performance and validation targets.

Machine-learned components 406 can include one or more machine-learned models or portions of a model (e.g., a layer of a model, an output head of a model, a branch of a model, etc.). One or more of machine-learned components 406 can be configured to ingest data based on context cache 402.

Machine-learned components 406 can be configured to perform various different operations. Machine-learned components 406 can perform scene understanding operations. For instance, one or more of machine-learned components 406 can reason over a scene presented in context cache 402 to form an understanding of relevant objects and actors to the planning task.

Machine-learned components 406 can explicitly or implicitly perform forecasting operations. For instance, one or more of machine-learned components 406 can generate data forecasting movements for one or more actors in the environment (e.g., for actors determined to be relevant). The forecasts can include marginal forecasts of actor behavior. (i.e., forecasts of actor behavior without regard for the trajectory of the autonomous vehicle).

Forecasts in proposer 404 can be generated in various levels of detail. For instance, example forecasts for proposer 404 can be one-dimensional. An example forecast for a respective actor can indicate an association between the actor and a stream or a particular location in a stream (e.g., a goal location). In proposer 404, forecasting can include determining, using machine-learned components 406, goals for one or more actors in a scene.

Machine-learned components 406 can perform decision-making operations. For instance, planning system 250 can determine how to interact with and traverse the environment by considering its options for movement at the level of discrete decisions: for example, whether to yield or not yield to a merging actor. Machine-learned components 406 can use an understanding of the scene to evaluate, for a given decision (e.g., how to move with respect to a given actor), multiple different candidate decision values (e.g., yield to actor, or not yield to actor). A set of decision values for one or more discrete decisions can be referred to as a strategy. Different strategies can reflect different approaches for navigating the environment. Proposer 404 can pass strategy data to ranker 412 to help rank proposed trajectories 410.

Trajectory generator 408 can ingest data from context cache 402 and output multiple candidate trajectories. In some cases, trajectory generator 408 can receive inputs from machine-learned components 406. For instance, trajectory generator 408 can receive inputs from one or more machine-learned models that can understand the scene context and bias generated trajectories toward a particular distribution (e.g., to avoid generating irrelevant or low-likelihood trajectories in the given context). In other cases, trajectory generator 408 may operate independently of one or more of machine-learned components 406. For instance, trajectory generator 408 can operate independently of a forecasting model or a decision-making model or any forecasts or decisions.

Trajectory generator 408 can operate directly from context cache 402. For example, trajectory generator 408 can use map geometry (e.g., a lane spline) and initial state information (e.g., actor and autonomous vehicle state data from context cache 402) to generate a range of nominally relevant trajectories that the autonomous vehicle could follow. The range can be constrained, such as by performance or comfort constraints on the autonomous vehicle capabilities (e.g., longitudinal or lateral acceleration limits) or external constraints (e.g., speed limit).

Trajectory generator 408 can generate trajectories using sampling-based techniques. Trajectory generator 408 can determine a relevant range of a parameter associated with a trajectory (e.g., a speed, an acceleration, a steering angle, etc.) and generate a number of sampled values for that parameter within the range. The sampled values can be uniformly distributed, normally distributed, or adhere to some other prior distribution.

Trajectory generator 408 can use one or more of machine-learned components 406 to generate trajectories in a ranked order. For instance, trajectory generator 408 can sample parameters or combinations of parameters with priority on parameters or combinations of parameters that are similar to human-driven exemplars. For example, a machine-learned component can cause trajectory generator 408 to sample, with higher probability, parameters or combinations of parameters that are similar to human-driven exemplars. The machine-learned component can be trained using a corpus of training examples of trajectories selected by human drivers (e.g., trajectories driven by human drives, trajectories drawn or instructed by human reviewers of autonomously selected trajectories, etc.). In this manner, for example, trajectory generator 408 can first generate higher-quality samples and as time progresses continue to generate longer-tail candidates. In this manner, for instance, generation can be terminated based on a latency budget and only skip generation of long-tail candidates.

Proposed trajectories 410 can describe a motion of the autonomous vehicle through the environment. A respective trajectory can describe a path of the autonomous vehicle through the environment over a time period. For instance, a respective trajectory can include waypoints of the path, or the respective trajectory can not contain waypoints of the path. Proposed trajectories 410 can be parameterized in terms of a basis path and lateral offsets from that basis path over time.

Ranker

Ranker 412 can be or include a model that ingests scene context (e.g., from context cache 402) and outputs selected trajectory 418 for the autonomous vehicle to execute with control system 260. Ranker 412 can include machine-learned components 414. Machine-learned components 414 can perform inference over inputs to generate outputs. Ranker 412 can include hand-tuned or engineered components. Ranker 412 can include multiple different types of components to robustly achieve various performance and validation targets.

Machine-learned components 414 can include one or more machine-learned models or portions of a model (e.g., a layer of a model, an output head of a model, a branch of a model, etc.). One or more of machine-learned components 414 can be configured to ingest data based on context cache 402.

Machine-learned components 414 can be configured to perform various different operations. Machine-learned components 414 can perform scene understanding operations. For instance, one or more of machine-learned components 414 can reason over a scene presented in context cache 402 to form an understanding of relevant objects and actors to the planning task.

Machine-learned components 414 can explicitly or implicitly perform forecasting operations. For instance, one or more of machine-learned components 414 can generate data forecasting movements for one or more actors in the environment (e.g., for actors determined to be relevant). The forecasts can include marginal forecasts of actor behavior.

Forecasts in ranker 412 can be generated in various levels of detail. For instance, example forecasts for ranker 412 can be two-, three-, or four-dimensional. An example forecast for a respective actor can indicate a position of an actor over time. A two-dimensional forecast can include a longitudinal position over time. A three-dimensional forecast can include longitudinal and lateral positions over time. A four-dimensional forecast can include movement of a volume (e.g., actor bounding box) over time.

Machine-learned components 414 can generate forecasts conditioned on the candidate behavior (e.g., strategies, trajectories) of the autonomous vehicle. For instance, machine-learned model components 414 can process proposed trajectories 410 to generate a plurality of forecasted states of the environment respectively based on the plurality of candidate trajectories.

Ranker 412 can also forecast actor states using sampling. For instance, in the same manner that proposer 404 outputs potential autonomous vehicle trajectories and ranker 412 evaluates the proposals, ranker 412 can include an instance of the proposer (or a different proposer) to propose actor trajectories. Ranker 412 can evaluate the proposals to determine a likely actor trajectory for a given situation. In this manner, for instance, ranker 412 can also forecast actor states using sampling.

Trajectory selector 416 can perform costing operations. Trajectory selector 416 can select trajectories based on costing operations performed using machine-learned model components 414. Machine-learned model components 414 can process a candidate trajectory and generate a score associated with the trajectory. The score can correspond to an optimization target, such that ranking the trajectories based on the score can correspond to ranking the trajectories in order of preference or desirability. Machine-learned components 414 can include learned cost functions. Trajectory selector 416 or machine-learned components 414 can cost trajectories based on forecasts generated using machine-learned model components 414.

Trajectory selector 416 can also select trajectories based on engineered cost functions. Example engineered cost functions can include actor envelope overlap, following distance, etc.

Selected trajectory 418 can correspond to a trajectory selected based on outputs of trajectory selector 416. For instance, trajectory selector 416 can select a trajectory based on scores for a plurality of candidate trajectories.

Advantageously, proposer 404 and ranker 412 can have equal access to context cache 402 and the scene understandings based thereon. In this manner, for instance, world knowledge can be leveraged along the processing flow and does not need to be concentrated in only the proposer 404 or only the ranker 412. In this manner, for instance, an example ranker 412 can select a trajectory in full view of all relevant scene information.

Leveraging full scene understanding across stages in the motion planner can provide additional processing advantages. For instance, proposer 404 and ranker 412 can both ingest data from context cache 402, so example proposers 404 and rankers 412 can benefit from using shared processing architectures for scene and world state understanding.

Figure 5:
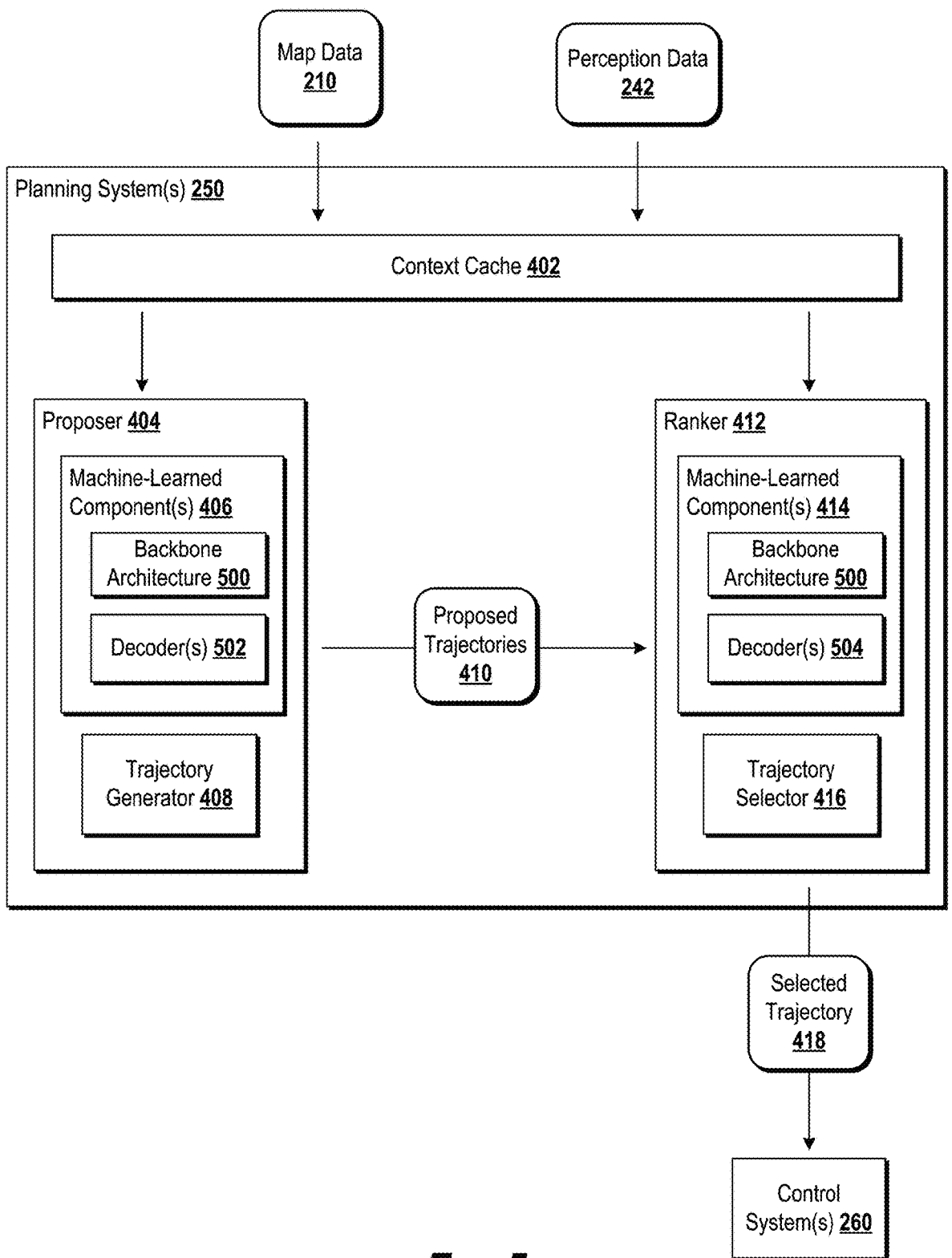
FIG. 5 is a block diagram of an example motion planning system, according to some implementations of the present disclosure.

FIG. 5 is a block diagram of an example multistage motion planning system according to some aspects of the present disclosure. In the implementation of FIG. 5, the multistage motion planning system 250 uses a shared backbone architecture 500 in machine-learned components 406 and 414. For example, machine-learned components 406 of proposer 404 can implement a backbone architecture 500 that feeds one or more decoders 502. Similarly, machine-learned components 414 of ranker 412 can implement backbone architecture 500 to feed one or more decoders 504.

Backbone architecture 500 can be an architecture of a machine-learned model or a portion thereof. Backbone architecture 500 can include various neural network architectures, such as deep neural networks, fully connected networks, multilayer perceptrons, graph neural networks, convolutional neural networks, recurrent neural networks, etc. Backbone architecture 500 can include transformer-based architectures.

Backbone architecture 500 can be configured for processing and understanding scene context from context cache 402. Backbone architecture 500 can ingest one or multiple modalities of data, such as object state data, map data, image data, etc.

Backbone architecture 500 can encode spatial relationships between objects in a scene. Backbone architecture 500 can encode a structure or layout of a map or roadway.

Decoders 502 and 504 can include task-specific portions of a machine-learned model that are configured to generate an inference or prediction based on a provided input. The provided input can be a latent state of an upstream model. For instance, decoders 502 and 504 can process a latent state of a model implementing backbone architecture 500 to generate outputs (e.g., costs, forecasts, or decision value data). A forecasting decoder can generate forecasts and a decision decoder can evaluate different decisions. A costing decoder can generate cost values for an input trajectory.

Decoders 502 and 504 may have the same or different decoders (i.e., decoders that generate the types of outputs or different types of outputs). For example, in one implementation, both decoders 502 and 504 include decoders that explicitly or implicitly generate values that reflect marginal forecasts and decisions, but decoder 504 additionally includes a decoder that generates conditional forecasts. A conditional forecasting decoder can process a latent state of a model implementing backbone architecture 500 in addition to a candidate trajectory to generate a conditional forecast conditioned on the candidate trajectory. A conditional forecasting decoder can process a latent state of a model implementing backbone architecture 500 that itself processed a candidate trajectory to generate a conditional forecast conditioned on the candidate trajectory.

Decoder 504 can include machine-learned models that ingest proposed trajectories 410 to generate inferences. Decoder 504 can include costing models that produce trajectory costs for proposed trajectories 410 based on the latent state and proposed trajectories 410. For example, decoder 504 can generate cost values for use by trajectory selector 416 to select a trajectory.

The costing models can explicitly or implicitly use actor forecasts to compute costs. Explicitly using actor forecasts can include receiving actor forecast data from a forecasting model (e.g., conditional or marginal forecasts). Implicitly using actor forecasts can include using a trajectory costing model that was trained to produce costs that accurately correspond to a cost of future interaction of a trajectory with a future actor position. In this manner, for instance, an example costing model may not receive or itself generate explicit actor forecasts, but it may implicitly cost a trajectory based on its interactions with a future state of the environment. In an example, common backbone architecture 500 was trained to generate latent states that encode actor goals, headings, or other forecast data. This encoded environment data can support explicit regression of forecasted states, which can then be used to cost proposed trajectories 410. This encoded environment data can support direct regression of attributes of those forecasted states (e.g., a cost of an interaction of a forecasted state with a trajectory), even if the forecasted states themselves are not regressed explicitly.

Machine-learned components 406 and machine-learned components 414 both use backbone architecture 500. Using the same architecture can be implemented in various ways.

Figure 6:
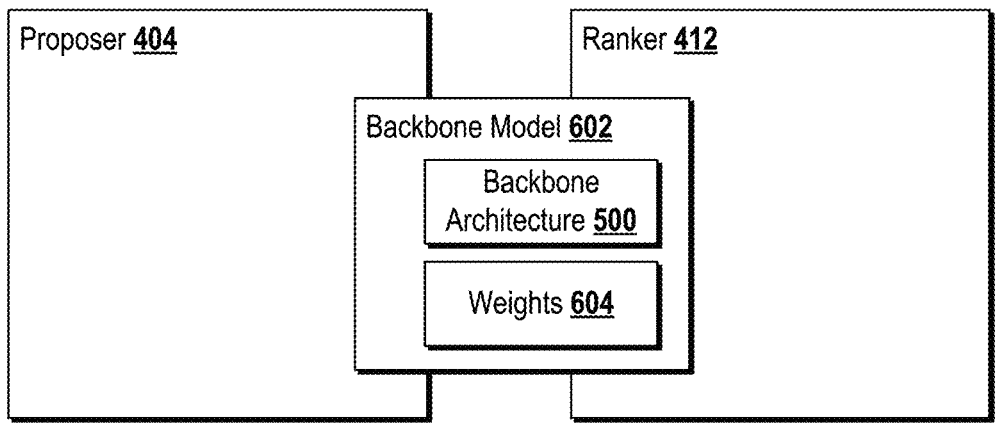
FIG. 6 is a block diagram of components of an example motion planning system, according to some implementations of the present disclosure.

FIG. 6 is a block diagram of a first implementation of proposer 404 and ranker 412. Proposer 404 and ranker 412 can share the same instance of a backbone model 602 that is characterized by backbone architecture 500 and is parameterized by weights 604. For example, a single model instance can be persisted on the device that implements the motion planning system. Each of proposer 404 and ranker 412 can provide inputs to model 602 and receive outputs from model 602. In this manner, for instance, proposer 404 can use machine-learned components 406 that include model 602, and thus backbone architecture 500. Ranker 412 can use machine-learned components 414 that also include model 602, and thus backbone architecture 500.

Figure 7:
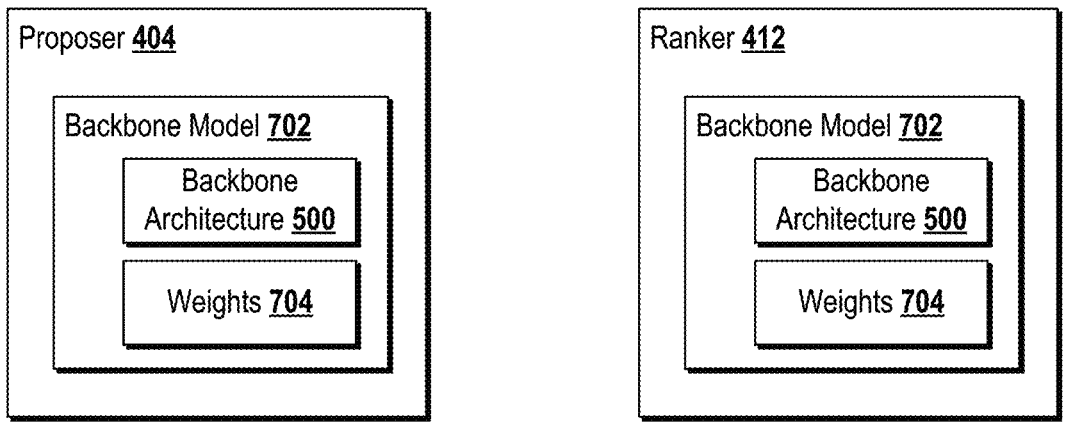
FIG. 7 is a block diagram of components of an example motion planning system, according to some implementations of the present disclosure.

FIG. 7 is a block diagram of a second implementation of proposer 404 and ranker 412. Proposer 404 and ranker 412 can each use a copy of a backbone model 702 characterized by backbone architecture 500 and parameterized by weights 704. For example, separate instances of the same model can be persisted on one device or across multiple devices. Proposer 404 can provide inputs to one instance of model 702 and receive outputs from that instance. Ranker 412 can provide inputs to another instance of model 702 and receive outputs from that instance. In this manner, for instance, proposer 404 can use machine-learned components 406 that include model 702, and thus backbone architecture 500. Ranker 412 can use machine-learned components 414 that also include model 702, and thus backbone architecture 500. Using separate instances can aid parallelization or pipelining, as each of proposer 404 and ranker 412 can execute tasks with backbone model 702 without awaiting completion of the other's tasks.

Figure 8:
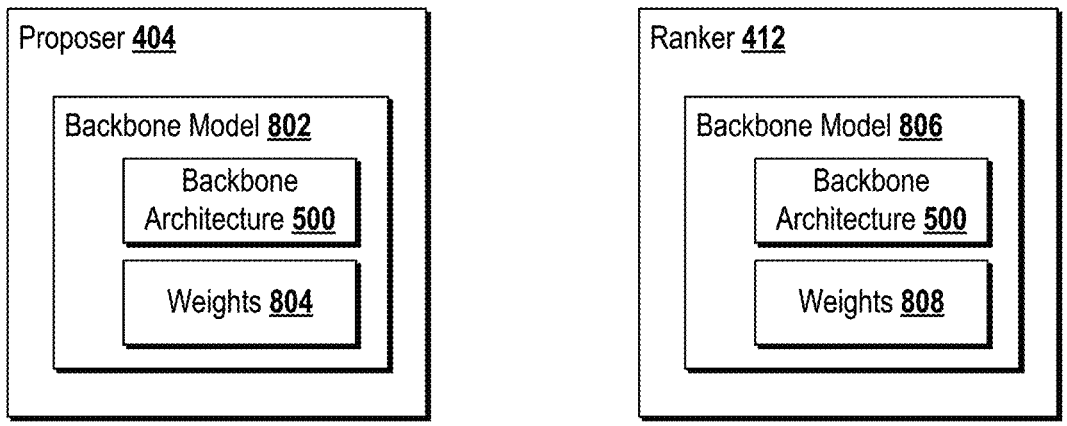
FIG. 8 is a block diagram of components of an example motion planning system, according to some implementations of the present disclosure.

FIG. 8 is a block diagram of a third implementation of proposer 404 and ranker 412. Proposer 404 and ranker 412 can each use different backbone models. Proposer 404 can include a backbone model 802 characterized by backbone architecture 500 and parameterized by weights 808. Proposer 404 can provide inputs to model 802 and receive outputs from model 802. Ranker 412 can provide inputs to model 806 and receive outputs from model 806.

Models 802 and 806 can be separately trained. For instance, model 802 can be trained for tasks of the proposer 404 and model 806 can be trained for tasks of the ranker 412. The models can be trained separately or jointly (e.g., by training all or part of planning system 250 end-to-end).

Figure 9:
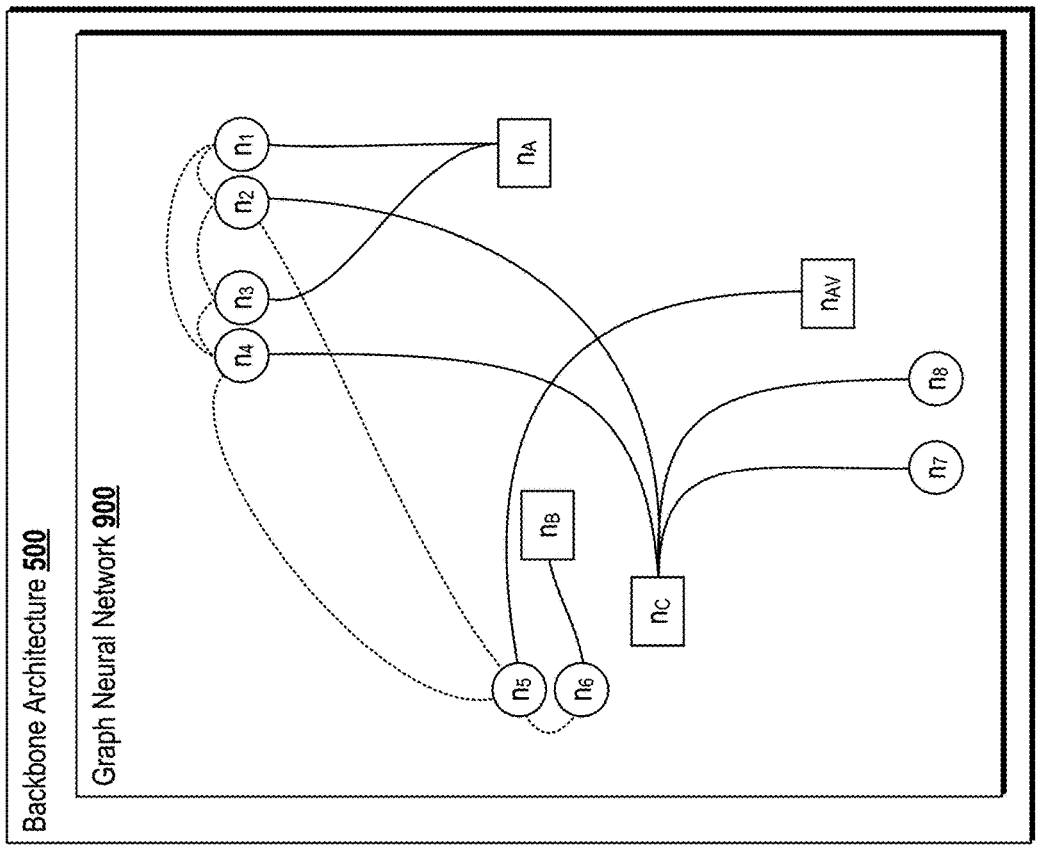
FIG. 9 is a block diagram of components of an example motion planning system, according to some implementations of the present disclosure.

FIG. 9 is a block diagram of an example implementation of backbone architecture 500 according to example aspects of the present disclosure. Backbone architecture 500 can include a machine-learned model architecture that can have an inductive bias toward spatial structures, such as lanes. For instance, backbone architecture 500 can include a graph neural network 900.

Figure 10:
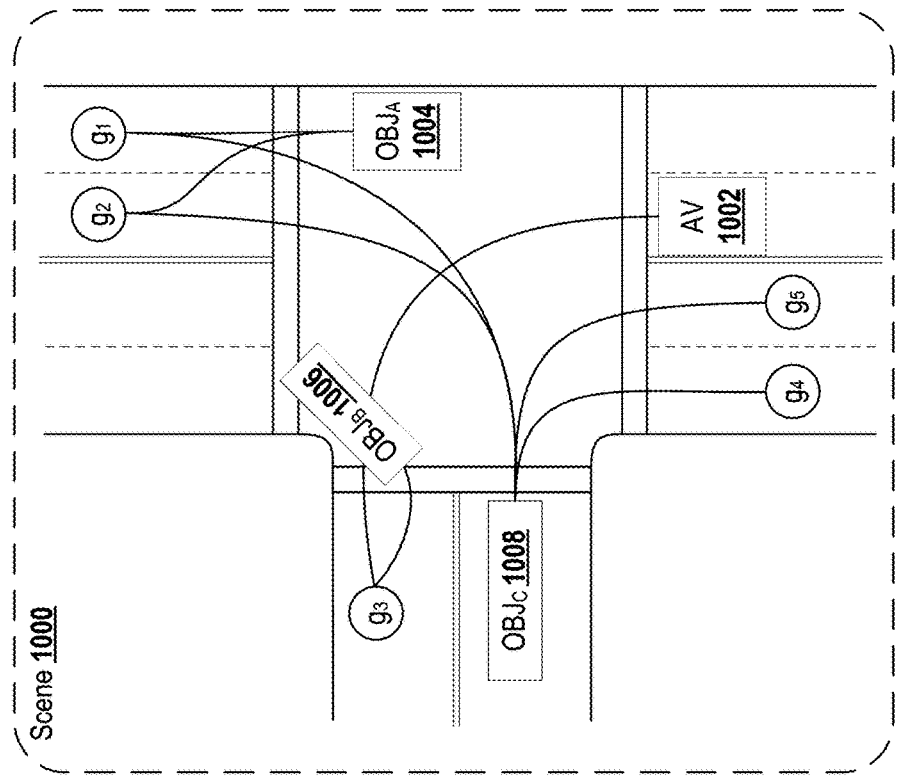
FIG. 10 is an illustration of an example driving scene, according to some implementations of the present disclosure.

FIG. 10 illustrates a scene 1000 that, together with FIG. 9, demonstrates how the structure of a graph neural network can reflect spatial information. In scene 1000, an AV 1002 intends to turn left to travel to goal $g_3$. An object A 1004 may have two possible candidate goals $g_1$ and $g_2$. An object B 1006 can be estimated to be aiming for goal $g_3$ as well. An object C 1008 may have four possible goals, $g_1$, $g_2$, $g_4$, and $g_5$.

With reference again to FIG. 9, graph neural network 900 can be constructed with nodes $n_1$ to $n_8$ that correspond to the candidate goals for AV 1002 and each object 1004, 1006, 1008. Graph neural network 900 can include nodes that correspond to AV 1002 and each object 1004, 1006, 1008 themselves. Edges between the nodes can include an actor-goal edge (solid line) that encodes relationships between various actors and corresponding goal nodes. Edges between the nodes can include a goal-goal edge (dotted line) that encodes relationships between various goals and potential interactions therebetween.

In graph neural network 900, an actor node can encode past or present states of an actor in its own reference frame. A goal node can represent a path layout for an actor (e.g., path waypoints). An edge between an actor and a goal can represent actor motion with respect to the goal path (e.g., actor states in path tangent frame).

An edge between goals can indicate an interaction between actor goals. For instance, an edge between goals can indicate that different actors associated with the endpoint goals can have trajectories that enter shared space (and thus potentially could include an intersection of the actors). An edge between goals can encode a relative state of a source actor for a goal in a destination actor frame. An edge between goals can encode a distance of a source actor to a start of the shared space and a distance of a destination actor to a start of the shared space.

Planning system 250 can perform message passing over graph neural network 900 to propagate information across the scene. This propagation of information can help downstream models generate a scene understanding that encodes relationships between all aspects of the scene.

For example, one output using graph neural network 900 can include probabilities of each goal that effectively forecast an intent of actors in scene to pursue the goal. The forecast may be a marginal forecast in proposer 404. In ranker 412, the forecast may be a conditional forecasts conditioned on proposed trajectories 410.

Message passing can proceed by iteratively updating portions of graph neural network 900 based on the other portions of the graph. For example, FIGS. 11A to 11D are block diagrams of a system using graph neural network 900, according to some aspects of the present disclosure. FIGS. 11A to 11D illustrate an example update sequence for an example iteration of an update across the graph.

Figure 11A:
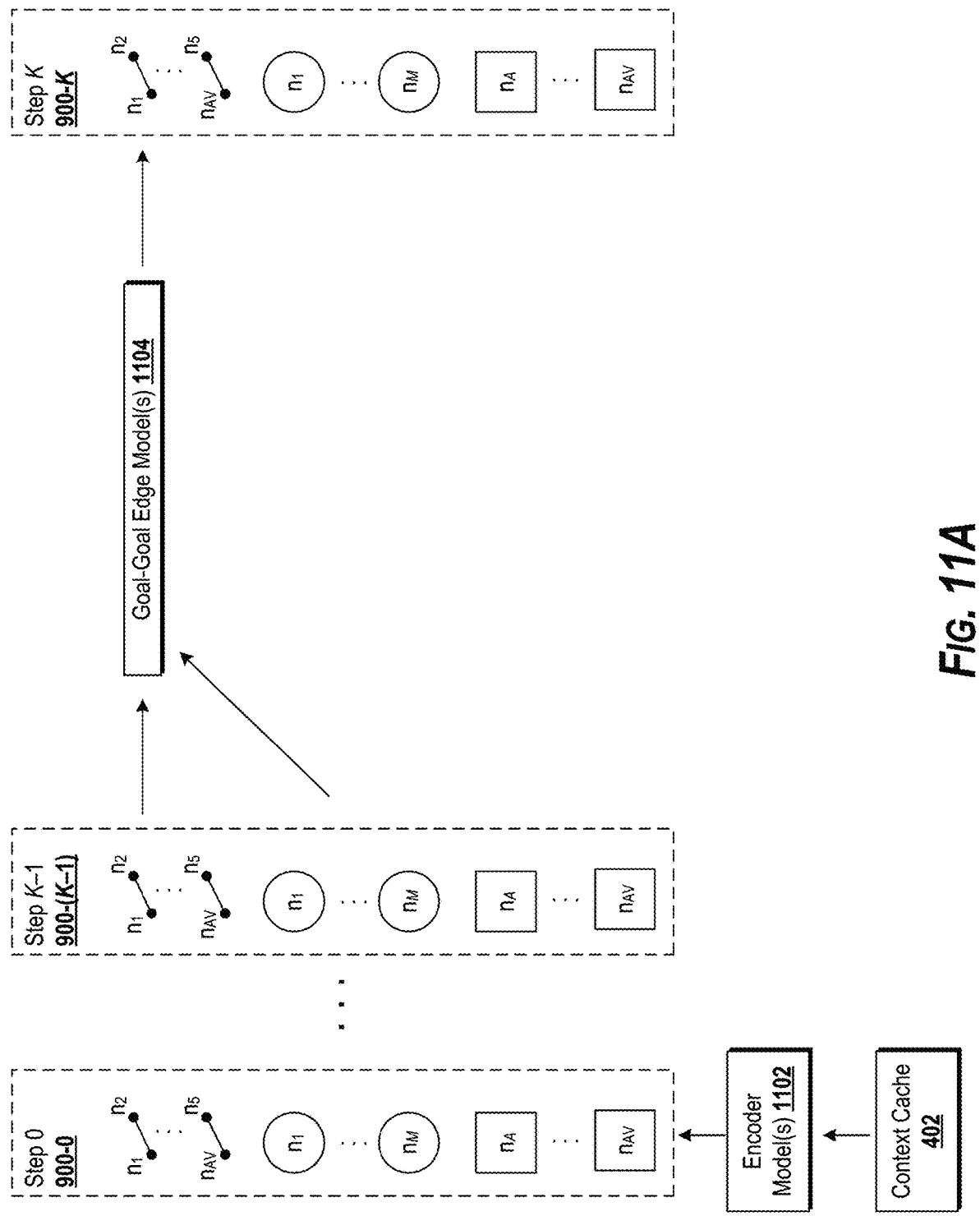
FIG. 11A is a block diagram of a message passing procedure for an example motion planning system, according to some implementations of the present disclosure.

As shown in FIG. 11A, values of the graph at an initial state at $0^{th}$ or initial step 900-0 can be populated by processing data from context cache 402 using one or more encoder models 1102. Message passing iterations or "hops" can be performed until a desired stopping criterion is satisfied (e.g., convergence). K hops are illustrated here. In the K-th hop, goal-goal edge model 1104 can process a prior state of the goal-goal edges as well as the prior states of the corresponding goals to generate a new state for the goal-goal edges. Encoder models 1102 can include various types of machine-learned models. One or more encoder models 1102 can include multilayer perceptrons that process data from context cache 402 to embed values into the corresponding nodes and edges. Other inputs from other portions of the graph can be used as well. Goal-goal edge model 1104 can include various types of machine-learned models.

Figure 11B:
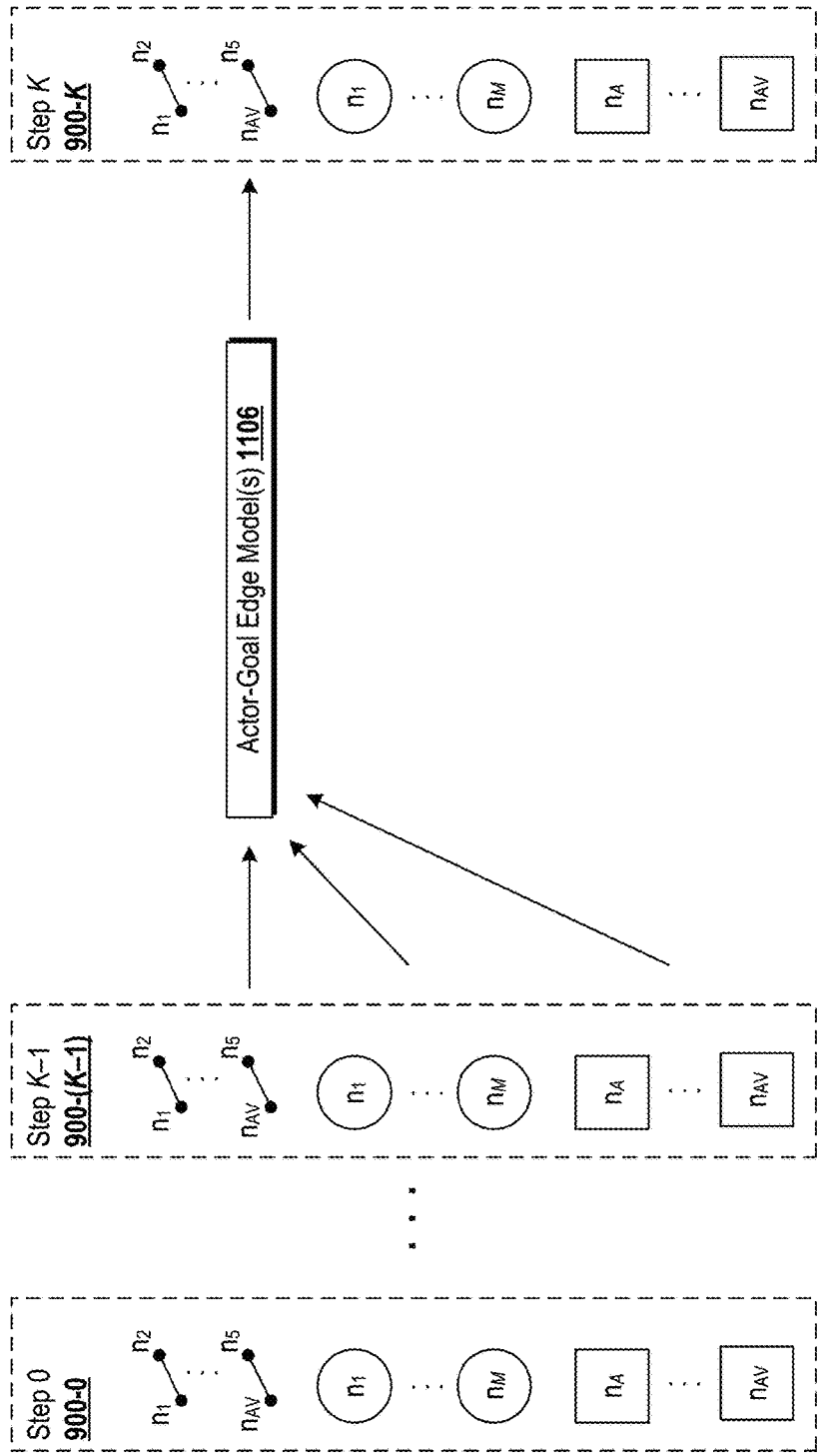
FIG. 11B is a block diagram of a message passing procedure for an example motion planning system, according to some implementations of the present disclosure.

As shown in FIG. 11B, in the K-th hop, actor-goal edge model 1106 can process a prior state of the actor-goal edges as well as the prior states of the corresponding goals and actors to generate a new state for the actor-goal edges. Other inputs from other portions of the graph can be used as well. Actor-goal edge model 1106 can include various types of machine-learned models.

Figure 11C:
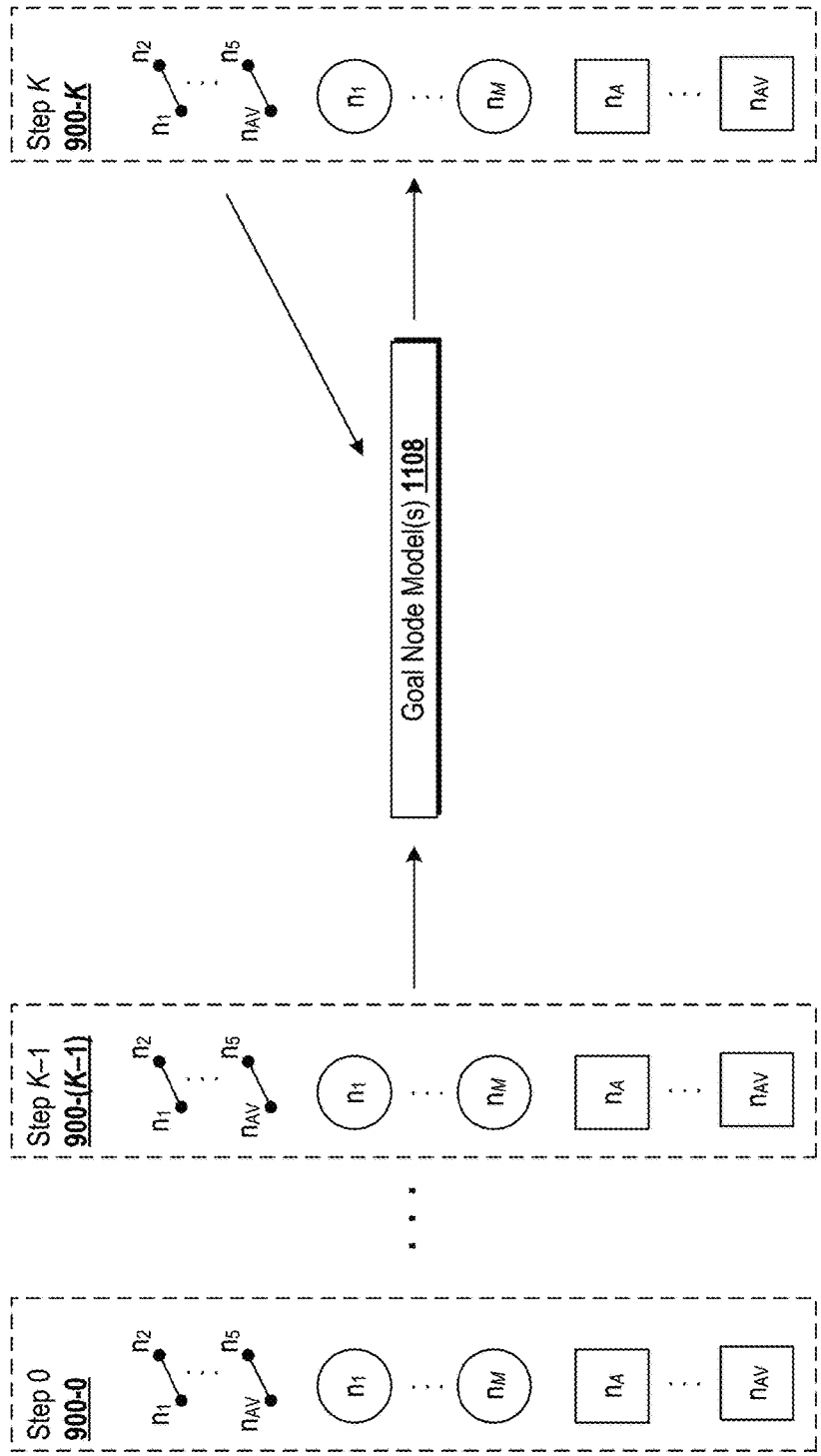
FIG. 11C is a block diagram of a message passing procedure for an example motion planning system, according to some implementations of the present disclosure.

As shown in FIG. 11C, in the K-th hop, goal node model 1108 can process a prior state of the goal node as well as the current states of the corresponding goal-goal edges and actor-goal edges to generate a new state for the goal nodes. Other inputs from other portions of the graph can be used as well. Goal node model 1108 can include various types of machine-learned models.

Figure 11D:
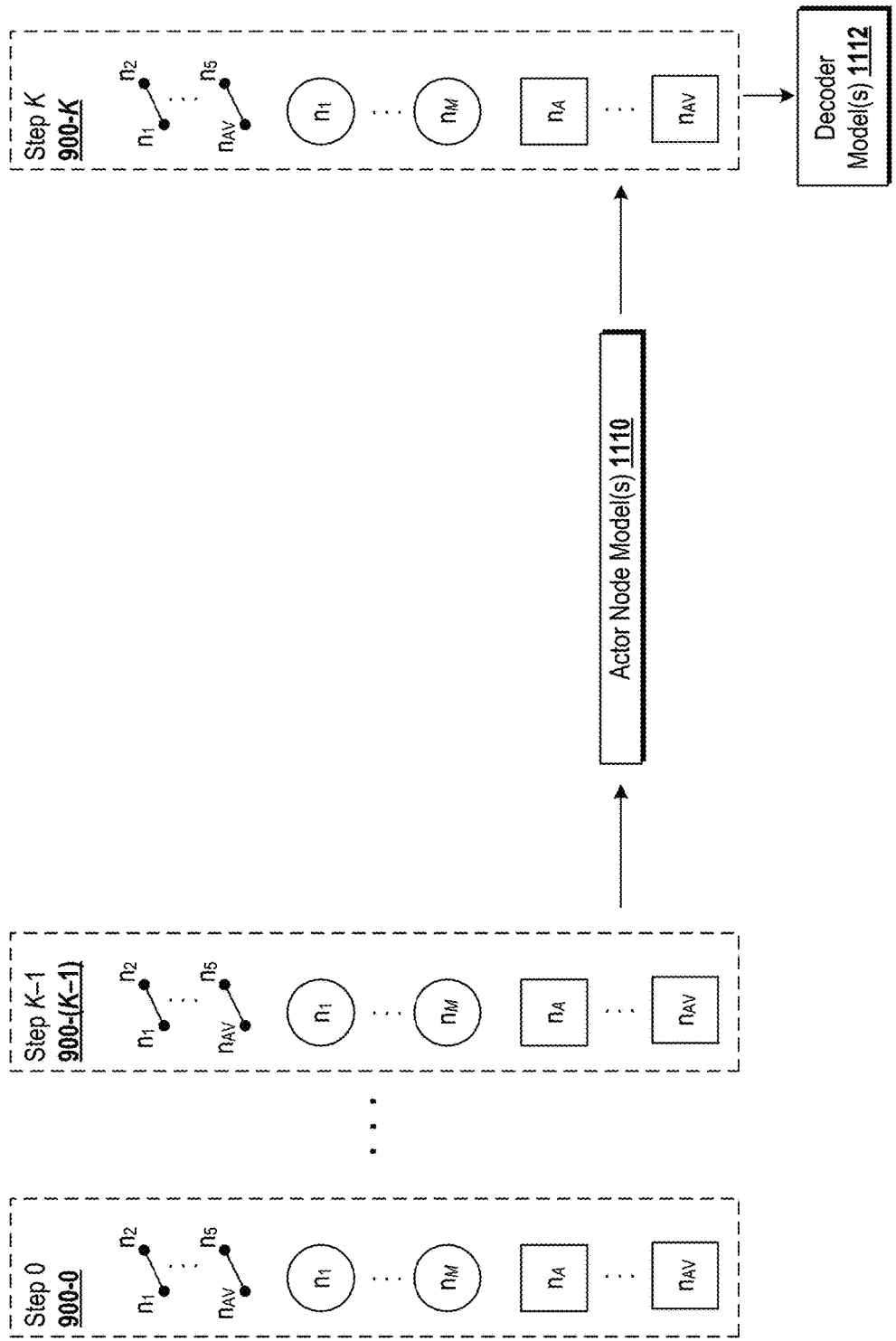
FIG. 11D is a block diagram of a message passing procedure for an example motion planning system, according to some implementations of the present disclosure.

As shown in FIG. 11D, in the K-th hop, actor node model 1110 can process a prior state of the actor node. Other inputs from other portions of the graph can be used as well. Actor node model 1110 can include various types of machine-learned models.

One or more decoders 1112 can include decoder 502 or 504 for performing various operations in proposer 404 and ranker 412. For example, decoders 1112 can include a forecasting decoder for generating forecasts in proposer 404. Decoders 1112 can include a decision-making decoder for generating decision values for decisions in proposer 404 or ranker 412. Decoders 1112 can include a forecasting decoder for generating forecasts in ranker 412. Decoders 1112 can include a forecasting decoder for generating conditional forecasts in ranker 412 conditioned on proposed trajectories 410.

Figure 12:
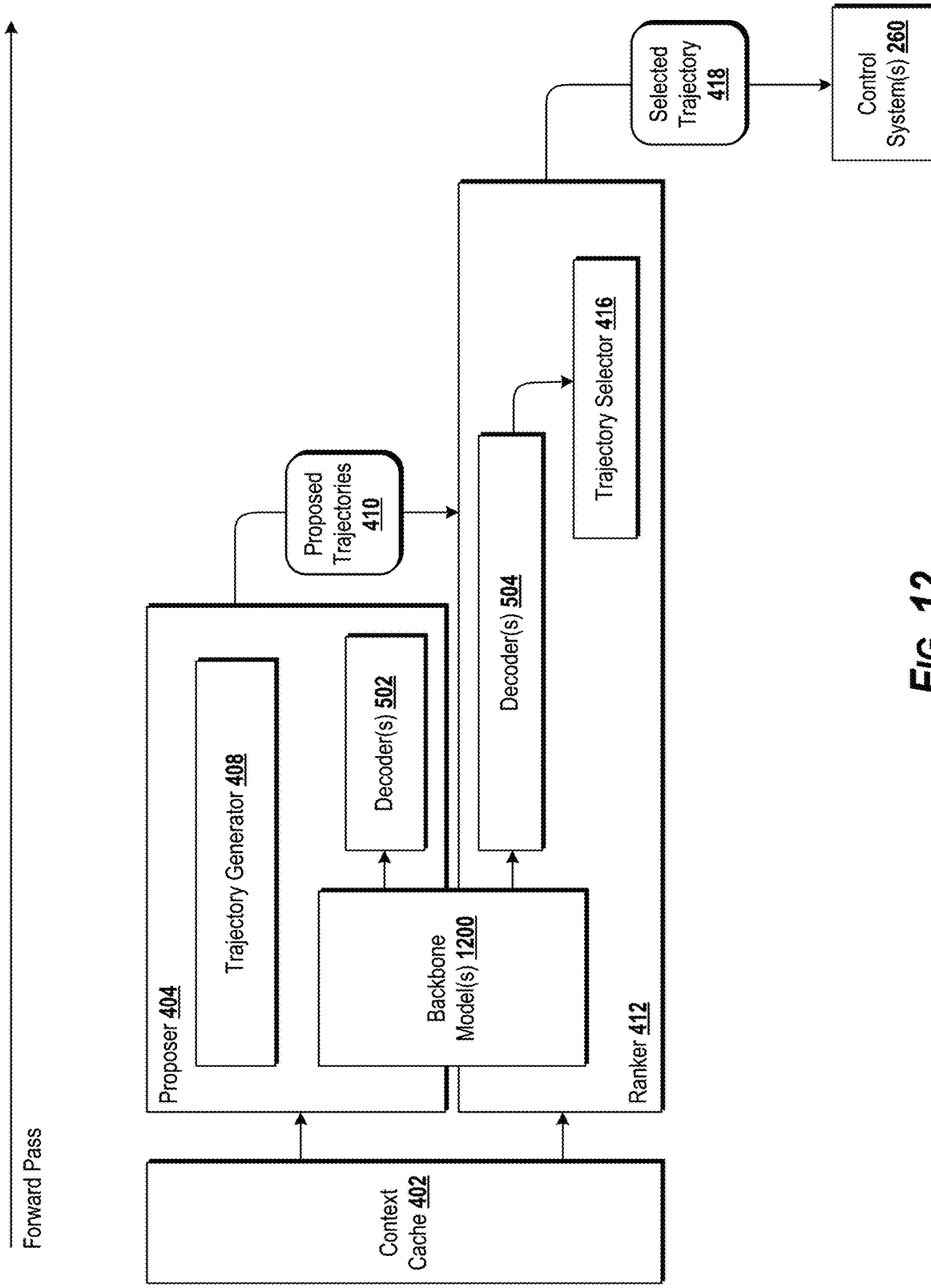
FIG. 12 is a block diagram of components of an example motion planning system, according to some implementations of the present disclosure.

FIG. 12 is a block diagram of an example multistage motion planning system according to some aspects of the present disclosure. FIG. 12 is drawn to indicate an example processing sequence (not to scale) for a forward pass through an example implementation of planning system 250. One or more backbone models 1200 can include a single shared instance or distinct instances of a backbone model architecture as described with respect to FIGS. 6, 7, and 8.

A processing cycle can begin by building context cache 402. Trajectory generation 408 can access context cache 402 and begin generating proposed trajectories 410.

Backbone model 1200 can execute in parallel with trajectory generator 408. In implementations in which trajectories are generated independently of backbone model 1200, backbone model 1200 can operate agnostic to a current status of trajectory generator 408.

Execution of backbone model 1200 can include a single forward pass through a shared model. The latent state or other generated values can be passed from the model to both decoder 502 and decoder 504. Execution of backbone model 1200 can include a forward pass by proposer 404 through an instance of a shared model and a forward pass by ranker 412 through another instance of the shared model. Execution of backbone model 1200 can include a forward pass by proposer 404 through a proposer-adapted backbone model and a forward pass by ranker 412 through a ranker-adapted backbone model.

Similarly, decoder 502 can operate in parallel with trajectory generator 408.

Decoder 504 can include machine-learned models that ingest proposed trajectories 410 to generate inferences. Decoder 504 can include costing models that produce trajectory costs for proposed trajectories 410 based on the latent state and proposed trajectories 410. Decoder 504 can include forecasting models that produce conditional forecasts based on proposed trajectories 410. In such configurations, at least a portion of decoder 504 can execute in series after trajectory generator 408. At least a portion of trajectory selector 416 can execute in series based on outputs of decoder 504. At least a portion of trajectory selector 416 can operate in parallel with decoder 504 for forecast-independent costs (e.g., inherent costs due to trajectory characteristics, such as heuristic-based or engineered costs).

Figure 13:
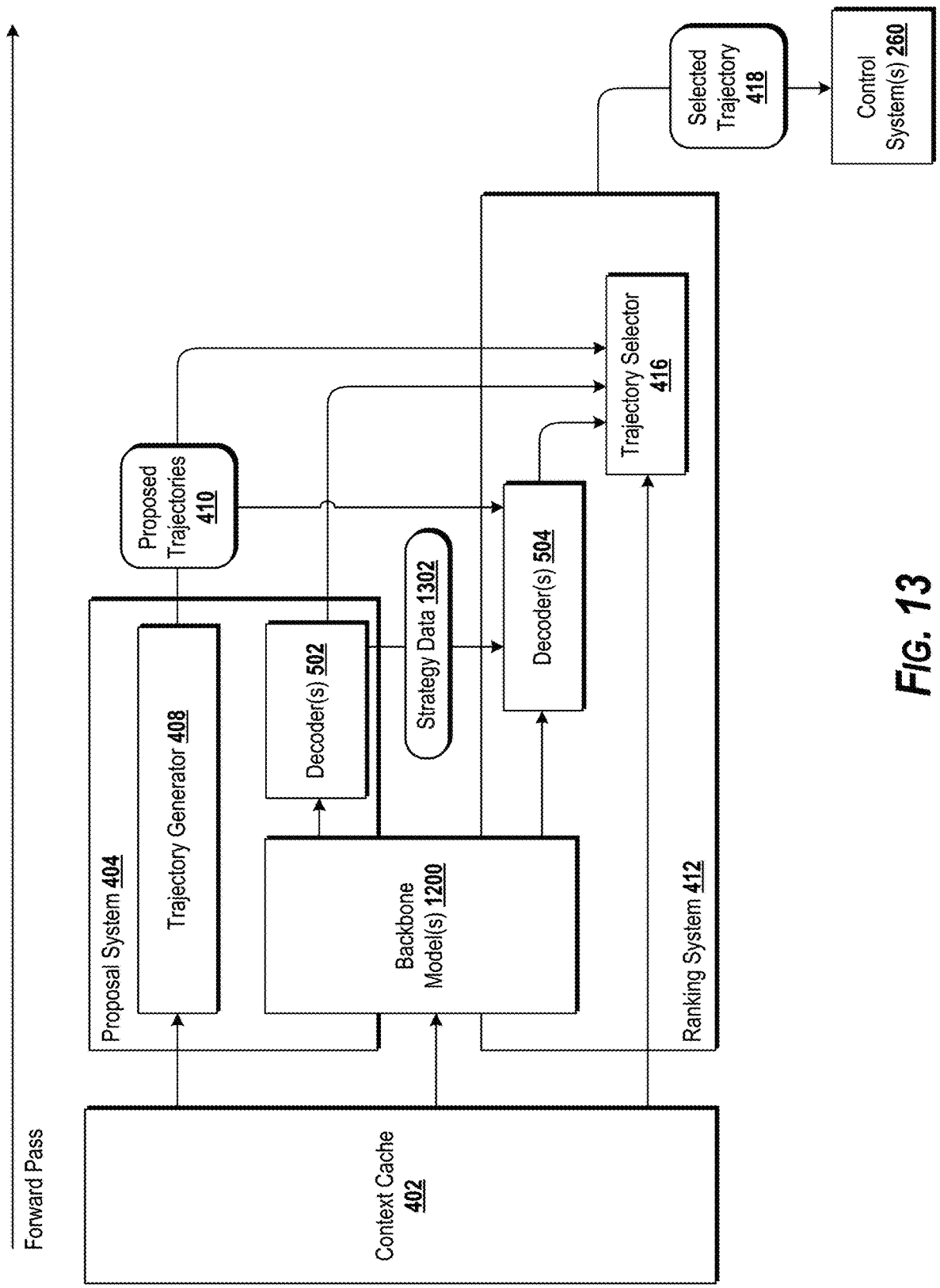
FIG. 13 is a block diagram of components of an example motion planning system, according to some implementations of the present disclosure.

FIG. 13 is a block diagram of an example multistage motion planning system according to some aspects of the present disclosure. FIG. 13 is drawn to indicate an example processing sequence (not to scale) for a forward pass through an example implementation of planning system 250. The processing flow can be substantially the same as various implementations described with respect to FIG. 12, except that values generated within ranker 412 can be at least partly conditioned on outputs of proposer 404.

For example, decoder 504 can ingest strategy data 1302 based on outputs of decoder 502. Decoder 504 can ingest proposed trajectories 410 to generate outputs that are conditioned on proposed trajectories 410 (e.g., explicit or implicit forecast data, such as trajectory costs that encode forecasted interactions in an environment). In this manner, for instance, processing of data from context cache 402 by backbone model 1200 can occur in parallel with trajectory generation while final computation can be dependent upon (and thus initiate after at least partial completion of) outputs of proposer 404.

Strategy data 1302 can include data describing one or more discrete decisions evaluated with respect to navigating the environment. Strategy data 1302 can include selected decision values for one or more decisions. Strategy data 1302 can include complete strategies. Strategy data 1302 can include decision values for individual decisions (e.g., high-confidence decisions).

While one or more decoders 504 can be conditioned on outputs of one or more decoders 502, backbone model 1200 can operate as in FIG. 12. For instance, execution of backbone model 1200 can include a single forward pass through a shared model. The latent state or other generated values can be passed from the model to decoders 502. When one or more decoders 504 initiate processing, one or more of decoders 504 can retrieve the latent state (e.g., from a cache) to process in view of outputs from proposer 404 (e.g., strategy data 1302, proposed trajectories 410).

Execution of backbone model 1200 can include a forward pass by proposer 404 through an instance of a shared model and a forward pass by ranker 412 through another instance of the shared model. Execution of backbone model 1200 can include a forward pass by proposer 404 through a proposer-adapted backbone model and a forward pass by ranker 412 through a ranker-adapted backbone model.

Figure 14:
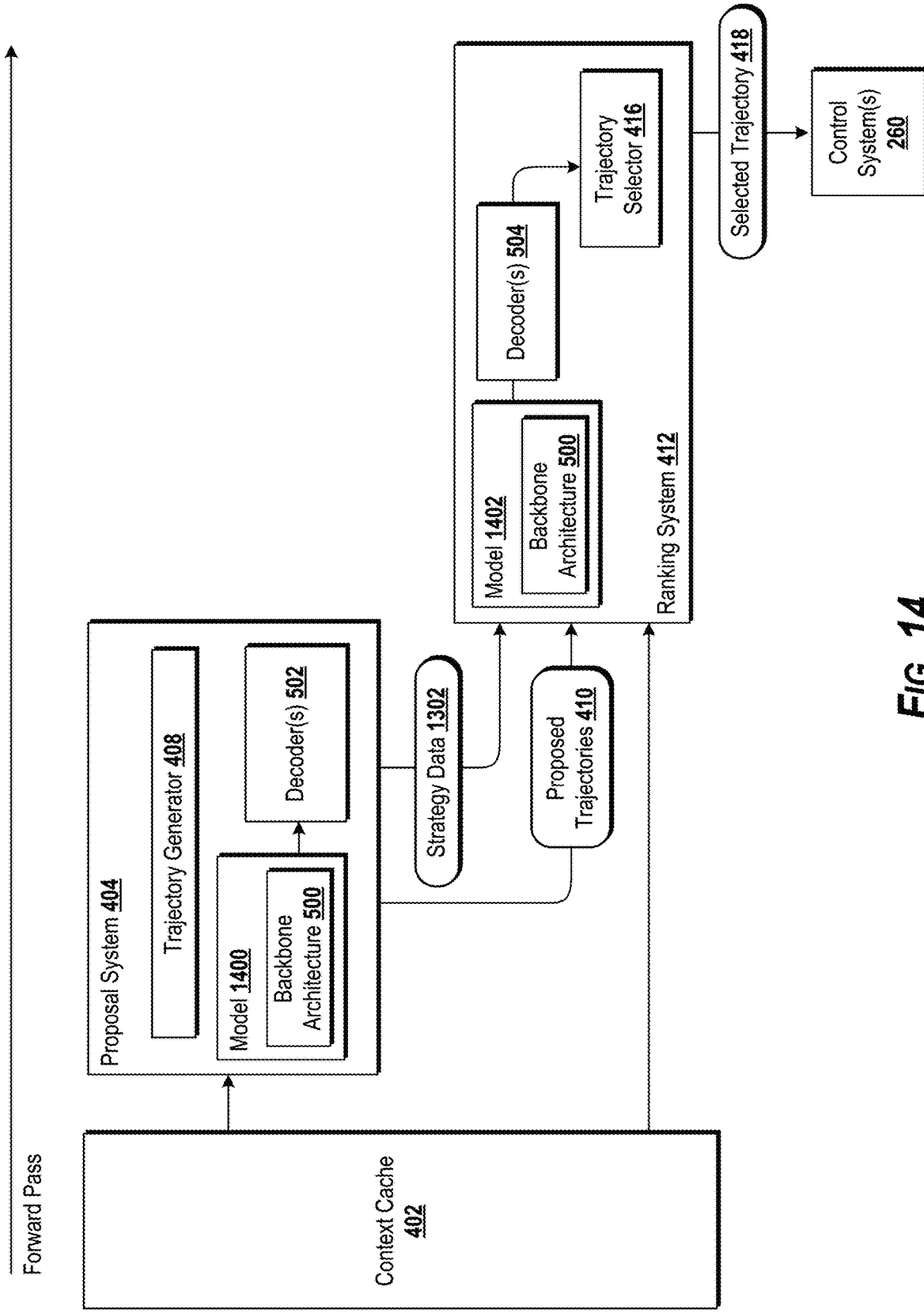
FIG. 14 is a block diagram of components of an example motion planning system, according to some implementations of the present disclosure.

FIG. 14 is a block diagram of an example multistage motion planning system according to some aspects of the present disclosure. FIG. 14 is drawn to indicate an example processing sequence (not to scale) for a forward pass through an example implementation of planning system 250. The processing flow can be substantially the same as various implementations described with respect to FIGS. 12 and 13, except that values generated by a backbone architecture 500 for ranker 412 can be conditioned on outputs of proposer 404.

As illustrated in FIG. 14, proposer 404 can generate proposed trajectories 410 and strategy data 1302. Proposer 404 can implement a backbone model 1400 having backbone architecture 500.

Ranker 412 can use backbone model 1402 (also having backbone architecture 500) to generate a new scene understanding from context cache 402 conditioned on the outputs of proposer 404. For example, backbone model 1402 can ingest proposed trajectories 410 to generate a scene understanding that is fully conditioned on autonomous vehicle trajectories. In this manner, for instance, ranker 412 can re-build scene understandings conditioned on (e.g., reactive to) candidate trajectories and strategies that the autonomous vehicle can execute.

Proposed trajectories 410 can be passed into model 1402 in a batch (e.g., along a batch dimension). This batch dimension can be added to the values computed using model 1402, such that proposed trajectories 410 can be processed in parallel to generate respectively conditioned world states that are output in parallel.

For example, with reference to FIGS. 11A to 11D, proposed trajectories 410 can inform goals for AV 1002 and thus be encoded into an initial state of $n_{AV}$. In this manner, the interactions and relationships between $n_{AV}$ and other nodes can all be affected by and react to the candidate trajectory being processed. For multiple candidate trajectories in an input tensor having a batch dimension, each node and each edge can be expanded along the batch dimension. Computations along the batch dimension can be processed in parallel.

Figure 15:
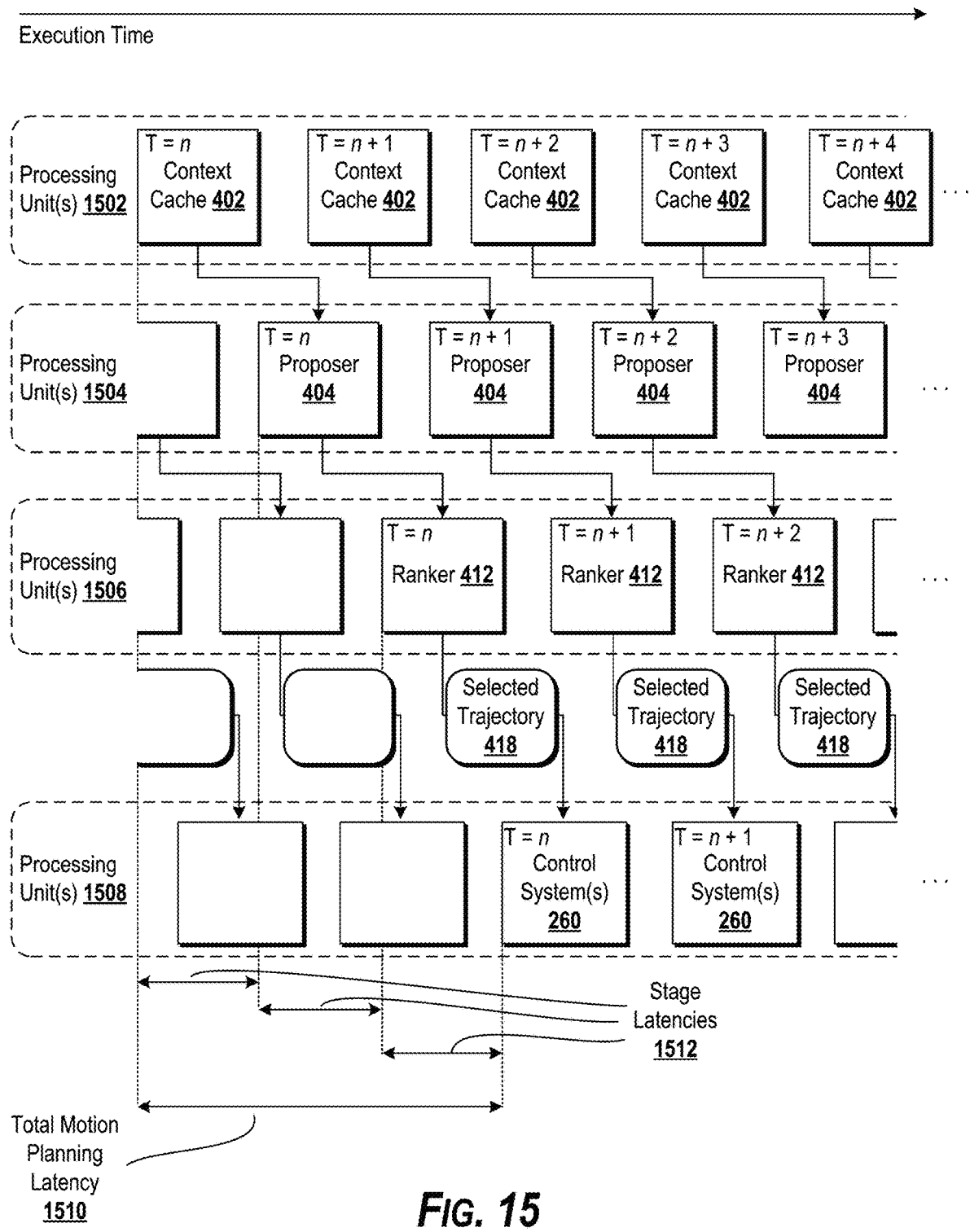
FIG. 15 is a block diagram of a pipelined example motion planning system, according to some implementations of the present disclosure.

FIG. 15 is a block diagram of a pipelined multistage architecture of proposer 404 and ranker 412. For a motion planning cycle with respect to a state of the environment at T=n, processing units 1502 can build context cache 402. After completion of at least a portion of context cache 402, processing units 1504 can execute proposer 404. After generating at least a portion of outputs of proposer 404, outputs can be streamed or passed batchwise to processing units 1506 for executing ranker 412. Control system 260 executed by processing units 1508 can process selected trajectory 418 for execution to navigate the environment.

After processing units 1502 complete building context cache 402, processing units 1502 can begin building another context cache 402 descriptive of a state of the environment at T=n+1. Processing units 1502 can be configured such that (e.g., by adjusting the computational resources available to processing units 1502) the building of context cache 402 for T=n+1 can progress sufficiently such that, after processing units 1504 complete execution of proposer 404 for T=n, processing units 1504 can directly proceed to initiate another execution of proposer 404 for T=n+1 based on context cache 402 for T=n+1. By configuring processing units 1502 such that context cache 402 for a subsequent cycle is ready to go when needed, processing units can be operated with improved efficiency and utilization.

Similarly, processing units 1504 can be configured such that (e.g., by adjusting the computational resources available to processing units 1504) the execution of proposer 404 for T=n+1 can progress sufficiently such that, after processing units 1506 complete execution of ranker 412 for T=n, processing units 1506 can directly proceed to initiate another execution of ranker 412 for T=n+1 based on outputs of proposer 404 for T=n+1.

Similarly, processing units 1506 can be configured such that (e.g., by adjusting the computational resources available to processing units 1506) the execution of ranker 412 for T=n+1 can progress sufficiently such that, after processing units 1508 complete execution of control system 260 for T=n, processing units 1508 can directly proceed to initiate another execution of control system 260 for T=n+1 based on a new selected trajectory 418 for T=n+1.

In this manner, after reaching steady state, processing bandwidth across processing units 1502 to 1508 can be saturated.

Processing units 1502, 1504, 1506, 1508 can respectively include real or virtual processors, processor cores, or processing threads that can operate in a non-blocking or asynchronous manner. For instance, each of processing units 1502, 1504, 1506, 1508 can be configured with sufficient access to computing resources (e.g., processing cores, SRAM, HBM, DRAM, other caches) to perform its assigned tasks without blocking or delaying other processing units from performing their tasks.

Processing units 1502, 1504, 1506, 1508 can be configured on the same device or on different devices (e.g., connected by a high-speed bus). Processing units 1502, 1504, 1506, 1508 can be configured using different types of devices or processors. One or more of processing units 1502, 1504, 1506, 1508 can be configured with at least one CPU core. One or more of processing units 1502, 1504, 1506, 1508 can be configured with at least one GPU core. One or more of processing units 1502, 1504, 1506, 1508 can be configured with at least one CPU core and at least one GPU core. At least one of processing units 1502, 1504, 1506, 1508 can include ASIC or FPGA processors that are adapted for the tasks assigned to that processing unit.

The pipelined architecture can be parallelized across multiple dimensions. The pipelined architecture can implement data parallel processing for some processes. For instance, within a set of processing units, portions of a given processing task are segmented and assigned to separate processors for processing in parallel. For instance, separate parallel processors can be assigned to build different portions of context cache 402.

The pipelined architecture can implement tensor parallel processing for some processes. For instance, various components of the models implemented by the pipelined architecture can be distributed across multiple different processors to compute different subcomponents of a given task. The subcomponents can be combined or aggregated to reconstruct the final output of the models.

The pipelined architecture can implement a weight-stationary parallelization scheme for some processes. For example, weights of a backbone model architecture 500 can be numerous and expensive to load in and out of a processor memory. As such, it can be less computationally expensive to maintain portions of the weights in memory of processors and shuffle intermediate computations therebetween to compute the output.

The pipelined architecture can opt to not hold weights stationary for some processes. For instance, for large batch sizes, the data being processed by a model can be large in comparison to the model itself. As such, it can be less computationally expensive to hold a current state of a batch of intermediate computations in memory of processors and shuffle model weights therebetween to compute the output.

A total motion planning latency 1510 can describe an interval between beginning to build context cache 402 and delivering selected trajectory 418 for execution. A total motion planning latency can describe a time used by planning system 250 to understand a scenario and generate a plan for responding to the scenario. Total motion planning latency 1510 can decompose into a number of individual stage latencies 1512, such as a latency between initiating the build of context cache 402 and initiating execution of proposer 404, a latency between initiating execution of proposer 404 and initiating execution of ranker 412, a latency between initiating execution of ranker 412 and initiating execution of a selected trajectory 418 by control system 260.

For example, total motion planning latency 1510 can be less than about 200 ms, such as less than about 150 ms, such as less than about 125 ms, such as less than about 100 ms. In some examples, building a context cache can consume about ⅕ of total motion planning latency 1510. In some examples, executing proposer 404 can consume about ⅖ of total motion planning latency 1510. In some examples, executing ranker 412 can consume about ⅖ of total motion planning latency 1510.

A latency budget can set an upper limit on total motion planning latency 1510. Latency caps on respective stages can be derived from the total latency budget. To meet latency caps, processing power can be increased. To meet latency caps, a quantity of data processed can be reduced (e.g., an amount of candidate trajectories considered). To meet latency caps, an amount of parallelization or shared work can be increased across each stage.

Figure 16:
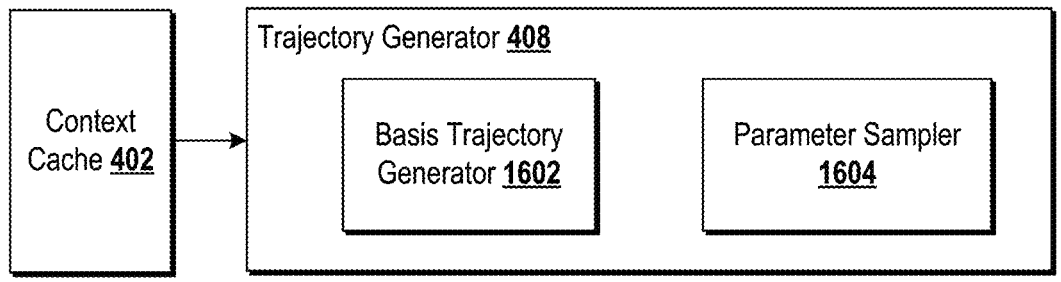
FIG. 16 is a block diagram of components of an example motion planning system, according to some implementations of the present disclosure.

FIG. 16 is a block diagram of an example trajectory generator 408, according to some aspects of the present disclosure. Trajectory generator 408 can include a basis trajectory generator 1602 that can generate basis paths that anchor a given candidate trajectory. The basis trajectory can be parameterized using one or more parameters. Trajectory generator 408 can include a parameter sampler 1604 that can generate a set of values for the parameters that characterize or modify the basis trajectory.

Basis trajectory generator 1602 can process map geometry and other map information and select a nominal path to anchor one or more candidate trajectories. For instance, a basis path can trace a centerline of a lane. The basis path can be selected based on initial scene information from context cache 402, such as actor data (e.g., actor state data) and ego vehicle state data.

A basis trajectory can include basis geometry for the path. A basis trajectory can include a basis velocity profile for traversing the path. The velocity profile can be selected based on the scene context (e.g., speed of traffic, speed limit, etc.).

In some environments, lightweight optimization can be applied to refine the basis trajectory. For instance, in certain environments a steering optimizer (e.g., an iterative optimizer) can refine a curvature of the basis trajectory to minimize various costs (e.g., center deviation, boundary overlap, etc.). This optimizer can selectively run based on a detected context from context cache 402. For instance, the optimizer can run for planning trajectories on surface streets but be omitted on highways.

Parameter sampler 1604 can obtain parameter values that characterize basis trajectories. Parameter values can include modifications to basis trajectories (e.g., deviations, such as lateral deviations from a given point or time step of the trajectory). Parameter values can include control parameters for causing the autonomous vehicle to traverse the trajectory (e.g., a steering input, etc.). Parameter values can be defined relative to the basis trajectory (e.g., delta values applied to the basis trajectory) or absolutely (e.g., standalone values to parameterize the trajectory).

Parameter sampler 1604 can sample parameter values based on observed actor and autonomous vehicle states. Parameter sampler 1604 can implement constrained sampling. For instance, a curvature of the map geometry in combination with a preferred lateral acceleration target can be used to compute a speed constraint at that point in the map.

Figure 17:
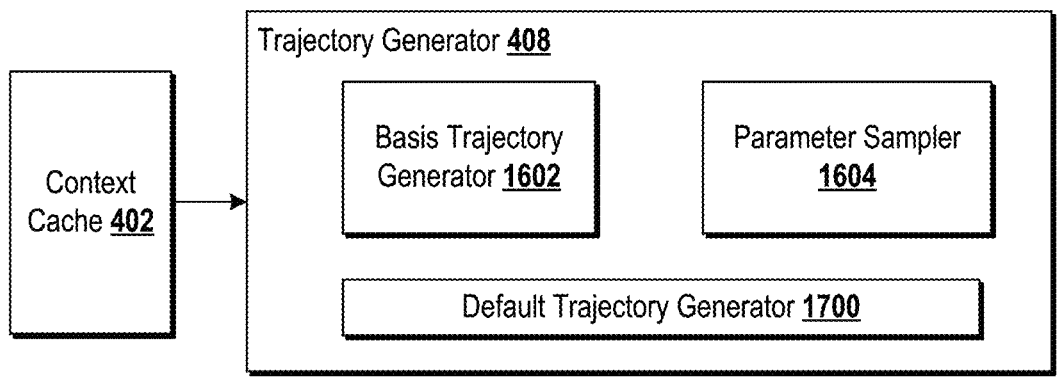
FIG. 17 is a block diagram of components of an example motion planning system, according to some implementations of the present disclosure.

FIG. 17 is a block diagram of an example trajectory generator 408, according to some aspects of the present disclosure. A default trajectory generator 1700 can supplement the sampled trajectory set with a set of default template trajectories that vary in control options.

For example, default trajectory generator 1700 can provide a standard package of trajectories that follow an engineered template. Default trajectory generator 1700 can include trajectory modes that are selected such that proposed trajectories 410 can guarantee coverage of common trajectory modes.

For instance, default trajectory generator 1700 can generate, for a given context, a set of lane-following trajectories with velocity profiles adapted based on the scene context. Default trajectory generator 1700 can generate, for a given context, a set of lane-changing or evasive trajectories with velocity profiles adapted based on the scene context. Default trajectory generator 1700 can generate, for a given context, a set of hard stop or shouldering trajectories with velocity profiles adapted based on the scene context. In this manner, for instance, an example trajectory generator 408 can ensure proposed trajectories 410 provide coverage of at least a default set of trajectories each cycle. This can be especially advantageous to ensure coverage of long-tail trajectories that might be uncommon or rare in training datasets.

Figure 18:
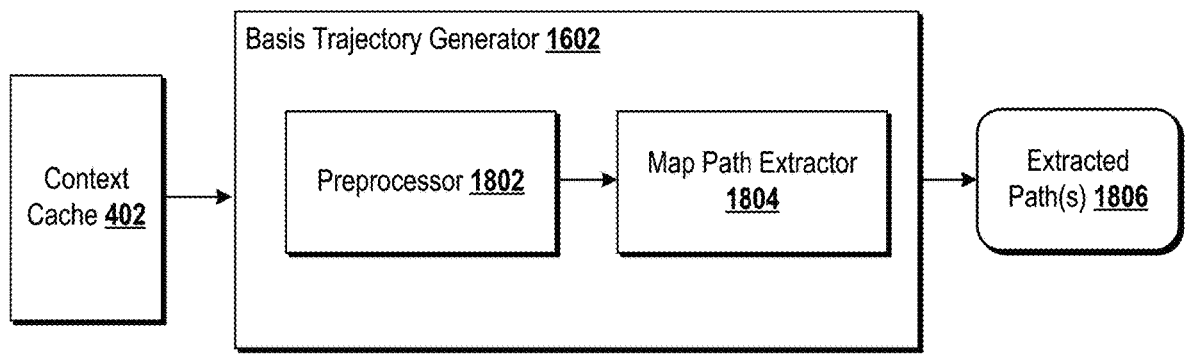
FIG. 18 is a block diagram of components of an example motion planning system, according to some implementations of the present disclosure.

FIG. 18 is a block diagram of an example basis trajectory generator 1602 according to example aspects of the present disclosure. A preprocessor 1802 can process data from context cache 402 to determine salient context features, such as actor tracks and corresponding streams, vehicle state information, roadway data, etc. Based on this preprocessing, a map path extractor 1804 can generate extracted paths 1806 that can form the basis trajectories.

Preprocessor 1802 can process data from context cache 402 to determine relevant lanes or actor streams. Preprocessor 1802 can use actor track data to extrapolate future motions (e.g., using rapid ballistic computations).

Preprocessor 1802 can include one or more learned components that can prioritize data from context cache 402. Preprocessor 1802 can be trained to focus on map geometry most likely to support a correct output trajectory. For example, preprocessor 1802 can be trained end-to-end within planning system 250 to improve a likelihood of outputting trajectories that align with human exemplar trajectories.

Map path extractor 1804 can extract map segments or portions of a map graph to form a basis path. Map path extractor 1804 can extract one path per relevant lane or stream.

Extracted paths 1806 can include continuous splines or discretized points tracing a map segment. Extracted paths 1806 can extend to a horizon. A horizon can be a spatial horizon, such as a distance from an ego vehicle. A horizon can be a temporal horizon, such that a basis trajectory describes a baseline motion over a time interval (e.g., a cycle time of planning system 250). A horizon can be fixed or variable.

Figure 19:
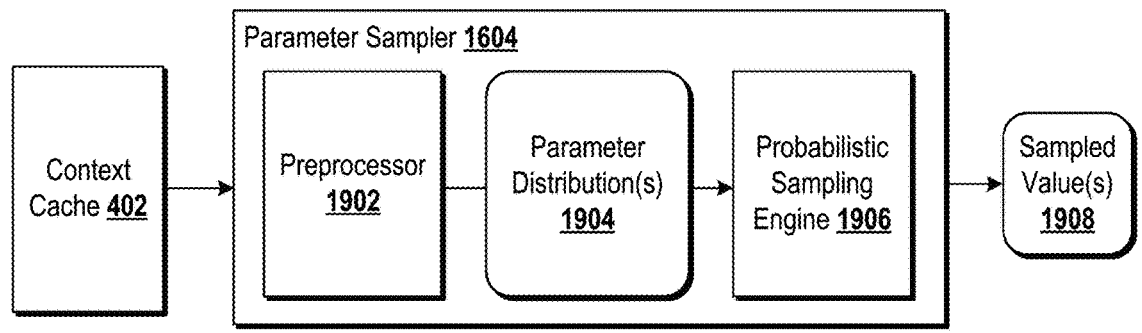
FIG. 19 is a block diagram of components of an example motion planning system, according to some implementations of the present disclosure.

FIG. 19 is a block diagram of an example parameter sampler 1604 according to example aspects of the present disclosure. A preprocessor 1902 can process data from context cache 402 to determine appropriate ranges of values to sample. Based on parameter distribution 1904 obtained during this preprocessing, a probabilistic sampling engine 1906 can generate sampled values 1908.

Preprocessor 1902 can process data from context cache 402 to identify relevant road curvature, speed limits, weather, vehicle capabilities, load characteristics, and other aspects that would inform appropriate selection of parameters of a trajectory. Preprocessor 1902 can output bounds, constraints, distributions, or other descriptions of appropriate ranges of parameters for sampled trajectories. Preprocessor 1902 can evaluate ranges for each basis trajectory of a set of basis trajectories received from basis trajectory generator 1602. Preprocessor 1902 can operate over multiple basis trajectories in parallel.

Preprocessor 1902 can include one or more learned components that can process data from context cache 402. Preprocessor 1902 can be trained to focus on context data most likely to support a correct output trajectory. For example, preprocessor 1902 can be trained end-to-end within planning system 250 to improve a likelihood of outputting trajectories that align with human exemplar trajectories.

Parameter distribution 1904 can indicate one or more constraints for a range of sampled parameters. Parameter distribution 1904 can indicate a maximum or minimum value. Parameter distribution 1904 can provide a prior distribution from which parameter values can be sampled.

Probabilistic sampling engine 1306 can generate random samples based on parameter distribution 1904. Probabilistic sampling engine 1306 can conduct random sampling. Probabilistic sampling engine 1306 can conduct random sampling according to a prior distribution that is determined by parameter distribution 1904.

Figure 20:
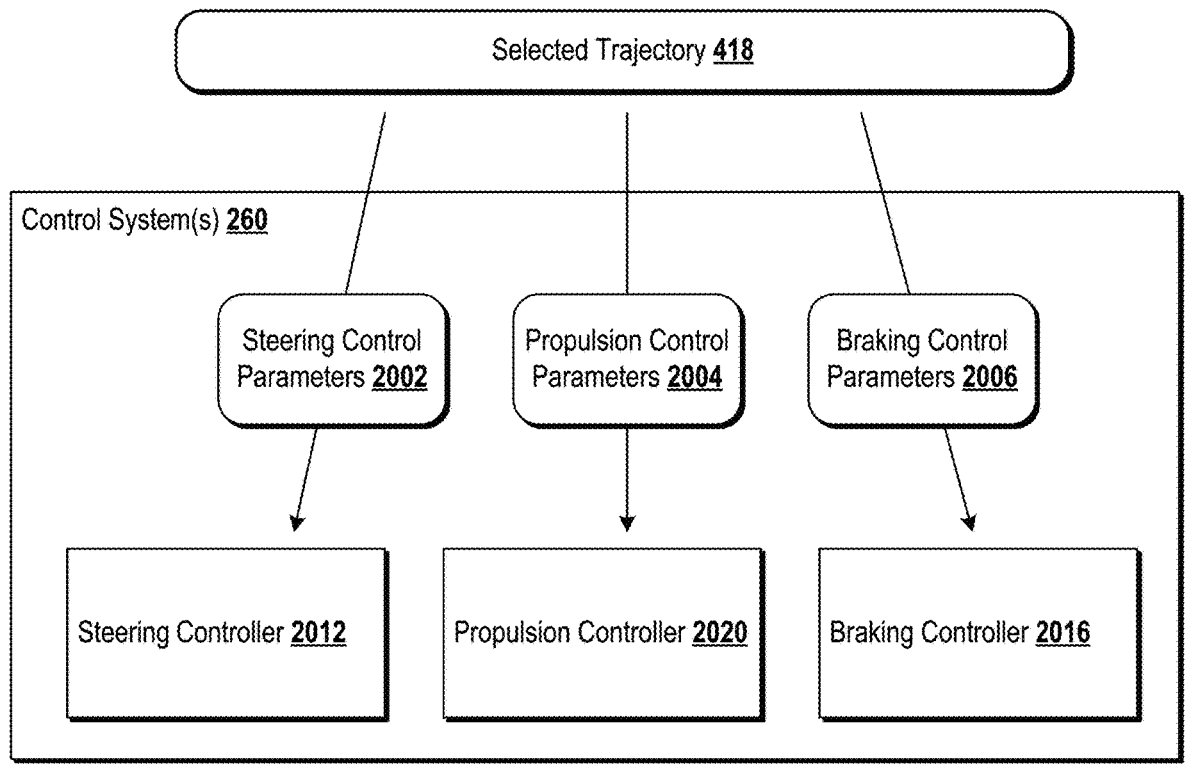
FIG. 20 is a block diagram of components of an example motion planning system, according to some implementations of the present disclosure.

FIG. 20 is a block diagram of a system executing a selected trajectory 418 according to example aspects of the present disclosure. Selected trajectory 418 can be characterized using parameters that can be processed and executed by control system 260 without further optimization.

For example, control system 260 can obtain steering control parameters 2002, propulsion control parameters 2004, and braking control parameters 2006 based on selected trajectory 418. These parameters can be configured for execution by steering controller 2012, propulsion controller 2014, and braking controller 2016, respectively, for controlling a motion of the autonomous vehicle.

Control system 260 can obtain steering control parameters 2002, propulsion control parameters 2004, and braking control parameters 2006 by applying closed-form transforms of the parameters in selected trajectory 418. For instance, control system 260 can apply physics-based and kinematics models to parameters of selected trajectory 418 to obtain steering control parameters 2002, propulsion control parameters 2004, and braking control parameters 2006 without numerical or other iterative optimizations.

Steering control parameters 2002 can include, for instance, a steering angle, a path curvature, a steering actuator input level, etc. Propulsion control parameters 2004 can include an acceleration, a throttle position, a gear selection and timing thereof, etc. Braking control parameters 2006 can include a brake actuator force, a deceleration rate, etc.

A steering controller 2012 can map steering control parameters 2002 to a domain of actuator input values. Mapping can include closed-form expression (e.g., without optimization or numerical solution). Mapping can be based on ballistics, kinematics, or other physical closed-form models of steering behavior.

A propulsion controller 2014 can map propulsion control parameters 2004 to a domain of actuator input values. Mapping can include closed-form expression (e.g., without optimization or numerical solution). Mapping can be based on ballistics, kinematics, or other physical closed-form models of propulsion behavior.

A braking controller 2016 can map braking control parameters 2006 to a domain of actuator input values. Mapping can include closed-form expression (e.g., without optimization or numerical solution). Mapping can be based on ballistics, kinematics, or other physical closed-form models of braking behavior.

Figure 21:
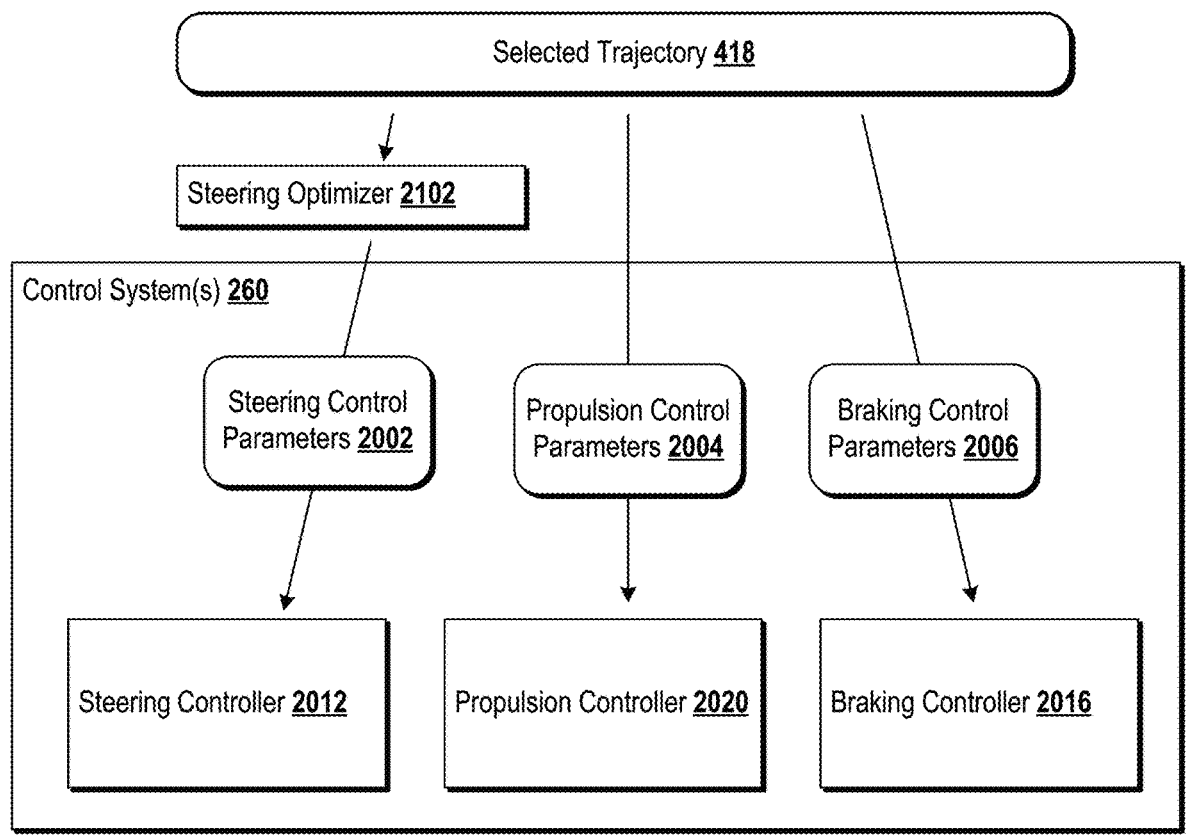
FIG. 21 is a block diagram of components of an example motion planning system, according to some implementations of the present disclosure.

FIG. 21 is a block diagram of a system using partial optimization of parameters of an example selected trajectory 418 according to example aspects of the present disclosure. Selected trajectory 418 can be characterized using some parameters that can be processed and executed by control system 260 without further optimization. Selected trajectory 418 can be characterized using at least some parameters that can be processed and executed by control system 260 with further optimization. For example, steering control parameters 2002 can be optimized by steering optimizer 2102 before execution by control system 260.

Steering optimizer 2102 can include an iterative optimizer, such as an iLQR-based optimizer. Steering optimizer 2102 can be engaged based on scene context. Steering optimizer 2102 can be engaged based on an available maneuvering space for a given scenario. For instance, steering optimizer 2102 can be engaged based on a lane width determined from context cache 402.

Steering optimizer 2102 can be engaged based on a latency budget for a given environment (e.g., based on a desired response time of the vehicle). Response times can be configured to be faster at higher speeds of travel. Steering optimizer 2102 can be initiated, for example, for driving on surface streets. Steering optimizer 2102 can be omitted for driving on highways.

Steering optimizer 2102 can be executed by control system 260. Steering optimizer 2102 can be implemented in trajectory generator 408 (e.g., when selected trajectory 418 is generated). Steering optimizer 2102 can be implemented in ranker 412 (e.g., for refined comparison of top-K trajectories).

Other parameters can be selectively optimized as well. For instance, one or more parameters of selected trajectory 418 can be selectively optimized in triggering scenarios.

To improve the performance of an autonomous platform, such as an autonomous vehicle controlled at least in part using autonomy system 200 (e.g., the autonomous vehicles 310 or 350), the autonomous platform can implement decision pinning techniques as described herein.

Figure 22:
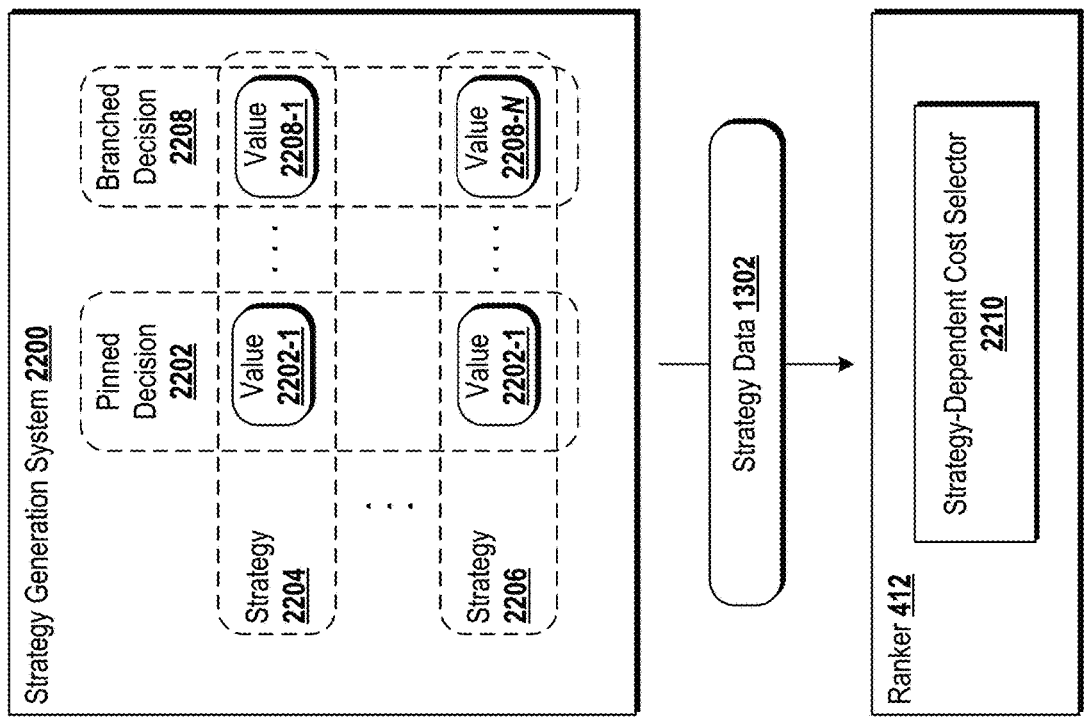
FIG. 22 is a block diagram of components of an example motion planning system, according to some implementations of the present disclosure.

FIG. 22 is a block diagram of an example strategy generation system 2200 according to example aspects of the present disclosure. Planning system 250 can implement a strategy generation system 2200 (e.g., using proposer 404) to ingest data describing the environment and reason over possible strategies for navigating the environment. A strategy can include a discrete decision that the autonomous vehicle can decide with respect to an object or other feature of an environment. A strategy can include a decision value for each decision that is before the autonomous vehicle (e.g., yield to one actor, not yield to another actor, etc.). In this manner, for instance, a strategy can define a goal or set of goals for the autonomous vehicle. Planning system 250 can use strategies to evaluate how well various trajectories help achieve the goals of the autonomous vehicle.

Multiple candidate strategies can be considered to help the autonomous vehicle identify goals that are achievable with low cost. However, evaluating trajectories against a number of different strategies can become computationally expensive as the number of strategies to consider increases. Thus, strategy generation system 2200 can reduce the number of strategies considered by "pinning" a given decision to a decision value that is expected to be correct with confidence sufficiently high that strategies that contain other decision values for that decision can be deprioritized (e.g., ignored, moved to back of queue, etc.).

For instance, strategy generation system 2200 can identify a pinned decision 2202. Pinned decision 2202 can have one value 2202-1 that is scored so confidently that strategy generation system 2200 shares value 2202-1 across all strategies, including strategy 2204, . . . , strategy 2206. An example pinned decision is provided with reference to FIG. 23.

Figure 23:
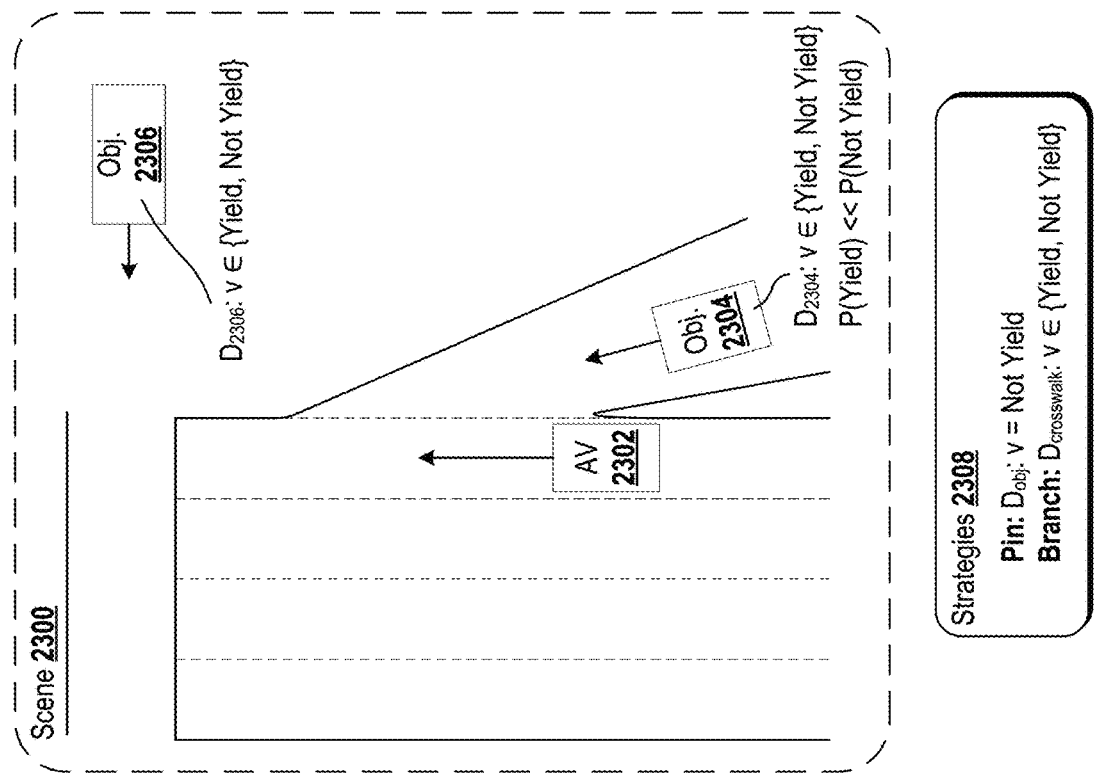
FIG. 23 is an illustration of an example driving scene, according to some implementations of the present disclosure.

FIG. 23 illustrates a driving scene 2300 in which an autonomous vehicle 2302 is being approached from the rear right angle by an object 2304. An example decision with respect to the object, labeled as $D_{2304}$, can have values selected from the set {Yield, Not Yield}, with "Yield" corresponding to braking and slotting behind object 2304 and "Not Yield" corresponding to maintaining speed and remaining ahead of object 2304. Given that autonomous vehicle 2302 is leading object 2304, and object 2304 is maintaining normal merging behavior, then a likelihood that autonomous vehicle 2302 should yield to object 2304 may be very low. For instance, planning system 250 can generate a score for v="Yield" that indicates a low likelihood of being an appropriate choice. Accordingly, strategies 2308 can pin $D_{2304}$ to the value "Not Yield." Strategies that might include other values for $D_{2304}$ can be deprioritized.

With reference again to FIG. 22, strategy generation system 2200 can identify a branched decision 2208. Branched decision 2208 can be associated with a plurality of candidate decision values 2208-1, . . . , 2208-M that do not admit a clearly obvious selection. For instance, likelihoods computed for each decision value may not overwhelmingly favor one decision value over another.

FIG. 23 also illustrates an object 2306 approaching an intersection that the autonomous vehicle 2302 is also approaching. An example decision with respect to object 2306, labeled as $D_{2306}$, can have values selected from the set {Yield, Not Yield}, with "Yield" corresponding to braking in expectation that object 2306 will pull out and "Not Yield" corresponding to maintaining speed. This decision can be influenced depending on the plans selected for AV 2302. For instance, a planned speed of AV 2302 compared to a speed of object 2306 and costs computed for interactions between AV 2302 and object 2306 can vary based on different trajectories selected for AV 2302. For instance, AV 2302 could change lanes instead of yielding. As such, in contrast to $D_{2304}$, $D_{2306}$ might not readily admit an obvious choice. Thus, strategies 2308 can be generated based on pinning $D_{2304}$ and branching over the candidate decision values for $D_{2306}$.

With reference again to FIG. 22, candidate decision values 2208-1, . . . , 2208-M for branched decision 2208 can be distributed across multiple strategies 2204, . . . , 2206. In this manner, for example, the set of strategies can leave options open for the autonomous vehicle to implement different decision values with respect to branched decision 2208.

Strategy generation system 2200 can be or include a backbone model that implements backbone architecture 500. For example, strategy generation system 2200 can obtain values for various decisions using a decoder 502 that processes values from a backbone model. For example, a decoder 502 can output values directly in association with a reference to a given actor (e.g., {"Obj. 2304": "Y"}).

Strategy generation system 2200 can evaluate or otherwise compute decision values based on marginal actor forecasts. For instance, at an initial stage of high-level scene understanding (e.g., in proposer 404), strategy generation system 2200 can use explicit or implicit predictions of likely actor movements to reason over a set of high-level discrete decisions. Downstream (e.g., in ranker 412), explicit or implicit conditional forecasts can be used for selecting the ultimately preferred autonomous vehicle behavior.

Pinned decision 2202 can include a decision that is associated with a decision value 2202-1 that has a confidence satisfying a confidence metric. For example, a backbone model (or a decoder thereof) can be configured to explicitly or implicitly determine a confidence associated with its predictions. The backbone model (or a decoder thereof) can be configured to regress a likelihood that a particular decision value is correct. The confidence can be based on a logit value in an output layer of the model.

For example, a score associated with a decision value 2202-1 can be compared against a threshold. The threshold can be defined with respect to an absolute scale (e.g., score must exceed a threshold value). The threshold can be defined with respect to a relative scale (e.g., score must be a threshold distance from scores of other candidate values for the decision).

Based on decision 2202 being pinned, strategies 2204 and 2206 can each inherit the pinned decision value 2202-1.

Branched decision 2208 can include a decision that is associated with candidate decision values that do not have corresponding confidence values that satisfy a confidence metric. For instance, scores associated with decision values 2208-1, . . . , 2208-N can be compared against a threshold. The threshold can be defined with respect to an absolute scale (e.g., score must exceed a threshold value). The threshold can be defined with respect to a relative scale (e.g., score must be a threshold distance from scores of other candidate values for the decision). Strategy generation system 2200 can determine that none of decision values 2208-1, . . . , 2208-N satisfy a confidence metric such that decision 2208 should be pinned. If not pinned, decision 2208 can be branched.

Based on branched decision 2208 being branched, different strategies of 2204, . . . , 2206 can include different candidate decision values 2208-1, . . . , 2208-N. A branched decision 2208 can be explicitly enumerated. For instance, candidate decision values 2208-1, . . . , 2208-N. can be enumerated for constructing strategies for further evaluation. One or more branched decisions 2208 can be implicit. For instance, an implicit branched decision 2208 can be a decision for which the system 2200 does not enumerate candidate decision values. Decision-independent costs in ranker 412 can process strategies without constraint from the implicit branched decision 2208. The decision values 2208-1, . . . , 2208-N for the implicit branched decision 2208 (e.g., whether to yield or not yield at $D_{2306}$, whether to instead change lanes to go around, etc.) can flow from the costs assigned to trajectories that implement the respective decision values 2208-1, . . . , 2208-N.

One or more decisions can be pinned and one or more decisions can be branched. A decision can be pinned based on a type or a category of the decision, a distance from an actor that is the subject of the decision, etc. For instance, merging decisions as a category can be pinned (e.g., decisions with respect to joining passages of traffic). In an example implementation, decisions regarding lane selection can be branched (explicitly or implicitly). For instance, lane selection decision values can flow from costs output by ranker 412.

In general, more decisions can be pinned to decrease a total number of different strategies. For instance, a majority of decisions can be pinned. For example, less than 10 decisions can be branched, such as less than 5 decisions can be branched, such as less than 3 decisions can be branched. One or two decisions can be branched.

A number of branched decisions can be determined based on a desired strategy count. For example, a set of strategies can be capped at less than 20, such as capped at less than 10, such as capped at less than 5.

Pinning decisions can improve the efficiency of costing multiple candidate trajectories. For example, ranker 412 can cache constraints or cost surfaces evaluated for the pinned decisions and only compute additional constraints on branched decisions.

Strategy-dependent cost selector 2210 can use strategy data 1302 to prune a number of costs to consider in ranker 412. For example, different cost functions (or cost surfaces of a given cost function) can be indexed based on different decision values or strategies. For example, a cost function for determining a distance from an actor can be different when yielding to and slotting behind the actor as compared to when not yielding to and remaining ahead of the actor. In this manner, for instance, different sets of decisions (e.g., different strategies) can map to different cost surfaces (e.g., different portions of a cost function, different cost functions, etc.).

Figure 24:
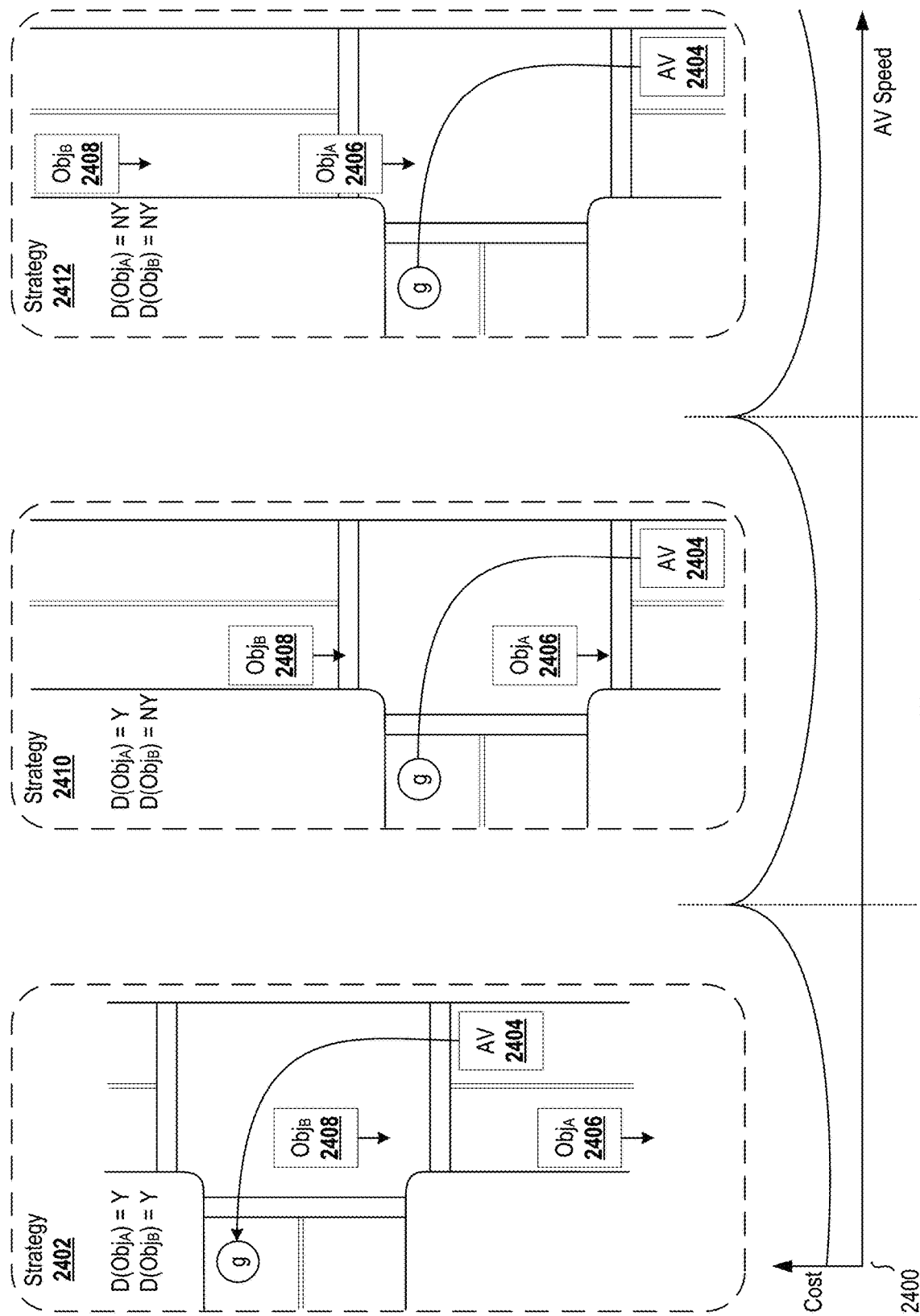
FIG. 24 is an illustration of variable costs over an example driving scene, according to some implementations of the present disclosure.

FIG. 24 is an example illustration of a relationship between strategies and local basins of cost functions. An example dimension of a segmented cost function is provided on chart 2400. Each segment of the cost function can correspond to a different strategy. For instance, the leftmost segment can correspond to a strategy 2402. In strategy 2402, an AV 2404 decides to yield to both object A 2406 and object B 2408. The middle segment of the cost function can correspond to a strategy 2410. In strategy 2410, AV 2404 decides to yield to object A 2406 but not yield to object B 2408. The rightmost segment of the cost function can correspond to a strategy 2412. In strategy 2412, AV 2404 decides to not yield to both object A 2406 and object B 2408.

Each segment of the cost function can have a separate local minimum. With respect to strategy 2402, for instance, yielding by assuming a speed approaching zero can incur its own cost, so as to avoid causing traffic disruptions. And as speed approaches a certain transition speed, AV 2404's trajectory will yield to object B 2408 for shorter durations, until AV 2404's trajectory intersects with object B 2408's trajectory. Beyond the transition speed, AV 2404's trajectory will cut in front of object B 2408, thus failing to achieve the desired goal of yielding to object B 2408. Thus, there can be a local optimal speed for a trajectory to yield to both objects.

With respect to strategy 2410, the goal of AV 2404 can be to pass in the gap between object A 2406 and object B 2408. This can involve, for instance, traveling to the AV goal at a speed that places AV 2404 between object A 2406 and object B 2408 at a time when object A 2406 and object B 2408 are a desired buffer distance away from AV 2406. Too slow, and AV 2404's trajectory intersects with Object B 2408's trajectory (high cost). Too fast, and AV 2404's trajectory intersects with object A 2408's trajectory (high cost). Thus, there can be a local optimal speed for a trajectory to yield to the leading object but not the trailing object.

With respect to strategy 2412, the goal of AV 2404 can be to pass in front of both object A 2406 and object B 2408. This can involve, for instance, traveling to the AV goal at a speed that crosses in front of object A 2406 at a time when object A 2406 is a desired buffer distance away from AV 2406. Too slow, and AV 2404's trajectory intersects with Object A 2406's trajectory (high cost). Too fast, and AV 2404's trajectory can violate other constraints (e.g., handling constraint, comfort constraint, etc.). Thus, there can be a local optimal speed for a trajectory to not yield both objects.

Pinning decisions can effectively prune a search space by allowing the elimination from consideration of segments of cost functions (or entirely separate cost functions) that correspond to the other candidate decision values for the pinned decision. For example, AV 2404 can determine that the approaching speed of object A 2406 is such that it is highly unlikely that AV 2404 should cross in front of object A 2406. The remaining optimization task can then be focused on searching over the leftmost and middle segments of the cost function—the rightmost segment can be ignored. This can reduce a computational load of ranking candidate trajectories.

Figure 25:
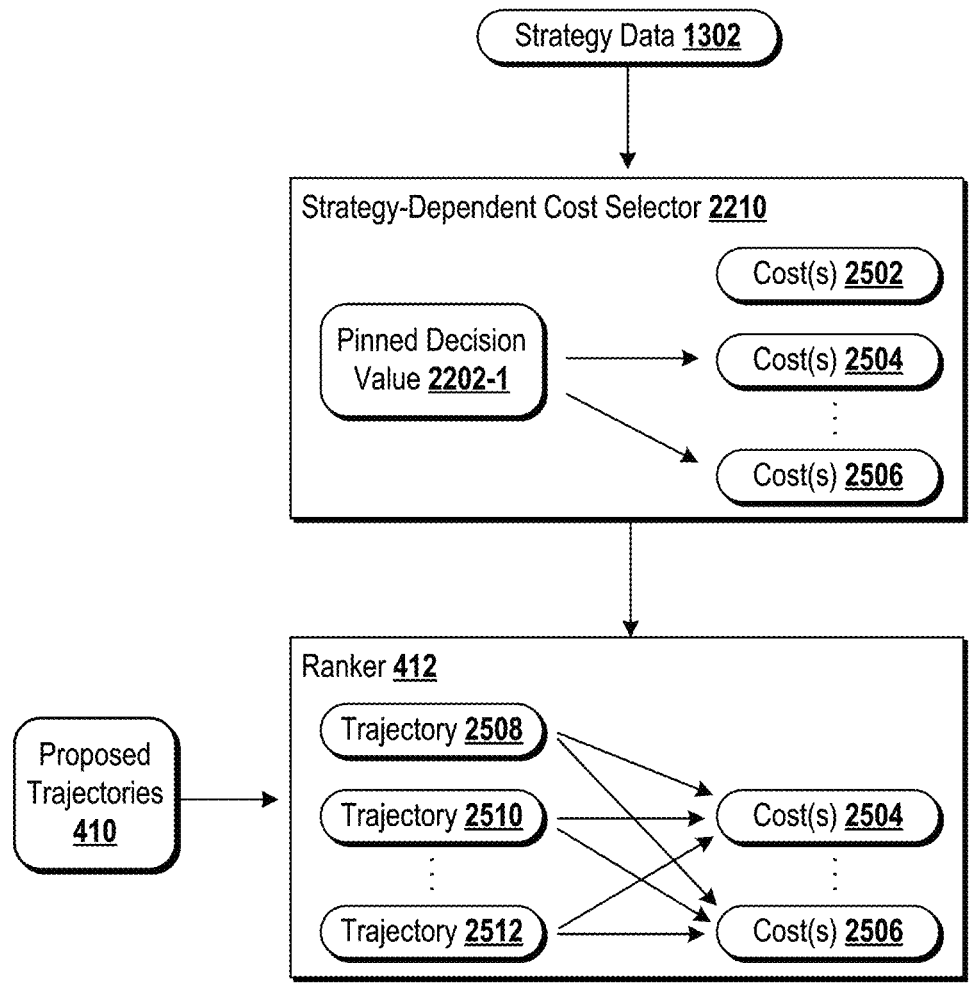
FIG. 25 is a block diagram of components of an example motion planning system, according to some implementations of the present disclosure.

FIG. 25 is a block diagram of an example strategy-dependent cost selector 2210, according to example aspects of the present disclosure. Strategy-dependent cost selector 2210 can process strategy data 1302 and determine that pinned decision value 2202-1 is out-of-domain for costs 2502 (e.g., costs 2502 are relevant only to strategies in which a different decision value is selected other than pinned decision value 2202-1). Strategy-dependent cost selector 2210 can determine that pinned decision value 2202-1 is in-domain for costs 2504, . . . , 2506. Based on this mapping, ranker 412 can cost trajectories 2508, 2510, . . . , 2512 using costs 2504, . . . , 2506 and skip costing trajectories 2508, 2510, . . . , 2512 using costs 2502. For instance, it can effectively be assumed that a cost from costs 2502 for an out-of-domain strategy (e.g., that includes pinned decision value 2202-1) will not have a desirable score, since by definition costs 2502, being configured to encourage compliance with different decision values other than pinned decision value 2202-1, would severely penalize trajectories that implement pinned decision value 2202-1.

Costs 2502, 2504, . . . , 2506 can include machine-learned costs. Costs 2502, 2504, . . . , 2506 can include hand-tuned or engineered costs.

Costs 2502, 2504, . . . , 2506 can correspond to separate cost functions. Costs 2502, 2504, . . . , 2506 can correspond to separate portions of a domain of a piecewise cost function. Costs 2502, 2504, . . . , 2506 can be indexed to categories of behavior that can be selected based on strategy data 1302.

A determination that a pinned decision value is out-of-domain can correspond to a cost function being undefined or invalid for the pinned decision value. For example, some cost function can be trained over a set of exemplars that share various features that correspond to one or more decisions. For instance, a learned cost function for following distance can be trained using exemplars in which an ego vehicle follows an actor. As such the learned cost function can be valid only for decision values that correspond to following an actor. Decision values that correspond to not yielding to or leading an actor can be out of domain for such a cost. In other examples, engineered costs can be derived from or otherwise based on premises or assumptions regarding a particular scenario. For example, an engineered cost can be structured on a premise that the autonomous vehicle should not cross a roadway centerline. In a construction zone, however, the autonomous vehicle can correctly determine and pin a decision to pass a construction area by following a detour route that crosses the roadway centerline. Such a decision value can be out-of-domain for the engineered cost.

Figure 26:
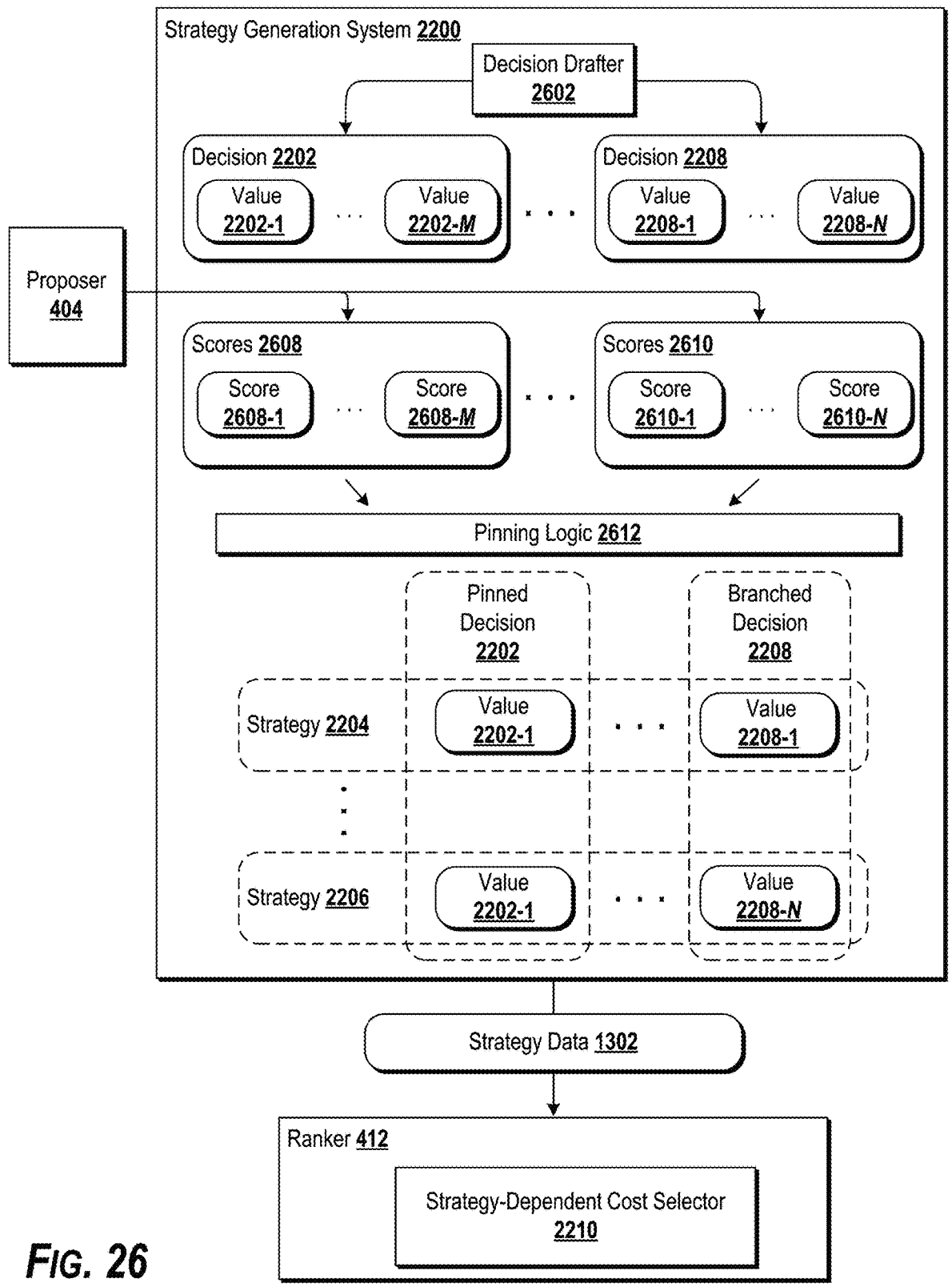
FIG. 26 is a block diagram of components of an example motion planning system, according to some implementations of the present disclosure.

FIG. 26 is a block diagram of an example strategy generation system 2200 for decision pinning according to example aspects of the present disclosure. A decision drafter 2602 can enumerate decisions to be considered by planning system 250 with respect to various objects in the environment. For instance, decision drafter 2602 can enumerate decisions 2202, . . . , 2206. Strategy generation system 2200 can enumerate candidate decision values for the decisions (e.g., using decision drafter 2602). For instance, decision 2202 can have M candidate decision values 2202-1, . . . , 2202-M. Decision 2208 can have N candidate decision values 2208-1, . . . , 2208-N.

Strategy generation system 2200 can obtain scores respectively corresponding to the candidate decision values (e.g., from or otherwise using proposer 404). For instance, scores 2604 (e.g., scores 2604-1, . . . , 2604-M) can respectively correspond to candidate decision values 2202-1, . . . , 2202-M of decision 2202. Scores 2606 (e.g., scores 2606-1, . . . , 2606-M) can respectively correspond to candidate decision values 2208-1, . . . , 2208-M of decision 2208.

Pinning logic 2608 can process the candidate decision values and their respectively corresponding scores to determine which, if any, decisions should be pinned and which, if any, decisions should be branched. As illustrated in FIG. 26, pinning logic 2608 can produce at least one pinned decision 2202 and at least one branched decision 2208. For pinned decision 2202, pinned decision value 2202-1 can be shared across strategies 2204, . . . , 2206. For branched decision 2208, the different candidate decision values 2208-1, . . . , 2208-N can be distributed across strategies 2204, . . . , 2206.

Decision drafter 2602 can process data from context cache 402 or values generated by a backbone model to determine relevant actors or objects with respect to which the autonomous vehicle can make decisions. Decision drafter 2602 can output a list of actors/objects or a list of decisions to make with respect to actors/objects. Decision drafter 2602 and a list of candidate decision values for each actor/object or decision.

Decision drafter 2602 can include one or more machine-learned components configured to identify pertinent decisions. Decision drafter 2602 can include one or more engineered components configured to enumerate certain decisions deterministically based on a presence of certain triggering criteria.

Score sets 1808, . . . , 1810 can be outputs from a backbone model or a decoder attached thereto. For instance, a backbone model can process a scene to generate an understanding of the scene and the actors and objects contained therein. A decoder can process values generated by the backbone model (e.g., latent states, other values) to predict a decision value for respective decisions. For instance, a decoder can receive, as an input, a list of decisions and corresponding actors. The decoder can receive, as an input, candidate decision values. The decoder can have an output layer (e.g., an output classification layer) that selects appropriate decision values given an actor and a decision type indicator (e.g., even if not given a list of candidate decision values as input).

Based on context cache 402 and values generated by the backbone model, the decoder can generate scores corresponding to different decision values. The decoder can generate a softmax distribution over a distribution of different decision values, where individual logits for the different decision values can indicate a score associated with the respective decision values.

The scores can correspond to a likelihood that a particular decision aligns with what a human exemplar would choose if faced with the same decision. The scores can correspond to a confidence in the respective decisions. For example, a distance between a top-1 score and a top-2 score can indicate a confidence in the preference of the top-1 score.

Pinning logic 2608 can include machine-learned or engineered logic. Pinning logic 2608 can pin a top scoring decision value upon determination that the top-scoring decision value satisfies a confidence metric.

A number of strategies can be combinatorial in branched decisions. Advantageously, strategy generation system 2200 can focus a strategy search space by reducing the search space into equivalent strategy classes based on an equivalence criterion. For instance, instead of individually enumerating each of a group of strategies that satisfy an equivalence criterion, the equivalent class can be represented by a representative strategy for processing. For example, some decisions can logically foreclose or supersede other decisions. Furthermore, given a set of constraints or other criteria, some decisions dominate evaluation of a strategy such that various strategies that share that decision will evaluate as equivalents (e.g., a penalty associated with one decision is so dominant that other subsequent decisions do not affect the evaluation). For instance, an equivalence class can be determined such that members share a cost function, so that a representative member can be evaluated for improved efficiency. For example, strategy generation system 2200 can group as equivalent strategies that share an equivalent minimum cost basin (e.g., based on the strategies sharing a costing function), since the minima of each of those strategies could provide an equivalent minimum cost solution (e.g., the same minimum-cost trajectory by optimizing the same costing function). Strategy construction can thereby focus the search space on strategies with different possible cost minima, so distinct options can be explored without duplicative processing overhead.

To improve the performance of an autonomous platform, such as an autonomous vehicle controlled at least in part using autonomy system 200 (e.g., the autonomous vehicles 310 or 350), the autonomous platform can use a motion planning system that uses a lane-associated trajectory set to communicate between planning stages, as described herein.

Figure 27:
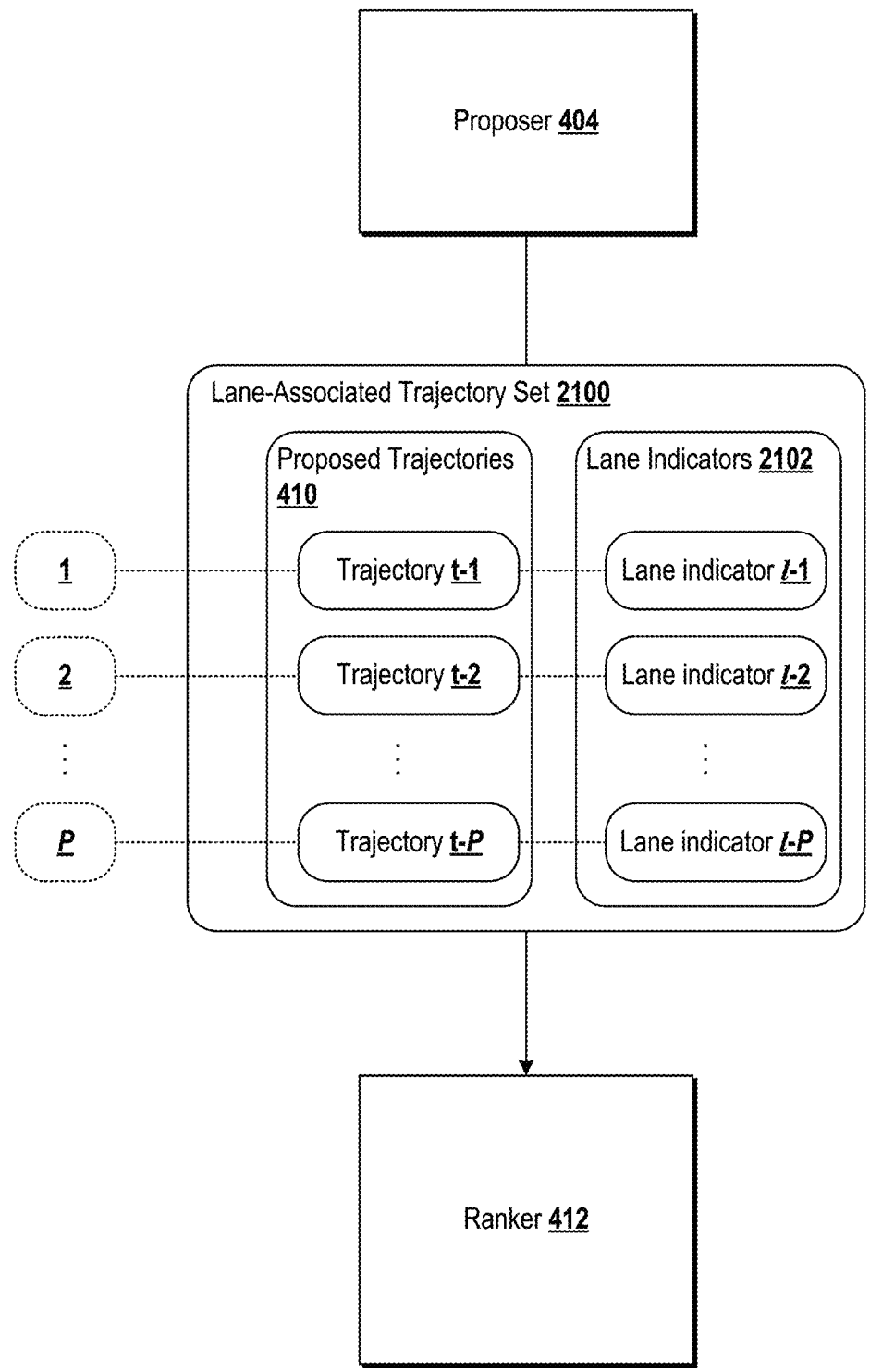
FIG. 27 is a block diagram of components of an example motion planning system, according to some implementations of the present disclosure.

FIG. 27 is a block diagram of an example communication pathway between proposer 404 and ranker 412. Proposer 404 can output a lane-associated trajectory set 2700 that contains proposed trajectories 410 indexed with lane indicators 2702. For instance, an index 1 can register trajectory t-1 with one or more lane indicators l-1. An index 2 can register trajectory t-2 with one or more lane indicators l-2. And so on, until index P can register trajectory t-P with one or more lane indicators l-P. Ranker 412 can receive lane-associated trajectory set 2700 can process lane-associated trajectory set 2700. Ranker 412 can be constructed with an architecture that operates based on lane structures. For instance, by passing lane-associated trajectory set 2700 in a format that aligns with an explicit or implicit structure of ranker 412, proposer 404 and ranker 412 can communicate with lightweight exchanges.

Indices 1, 2, . . . , P can correspond to indices of a tensor along an indexed dimension. Proposed trajectories 410 can include a flat list of trajectories. Lane indicators 2702 can include a flat list of lane indicators. The ordering of the lists can be registered to one another such that lane indicators for a trajectory at a given index can be retrieved using the same index. This can facilitate efficient batchwise chunking, as the lists can be segmented based on the same index values, and the segments can be sure to contain the corresponding data for the trajectory-lane indicator pairs.

Lane indicators 2702 can include any value indicating a lane or other portion of a roadway associated with a given trajectory. Lane indicators 2702 can point to a lane of the roadway into which a corresponding trajectory travels. Lane indicators 2702 can correspond to a lane node on a lane graph obtained from the map data. Lane indicators 2702 can correspond to a stream in context cache 402.

Lane indicators 2702 can indicate lanes in absolute or relative terms. For instance, lane indicators 2702 can use lane identifiers derived from map data 210 (e.g., an absolute reference). Lane indicators 2702 can define lanes in relative terms. Lane indicators 2702 can include, for instance, "R" for right lane, "L" for left lane, "C" for center lane, etc. Directional indicators can be obtained from map data 210 or determined with respect to a position of the autonomous vehicle (e.g., based on a current state of the autonomous vehicle).

Ranker 412 can be constructed explicitly or implicitly to reason over lane-based spatial structures. For example, ranker 412 can include a backbone model architecture 500. Ranker 412 can include a graph neural network 900. As described above with respect to FIGS. 9 to 11D, example graph neural networks 900 can implicitly and explicitly encode spatial associations between objects in an environment. In this manner, for instance, an example ranker 412 can have an inductive prior based on the structure of the model itself. Because ranker 412 can already encode spatial information regarding the scene, proposer 404 might not need to pass additional data describing such spatial information. Instead, lane-associated trajectory set 2700 can simply refer to the lane structure already encoded within ranker 412.

Furthermore, ranker 412 can use lane indicators 2702 to prune costs over lanes that are not implicated by a given trajectory. For example, a trajectory associated with a movement into a left lane might not need to be costed using cost functions related to a shoulder.

Figure 28:
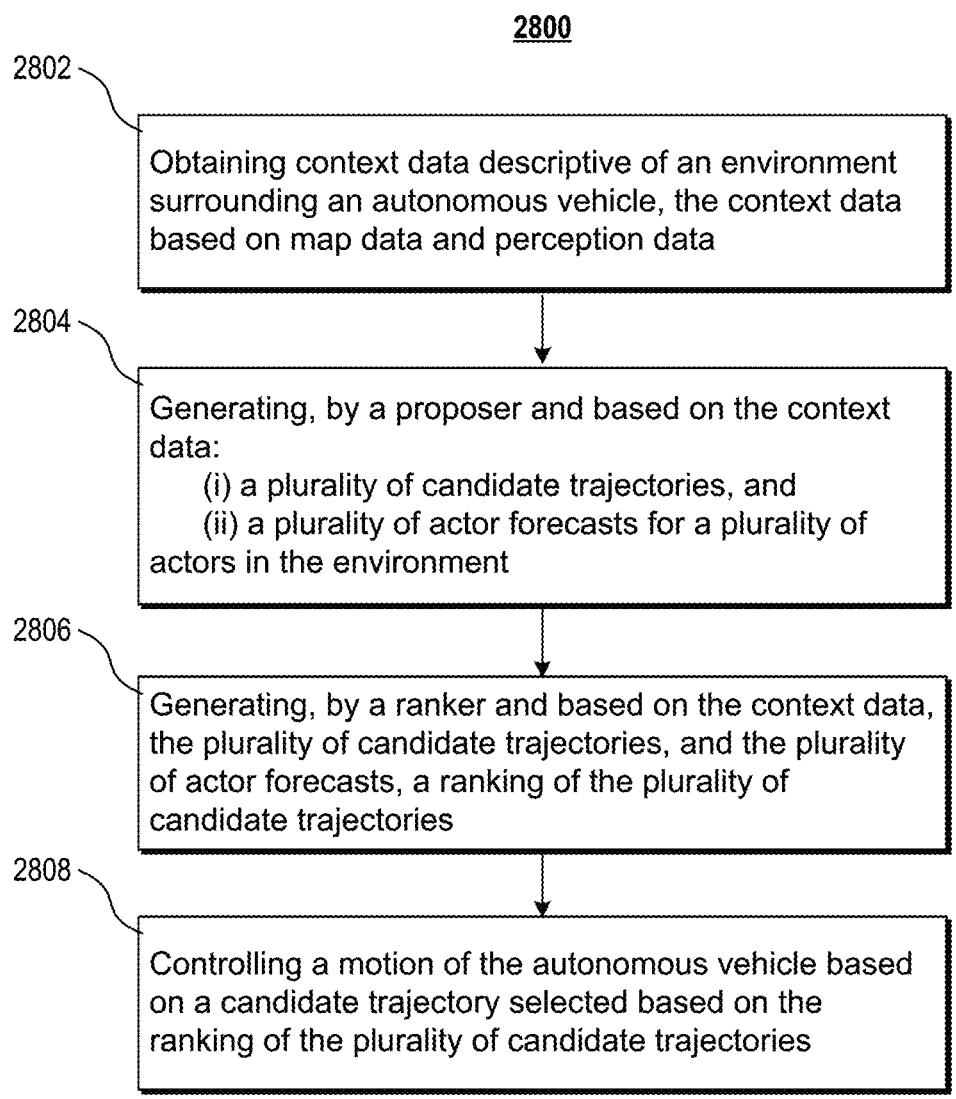
FIG. 28 is a flowchart of an example method for motion planning, according to some implementations of the present disclosure.

FIG. 28 is a flowchart of example method 2800 for performing motion planning according to aspects of the present disclosure. One or more portions of example method 2800 can be implemented by the computing systems described with reference to the other figures (e.g., autonomous platform 110, vehicle computing system 180, remote system 160, a system of FIGS. 1 to 32, etc.). Each respective portion of example method 2800 can be performed by any (or any combination) of one or more computing devices. Moreover, one or more portions of example method 2800 can be implemented on the hardware components of the devices described herein (e.g., as in FIGS. 1 to 32, etc.).

FIG. 28 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 28 is described with reference to elements/terms described with respect to other systems and figures for exemplary illustrated purposes and is not meant to be limiting. One or more portions of example method 2800 can be performed additionally, or alternatively, by other systems.

At 2802, example method 2800 can include obtaining context data descriptive of an environment surrounding an autonomous vehicle, the context data based on map data and perception data 242. For example, the context data can include data from context cache 402.

At 2804, example method 2800 can include generating, by a proposer and based on the context data, (i) a plurality of candidate trajectories, and (ii) a plurality of actor forecasts for a plurality of actors in the environment. For example, the plurality of candidate trajectories can be or include proposed trajectories 410. The plurality of actor forecasts can include forecasts generated by proposer 404 (e.g., using a decoder 502).

At 2806, example method 2800 can include generating, by a ranker and based on the context data, the plurality of candidate trajectories, and the plurality of actor forecasts, a ranking of the plurality of candidate trajectories. For example, ranker 412 can rank proposed trajectories 410 based on costs computed for proposed trajectories 410. For instance, trajectory coster 416 can generates costs for the trajectories based on context cache 402, proposed trajectories 410, and forecasts generated in proposer 404 or ranker 412. Costing proposed trajectories 410 based on the plurality of actor forecasts from the proposer can include costing the proposed trajectories using costs selected or configured based on decision values that were determined using forecasts from proposer 404.

At 2806, example method 2800 can include controlling a motion of the autonomous vehicle based on a candidate trajectory selected based on the ranking of the plurality of candidate trajectories. For example, control system 260 can execute a selected candidate trajectory 418, or execute another trajectory that was compared against the selected candidate trajectory 418.

In some implementations of example method 2800, the proposer and the ranker can use a common backbone architecture. As described above with respect to FIGS. 6 to 8, proposer 404 and ranker 412 can share a common architecture in various different ways. Proposer 404 and ranker 412 can both use a same instance of a model, use separate instances of the same model, or use separate models that each contain the same backbone architecture.

In some implementations of example method 2800, the proposer can include a first machine-learned model. The first machine-learned model can include a decoder, such as decoder 502 or 1112. In some implementations of example method 2800, the ranker can include a second machine-learned model. The second machine-learned model can include a decoder, such as decoder 504 or 1112. In some implementations of example method 2800, the first machine-learned model and the second machine-learned model use a common backbone architecture. For example each decoder can receive inputs generated by or based on one or more models that each have the same backbone architecture.

In some implementations of example method 2800, generating the plurality of candidate trajectories can include generating a basis trajectory based on the context data. For example, a trajectory generator 408 can generate a basis trajectory, such as by using a basis trajectory generator 1602.

In some implementations of example method 2800, generating the plurality of candidate trajectories can include sampling a plurality of values for one or more parameters of the basis trajectory to generate the plurality of candidate trajectories. For example, a trajectory generator 408 can sample parameter values, such as by using a parameter sampler 1604. In some implementations of example method 2800, the plurality of values can be sampled based on at least one of perception data 242 or state data of the autonomous vehicle. For example, trajectory generator 408 can use a parameter sampler 1604 that processes context cache 402 to estimate bounds or other constraints on the sampled values.

In some implementations of example method 2800, generating the plurality of candidate trajectories can be at least partially performed in parallel with generating the plurality of actor forecasts. For example, trajectory generator 408 can generate trajectories in parallel with the execution of a backbone model and corresponding any decoders. Trajectory generator 408 can use inputs that do not depend on outputs of the backbone model or any decoders.

In some implementations of example method 2800, the common backbone architecture can include a graph neural network architecture. For example, a backbone architecture 500 can include a graph neural network architecture 900.

In some implementations of example method 2800, the environment can include a roadway with one or more lanes, and the graph neural network architecture can include an actor node associated with an actor of the plurality of actors and one or more goal nodes associated with one or more goal locations of the actor in the one or more lanes. For instance, FIGS. 9 and 10 illustrate how an example graph neural network 900 can encode goals for actors in a scene.

In some implementations of example method 2800, generating the ranking of the plurality of candidate trajectories can include processing a latent output of the common backbone architecture using the second machine-learned model. For example, a decoder 504 can process a state of a backbone model. The latent state can be cached after generation by the backbone model.

In some implementations of example method 2800, the common backbone architecture used by the first machine-learned model and the common backbone architecture used by the second machine-learned model can share a same set of parameters. For example, a backbone model 702 can be implemented in separate instances that each use the same weights.

In some implementations of example method 2800, the first machine-learned model can include a first decoder that processes outputs of the common backbone architecture. For example, a first machine-learned model can include a decoder, such as decoder 502 or 1112. In some implementations of example method 2800, the second machine-learned model can include a second decoder. For example, a second machine-learned model can include a decoder, such as decoder 504 or 1112. The second machine-learned model can process outputs of the common backbone architecture and the plurality of candidate trajectories. For example, a decoder 504 can ingest proposed trajectories 410.

In some implementations of example method 2800, generating the plurality of candidate trajectories can include processing the context data to determine one or more probabilities of an actor in the environment performing one or more actor actions. The actions can include moving toward a goal or traversing a trajectory along one or more streams. In some implementations of example method 2800, generating the plurality of candidate trajectories can include sampling the plurality of candidate trajectories based on the determined probabilities. For example, trajectory generator 408 can use outputs of a backbone model and a decoder to sample trajectories conditioned on forecasts for the actors.

In some implementations of example method 2800, controlling the motion of the autonomous vehicle can include executing one or more control parameters of the selected candidate trajectory proposed in example method 2800. For example, selected trajectory 418 can be characterized using parameters that can be processed and executed by control system 260 without further optimization.

In some implementations, example method 2800 can include determining, based on the context data, whether to apply an optimization routine to at least one parameter of the selected candidate trajectory. For example, optimization of at least one parameter value can be initiated based on a type of roadway, a response time requirement, a size of a buffer region or margin on the parameters, etc. The optimization can be executed by control system 260. The optimization can be implemented in trajectory generator 408 (e.g., when selected trajectory 418 is generated). The optimization can be implemented in ranker 412 (e.g., for refined comparison of top-K trajectories). The optimization can be iterative. The optimization can include optimizing a steering control profile of the candidate trajectory.

In some implementations of example method 2800, generating the ranking of the plurality of trajectories can include, for a respective candidate trajectory of the plurality of candidate trajectories, processing the context data to generate a forecasted action for the actor based on the autonomous vehicle executing the respective candidate trajectory. The forecast can be a conditional forecast conditioned on the autonomous vehicle executing the respective candidate trajectory. For example, a conditioned forecast can be generated by decoder 504 based on a backbone model and proposed trajectories 410. A conditioned forecast can be generated by a decoder 1112 by first encoding, in an AV state node $n_{AV}$, a candidate trajectory before performing message passing over the graph network 900.

In some implementations of example method 2800, generating the ranking of the plurality of trajectories can include, for a respective candidate trajectory of the plurality of candidate trajectories, determining a cost associated with the respective candidate trajectory based on the forecasted action. For example, trajectory coster 416 can generate costs for proposed trajectories 410 based on conditional forecasts output by decoder 504.

In some implementations of example method 2800, the forecasted action can include a motion along a path over time. For example, a decoder 502, 504 or 1112 can generate two-dimensional, three-dimensional, and four-dimensional forecasts.

In some implementations of example method 2800, generating the ranking of the plurality of trajectories can include processing, using the common backbone architecture, the plurality of candidate trajectories. For example, a set of proposed trajectories 410 can be processed by backbone model 1402. In an example, an encoder 1102 can encode, in an AV state node $n_{AV}$ of a graph neural network 900, one or more candidate trajectories before performing message passing over the graph network 900.

In some implementations of example method 2800, the ranker can generate forecasts for the one or more actors in the environment that are conditioned on the plurality of candidate trajectories. For example, a conditioned forecast can be generated by decoder 504 based on a backbone model and proposed trajectories 410. A conditioned forecast can be generated by a decoder 1112 by first encoding, in an AV state node $n_{AV}$, a candidate trajectory before performing message passing over the graph network 900.

In some implementations of example method 2800, perception data 242 can include object tracking data. For instance, the context cache 402 can contain data describing past and present object states, including past and present locations, headings, velocity, acceleration, and the like.

In some implementations of example method 2800, generating the plurality of actor forecasts can include at least one of: determining an actor goal, determining an interaction between an actor and another portion of the environment, or determining an actor trajectory. For example, determining an actor goal can include determining likelihoods of multiple possible goals and returning a most likely goal (e.g., using graph neural network 900). Determining an interaction between an actor and another portion of the environment can include determining shared space between an ego vehicle trajectory and an actor trajectory. Determining an actor trajectory can include estimating a path taken along a nominal path to reach a likely goal.

In some implementations of example method 2800, example method 2800 can include generating, using a first machine-learned model component, and based on the context data, a plurality of strategies for controlling the autonomous vehicle. For example, a backbone model and a decoder 502 can generate likely decision values for decisions that the autonomous vehicle can make with respect to object in its environment. In some implementations of example method 2800, a respective strategy can include a pinned decision value that is shared across the plurality of strategies based on a score associated with the pinned decision value. For example, a pinned decision value 2202-1 can be pinned based on value 2202-1 satisfying a confidence threshold.

In some implementations of example method 2800, example method 2800 can include generating, based on the context data, a plurality of candidate trajectories for controlling the autonomous vehicle. For example, trajectory generator 408 can generate proposed trajectories 410.

In some implementations of example method 2800, example method 2800 can include ranking the plurality of candidate trajectories by generating costs for the plurality of candidate trajectories. For example, ranker 412 can generate costs for proposed trajectories 410 using trajectory coster 416.

In some implementations of example method 2800, different strategies of the plurality of strategies can be used to generate different cost values for the ranking. For example, FIG. 24 illustrates how different cost surfaces can be customized and adapted based on the high-level decisions that can be made with respect to an operational scenario. Trajectory coster 416 can use strategy data (e.g., strategy data 1302 containing at one decision value) to select what cost functions are used for costing proposed trajectories 410.

In some implementations of example method 2800, the score can correspond to a confidence. For instance, a score can represent a likelihood that a particular decision would be made by a human expert driver. A likelihood can be taken as itself a confidence value. A likelihood can be generated by a model, and the model can also record a confidence with which the likelihood is generated. FIG. 26 provides various examples of decision value scores and evaluation thereof.

In some implementations of example method 2800, the plurality of strategies each can include a plurality of decision values for a respective plurality of decisions. For example, illustrative strategies 2204, . . . , 2206 can each contain decision values for each of a group of decisions. In some implementations of example method 2800, for a pinned decision of the plurality of decisions (e.g., pinned decision 2202), each strategy can include the pinned decision value (e.g., value 2202-1). In some implementations of example method 2800, for a branched decision of the plurality of decisions (e.g., branched decision 2208), the plurality of strategies can include a plurality of different candidate decision values (e.g., decision values 2208-1, . . . , 2208-N).

In some implementations of example method 2800, example method 2800 can include branching the branched decision across the plurality of different candidate decision values based on scores respectively associated with the plurality of different candidate decision values. For example, a strategy generation system 2200 (e.g., implemented by proposer 404) can evaluate scores associated with decision values 2208-1, . . . , 2208-N and determine that decision 2208 should be branched.

In some implementations of example method 2800, example method 2800 can include pinning the pinned decision to the pinned decision value based on the score associated with the pinned decision value indicating a confidence that satisfies a threshold. The satisfaction of the threshold can be explicit or implicit. A threshold can be applied to a confidence value, a likelihood value, or any other score associated with a decision value. In some implementations of example method 2800, example method 2800 can include branching the branched decision across the plurality of different candidate decision values based on scores respectively associated with the plurality of different candidate decision values indicating confidence that does not satisfy the threshold.

In some implementations of example method 2800, the threshold can be satisfied based on a difference between scores for candidate decision values for a given decision. For instance, a distance between a highest scoring decision value and a second highest scoring decision value can indicate a high confidence in the highest scoring decision value.

In some implementations of example method 2800, the threshold can be satisfied based on a magnitude of a score. For example, a set of scores can be normalized and redistributed such that they sum to 1 (e.g., using a softmax operation). Accordingly, a magnitude of a given score can indirectly provide information regarding the magnitudes of all other scores. For sufficiently high magnitudes of a given score, a confidence threshold can be satisfied due to the low cumulative likelihood of all other decision values.

In some implementations of example method 2800, example method 2800 can include generating the score by processing the context data using the first machine-learned model component. For example, the first machine-learned model component can include a decoder 502 that receives values from a backbone model that were generated using the context cache 402 and outputs decision values or scores associated with decision values.

In some implementations of example method 2800, different strategies of the plurality of strategies can correspond to different cost surfaces of one or more cost functions used to rank the plurality of candidate trajectories. For example, FIG. 24 illustrates how different cost surfaces can be customized and adapted based on the high-level decisions that can be made with respect to an operational scenario. Trajectory coster 416 can use strategy data (e.g., strategy data 1302 containing at one decision value) to select what cost functions are used for costing proposed trajectories 410.

In some implementations of example method 2800, ranking the plurality of candidate trajectories can include determining, for at least one candidate trajectory, different cost values based on the different strategies. For example, a strategy-dependent cost selector 2210 can select cost functions based on one or more decision values.

In some implementations of example method 2800, ranking the plurality of candidate trajectories can include determining, based on the plurality of candidate trajectories, a plurality of different forecasts for an object in the environment. For example, conditional forecasting can include generate a forecast for an object for each of a plurality of candidate trajectories (e.g., all of proposed trajectories 410, a top-K set of proposed trajectories 410, etc.).

In some implementations of example method 2800, generating the plurality of candidate trajectories can include sampling the plurality of candidate trajectories independently of the plurality of strategies. For example, trajectory generator 408 can generate trajectories without reference to decision values generated by proposer 404. This can facilitate parallel execution of trajectory generator 408 and other components of proposer 404.

In some implementations of example method 2800, ranking the plurality of candidate trajectories can include forecasting, using a second machine-learned model component, a plurality of candidate object states for one or more objects in the environment. For example, the second machine-learned model component can include a decoder 504 or 1112. In some implementations of example method 2800, the plurality of candidate object states can respectively correspond to the plurality of candidate trajectories. For example, a decoder can generate a conditional forecast for an object state using each of a plurality of candidate trajectories for conditioning. This can be computed in parallel.

In some implementations of example method 2800, the second machine-learned model component and the first machine-learned model component can use a shared backbone architecture to process the context data. For example, one or more backbone models can process data from context cache 402. The one or more backbone models can pass values to the second machine-learned model component and the first machine-learned model component.

In some implementations of example method 2800, the shared backbone architecture can include a graph neural network architecture including nodes that correspond to positions in lanes of a roadway in the environment. An example graph neural network architecture 900 is described above with respect to FIG. 9.

In some implementations of example method 2800, controlling a motion of the autonomous vehicle can include executing parameter values that were generated for the candidate trajectory (e.g., by a proposer, by a trajectory generator, etc.). For example, selected trajectory 418 can be characterized using parameters that can be processed and executed by control system 260 without further optimization.

In some implementations of example method 2800, one or more of the parameter values are not optimized after generation (e.g., by a proposer, by a trajectory generator, etc.). In some implementations of example method 2800, one or more of the parameter values are optimized after generation (e.g., by a proposer, by a trajectory generator, etc.) selectively based on a context. In some implementations of example method 2800, none of the parameter values are optimized after generation (e.g., by a proposer, by a trajectory generator, etc.).

In some implementations of example method 2800, example method 2800 can include generating, using a proposer that processes the context data, a lane-associated trajectory set that includes a plurality of candidate trajectories that are respectively associated with a plurality of lane indicators corresponding to lanes in the roadway. For example, proposer 404 can generate a lane-associated trajectory set 2700. Lane indicators can include lane indicators 2072.

In some implementations of example method 2800, example method 2800 can include ranking, using a ranker that processes the lane-associated trajectory set and the context data, the plurality of candidate trajectories. For example, ranker 412 can process lane-associated trajectory set 2700 and rank the trajectories listed therein. In some implementations of example method 2800, the ranker can be structured based on spatial associations between lane positions in the roadway. For instance, ranker 412 can include a backbone architecture that encodes spatial relationships in the environment based on roadway maps. Ranker 412 can include cost functions that are associated with lane-based geometric structures.

In some implementations of example method 2800, ranking the plurality of candidate trajectories can include costing the plurality of candidate trajectories using one or more cost functions selected based on the corresponding plurality of lane indicators. In some implementations of example method 2800, costing the plurality of candidate trajectories using the one or more cost functions selected based on the corresponding plurality of lane indicators can include determining at least one lane indicated by a lane indicator for a respective candidate trajectory. In some implementations of example method 2800, costing the plurality of candidate trajectories using the one or more cost functions selected based on the corresponding plurality of lane indicators can include determining to not apply a cost function to the respective candidate trajectory based on the cost function not being associated with the at least one lane. For example, one or more cost functions can be associated with a subset of a total set of lanes of a roadway. Lane associated trajectory set 2700 can identify or point to a set of one or more lanes that are associated with a given candidate trajectory. If the set of lanes associated with a given candidate trajectory does not overlap with the set of lanes associated with a given cost function, the given cost function can be omitted or skipped when costing the given candidate trajectory.

In some implementations of example method 2800, the lane-associated trajectory set can include a first list indexed with a second list. In some implementations of example method 2800, the first list can include the plurality of candidate trajectories. In some implementations of example method 2800, the second list can include the plurality of lane indicators. For example, lane-associated trajectory set 2700 can be implemented as paired lists (e.g., two flat lists).

In some implementations of example method 2800, a respective entry in the first list can include one or more trajectory parameter values mapped over time. In some implementations of example method 2800, values for the one or more trajectory parameter values can be indexed over a plurality of discrete time values. For example, a candidate trajectory can include trajectory parameter values for each of a plurality of time steps.

In some implementations of example method 2800, the one or more trajectory parameter values can include at least one control parameter value. For instance, a control parameter value can include a steering angle, a braking force, etc.

In some implementations of example method 2800, a respective lane indicator can point to a lane of the roadway into which a corresponding candidate trajectory travels.

In some implementations of example method 2800, a respective lane indicator can correspond to a lane node on a lane graph obtained from the map data. For instance, Map data 210 can include edges connecting nodes, where the nodes indicate positions along a centerline of a lane.

In some implementations of example method 2800, a neural network architecture used by the ranker can include a graph neural network that includes a network node that corresponds to a goal position in a respective lane. An example graph neural network is provided in FIG. 9. In some implementations of example method 2800, the graph neural network can include a plurality of network nodes that respectively correspond to a plurality of lane positions in the roadway.

In some implementations of example method 2800, example method 2800 can include probabilistically sampling a first plurality of candidate trajectories based on the processed context data. For example, a plurality of trajectories can be probabilistically sampled using a parameter sampler 1604, such as using a probabilistic sampling engine 1906.

In some implementations of example method 2800, example method 2800 can include deterministically selecting a second plurality of candidate trajectories. The second plurality of candidate trajectories respectively describe a plurality of default actions. For example, a default trajectory generator 1700 can supplement the sampled trajectory set with a set of default template trajectories that vary in control options. For example, default trajectory generator 1700 can provide a standard package of trajectories that follow an engineered template. Default trajectory generator 1700 can include trajectory modes that are selected such that proposed trajectories 410 can guarantee coverage of common trajectory modes. Default trajectory generator 1700 can deterministically select trajectories by deterministically selecting trajectory modes, shapes, etc. and probabilistically or deterministically selecting velocity profiles or other parameter values based on current scene context.

In some implementations of example method 2800, the plurality of default actions can include a stop; an evasive maneuver; a maneuver to a roadway shoulder; a deceleration above a threshold magnitude; or a continuation of a current heading.

Figure 29:
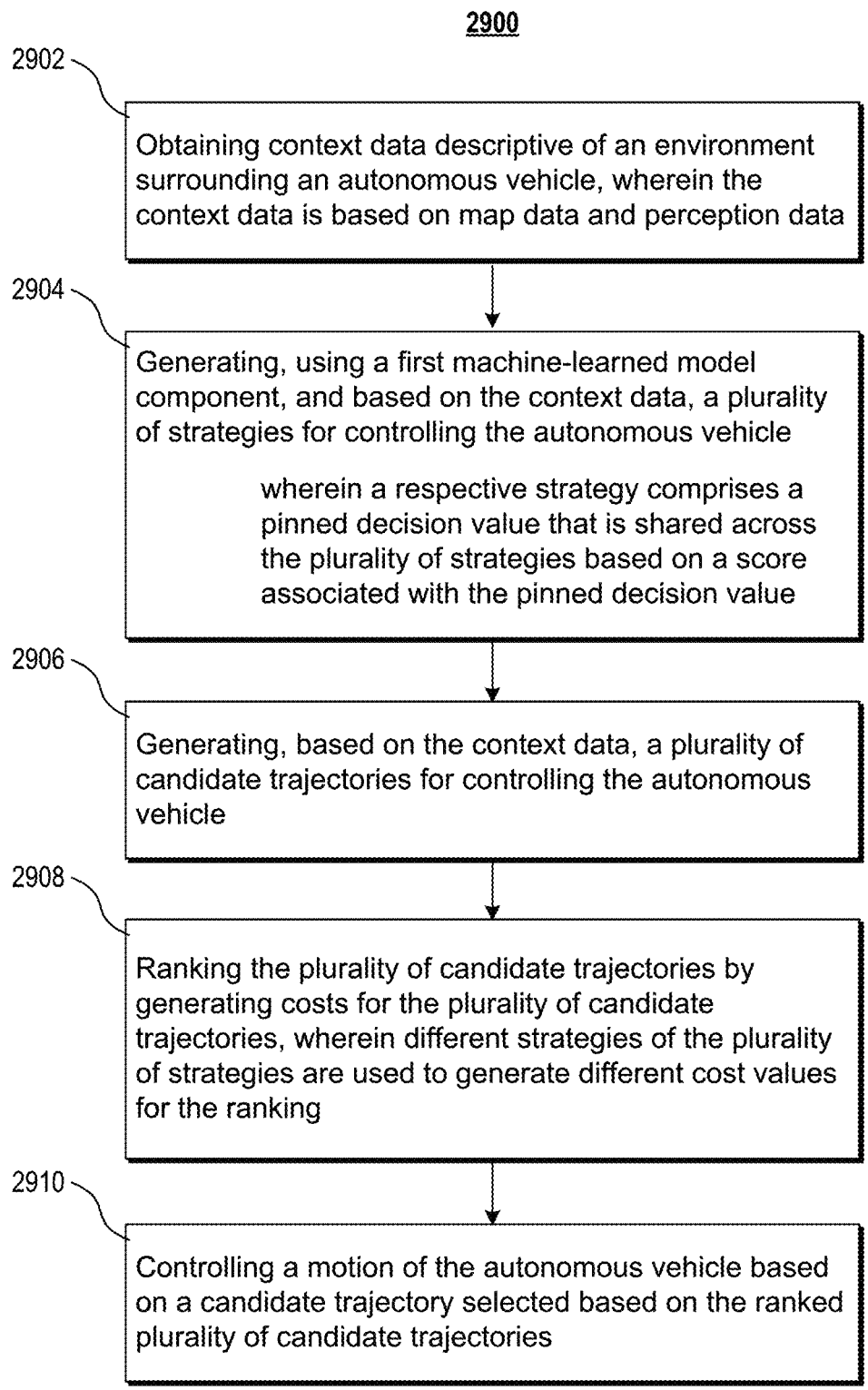
FIG. 29 is a flowchart of an example method for motion planning, according to some implementations of the present disclosure.

FIG. 29 is a flowchart of example method 2900 for performing motion planning according to aspects of the present disclosure. One or more portions of example method 2900 can be implemented by the computing systems described with reference to the other figures (e.g., autonomous platform 110, vehicle computing system 180, remote system 160, a system of FIGS. 1 to 32, etc.). Each respective portion of example method 2900 can be performed by any (or any combination) of one or more computing devices. Moreover, one or more portions of example method 2900 can be implemented on the hardware components of the devices described herein (e.g., as in FIGS. 1 to 32, etc.).

FIG. 29 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 29 is described with reference to elements/terms described with respect to other systems and figures for exemplary illustrated purposes and is not meant to be limiting. One or more portions of example method 2900 can be performed additionally, or alternatively, by other systems.

At 2902, example method 2900 can include obtaining context data descriptive of an environment surrounding an autonomous vehicle, wherein the context data is based on map data 210 and perception data 242.

At 2904, example method 2900 can include generating, using a first machine-learned model component, and based on the context data, a plurality of strategies for controlling the autonomous vehicle. For example, a backbone model and a decoder 502 can generate likely decision values for decisions that the autonomous vehicle can make with respect to an object in its environment. In some implementations of example method 2900, a respective strategy can include a pinned decision value that is shared across the plurality of strategies based on a score associated with the pinned decision value. For example, a pinned decision value 2202-1 can be pinned based on value 2202-1 satisfying a confidence threshold.

At 2906, example method 2900 can include generating, based on the context data, a plurality of candidate trajectories for controlling the autonomous vehicle. For example, trajectory generator 408 can generate proposed trajectories 410.

At 2908, example method 2900 can include ranking the plurality of candidate trajectories by generating costs for the plurality of candidate trajectories. For example, ranker 412 can generate costs for proposed trajectories 410 using trajectory coster 416. In some implementations of example method 2900, different strategies of the plurality of strategies can be used to generate different cost values for the ranking. For example, FIG. 24 illustrates how different cost surfaces can be customized and adapted based on the high-level decisions that can be made with respect to an operational scenario. Trajectory coster 416 can use strategy data (e.g., strategy data 1302 containing at one decision value) to select what cost functions are used for costing proposed trajectories 410.

At 2910, example method 2900 can include controlling a motion of the autonomous vehicle based on a candidate trajectory selected based on the ranked plurality of candidate trajectories. For example, control system 260 can execute a selected candidate trajectory 418, or execute another trajectory that was compared against the selected candidate trajectory 418.

In some implementations of example method 2900, the score can correspond to a confidence. For instance, a score can represent a likelihood that a particular decision would be made by a human expert driver. A likelihood can be taken as itself a confidence value. A likelihood can be generated by a model, and the model can also record a confidence with which the likelihood is generated. FIG. 26 provides various examples of decision value scores and evaluation thereof.

In some implementations of example method 2900, the plurality of strategies each can include a plurality of decision values for a respective plurality of decisions. For example, illustrative strategies 2204, . . . , 2206 can each contain decision values for each of a group of decisions. In some implementations of example method 2900, for a pinned decision of the plurality of decisions (e.g., pinned decision 2202), each strategy can include the pinned decision value (e.g., value 2202-1). In some implementations of example method 2900, for a branched decision of the plurality of decisions (e.g., branched decision 2208), the plurality of strategies can include a plurality of different candidate decision values (e.g., decision values 2208-1, . . . , 2208-N).

In some implementations of example method 2900, example method 2900 can include branching the branched decision across the plurality of different candidate decision values based on scores respectively associated with the plurality of different candidate decision values. For example, a strategy generation system 2200 (e.g., implemented by proposer 404) can evaluate scores associated with decision values 2208-1, . . . , 2208-N and determine that decision 2208 should be branched.

In some implementations of example method 2900, example method 2900 can include pinning the pinned decision to the pinned decision value based on the score associated with the pinned decision value indicating a confidence that satisfies a threshold. The satisfaction of the threshold can be explicit or implicit. A threshold can be applied to a confidence value, a likelihood value, or any other score associated with a decision value. In some implementations of example method 2900, example method 2900 can include branching the branched decision across the plurality of different candidate decision values based on scores respectively associated with the plurality of different candidate decision values indicating confidence that does not satisfy the threshold.

In some implementations of example method 2900, the threshold can be satisfied based on a difference between scores for candidate decision values for a given decision. For instance, a distance between a highest scoring decision value and a second highest scoring decision value can indicate a high confidence in the highest scoring decision value.

In some implementations of example method 2900, the threshold can be satisfied based on a magnitude of a score. For example, a set of scores can be normalized and redistributed such that they sum to 1 (e.g., using a softmax operation). Accordingly, a magnitude of a given score can indirectly provide information regarding the magnitudes of all other scores. For sufficiently high magnitudes of a given score, a confidence threshold can be satisfied due to the low cumulative likelihood of all other decision values.

In some implementations of example method 2900, example method 2900 can include generating the score by processing the context data using the first machine-learned model component. For example, the first machine-learned model component can include a decoder 502 that receives values from a backbone model that were generated using the context cache 402 and outputs decision values or scores associated with decision values.

In some implementations of example method 2900, different strategies of the plurality of strategies can correspond to different cost surfaces of one or more cost functions used to rank the plurality of candidate trajectories. For example, FIG. 24 illustrates how different cost surfaces can be customized and adapted based on the high-level decisions that can be made with respect to an operational scenario. Trajectory coster 416 can use strategy data (e.g., strategy data 1302 containing at one decision value) to select what cost functions are used for costing proposed trajectories 410.

In some implementations of example method 2900, ranking the plurality of candidate trajectories can include determining, for at least one candidate trajectory, different cost values based on the different strategies. For example, a strategy-dependent cost selector 2210 can select cost functions based on one or more decision values.

In some implementations of example method 2900, ranking the plurality of candidate trajectories can include determining, based on the plurality of candidate trajectories, a plurality of different forecasts for an object in the environment. For example, conditional forecasting can include generate a forecast for an object for each of a plurality of candidate trajectories (e.g., all of proposed trajectories 410, a top-K set of proposed trajectories 410, etc.).

In some implementations of example method 2900, generating the plurality of candidate trajectories can include sampling the plurality of candidate trajectories independently of the plurality of strategies. For example, trajectory generator 408 can generate trajectories without reference to decision values generated by proposer 404. This can facilitate parallel execution of trajectory generator 408 and other components of proposer 404.

In some implementations of example method 2900, ranking the plurality of candidate trajectories can include forecasting, using a second machine-learned model component, a plurality of candidate object states for one or more objects in the environment. For example, the second machine-learned model component can include a decoder 504 or 1112. In some implementations of example method 2900, the plurality of candidate object states can respectively correspond to the plurality of candidate trajectories. For example, a decoder can generate a conditional forecast for an object state using each of a plurality of candidate trajectories for conditioning. This can be computed in parallel.

In some implementations of example method 2900, the second machine-learned model component and the first machine-learned model component can use a shared backbone architecture to process the context data. For example, one or more backbone models can process data from context cache 402. The one or more backbone models can pass values to the second machine-learned model component and the first machine-learned model component.

In some implementations of example method 2900, the shared backbone architecture can include a graph neural network architecture including nodes that correspond to positions in lanes of a roadway in the environment. An example graph neural network architecture 900 is described above with respect to FIG. 9.

In some implementations of example method 2900, controlling a motion of the autonomous vehicle can include executing parameter values that were generated for the candidate trajectory (e.g., by a proposer, by a trajectory generator, etc.). For example, selected trajectory 418 can be characterized using parameters that can be processed and executed by control system 260 without further optimization.

In some implementations of example method 2900, one or more of the parameter values are not optimized after generation (e.g., by a proposer, by a trajectory generator, etc.). In some implementations of example method 2900, one or more of the parameter values are optimized after generation (e.g., by a proposer, by a trajectory generator, etc.) selectively based on a context. In some implementations of example method 2900, none of the parameter values are optimized after generation (e.g., by a proposer, by a trajectory generator, etc.).

Figure 30:
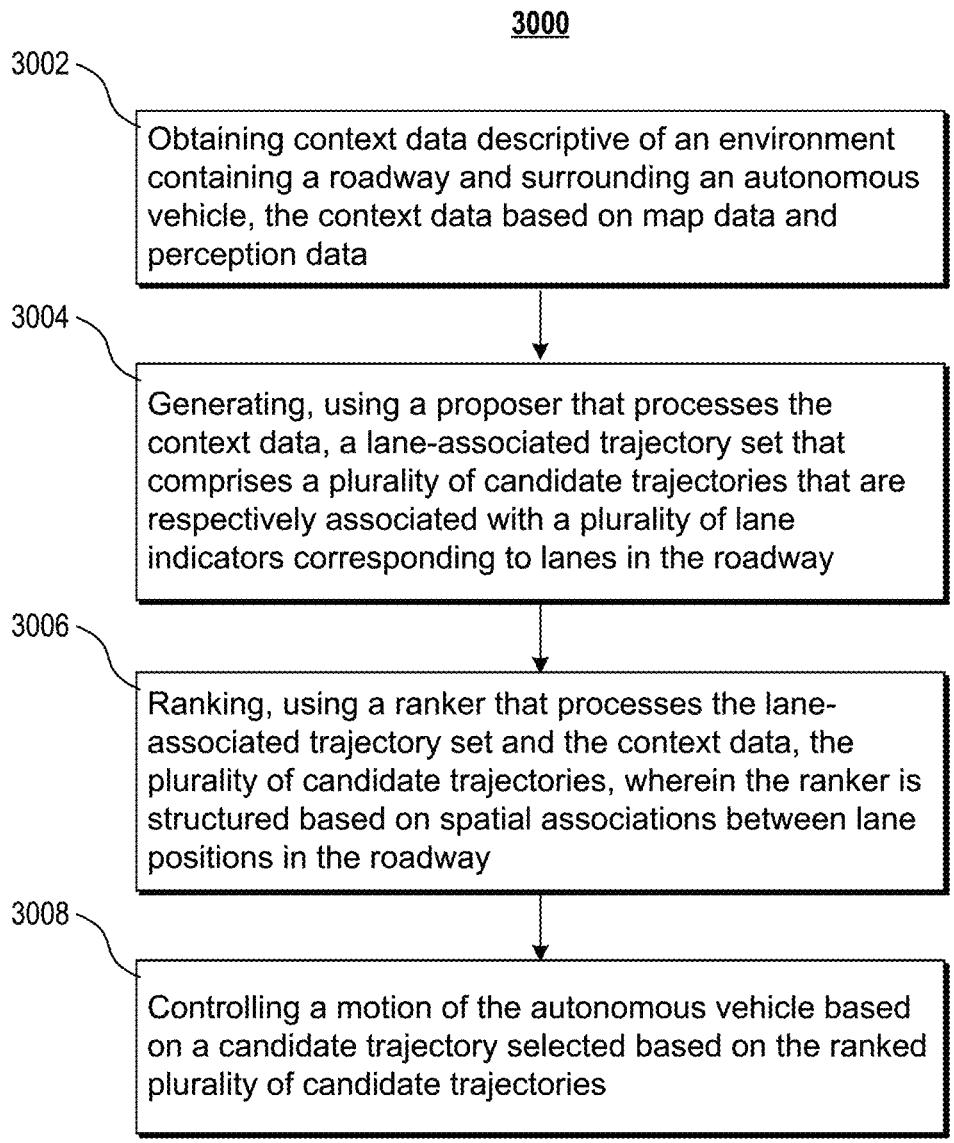
FIG. 30 is a flowchart of an example method for motion planning, according to some implementations of the present disclosure.

FIG. 30 is a flowchart of an example method 3000 for performing motion planning according to aspects of the present disclosure. One or more portions of example method 3000 can be implemented by the computing systems described with reference to the other figures (e.g., autonomous platform 110, vehicle computing system 180, remote system 160, a system of FIGS. 1 to 32, etc.). Each respective portion of example method 3000 can be performed by any (or any combination) of one or more computing devices. Moreover, one or more portions of method 3000 can be implemented on the hardware components of the devices described herein (e.g., as in FIGS. 1 to 32, etc.).

FIG. 30 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 30 is described with reference to elements/terms described with respect to other systems and figures for exemplary illustrated purposes and is not meant to be limiting. One or more portions of example method 3000 can be performed additionally, or alternatively, by other systems.

At 3002, example method 3000 can include obtaining context data descriptive of an environment containing a roadway and surrounding an autonomous vehicle, the context data based on map data 210 and perception data 242.

At 3004, example method 3000 can include generating, using a proposer that processes the context data, a lane-associated trajectory set that includes a plurality of candidate trajectories that are respectively associated with a plurality of lane indicators corresponding to lanes in the roadway. For example, proposer 404 can generate a lane-associated trajectory set 2700. Lane indicators can include lane indicators 2072.

At 3006, example method 3000 can include ranking, using a ranker that processes the lane-associated trajectory set and the context data, the plurality of candidate trajectories. For example, ranker 412 can process lane-associated trajectory set 2700 and rank the trajectories listed therein. In some implementations of example method 3000, the ranker can be structured based on spatial associations between lane positions in the roadway. For instance, ranker 412 can include a backbone architecture that encodes spatial relationships in the environment based on roadway maps. Ranker 412 can include cost functions that are associated with lane-based geometric structures.

At 3008, example method 3000 can include controlling a motion of the autonomous vehicle based on a candidate trajectory selected based on the ranked plurality of candidate trajectories. For example, control system 260 can execute a selected candidate trajectory 418, or execute another trajectory that was compared against the selected candidate trajectory 418.

In some implementations of example method 3000, ranking the plurality of candidate trajectories can include costing the plurality of candidate trajectories using one or more cost functions selected based on the corresponding plurality of lane indicators. In some implementations of example method 3000, costing the plurality of candidate trajectories using the one or more cost functions selected based on the corresponding plurality of lane indicators can include determining at least one lane indicated by a lane indicator for a respective candidate trajectory. In some implementations of example method 3000, costing the plurality of candidate trajectories using the one or more cost functions selected based on the corresponding plurality of lane indicators can include determining to not apply a cost function to the respective candidate trajectory based on the cost function not being associated with the at least one lane. For example, one or more cost functions can be associated with a subset of a total set of lanes of a roadway. Lane associated trajectory set 2700 can identify or point to a set of one or more lanes that are associated with a given candidate trajectory. If the set of lanes associated with a given candidate trajectory does not overlap with the set of lanes associated with a given cost function, the given cost function can be omitted or skipped when costing the given candidate trajectory.

In some implementations of example method 3000, the lane-associated trajectory set can include a first list indexed with a second list. In some implementations of example method 3000, the first list can include the plurality of candidate trajectories. In some implementations of example method 3000, the second list can include the plurality of lane indicators. For example, lane-associated trajectory set 2700 can be implemented as paired lists (e.g., two flat lists).

In some implementations of example method 3000, a respective entry in the first list can include one or more trajectory parameter values mapped over time. In some implementations of example method 3000, values for the one or more trajectory parameter values can be indexed over a plurality of discrete time values. For example, a candidate trajectory can include trajectory parameter values for each of a plurality of time steps.

In some implementations of example method 3000, the one or more trajectory parameter values can include at least one control parameter value. For instance, a control parameter value can include a steering angle, a braking force, etc.

In some implementations of example method 3000, a respective lane indicator can point to a lane of the roadway into which a corresponding candidate trajectory travels.

In some implementations of example method 3000, a respective lane indicator can correspond to a lane node on a lane graph obtained from the map data. For instance, Map data 210 can include edges connecting nodes, where the nodes indicate positions along a centerline of a lane.

In some implementations of example method 3000, a neural network architecture used by the ranker can include a graph neural network that includes a network node that corresponds to a goal position in a respective lane. An example graph neural network is provided in FIG. 9. In some implementations of example method 3000, the graph neural network can include a plurality of network nodes that respectively correspond to a plurality of lane positions in the roadway.

In some implementations of example method 3000, example method 3000 can include probabilistically sampling a first plurality of candidate trajectories based on the processed context data. For example, a plurality of trajectories can be probabilistically sampled using a parameter sampler 1604, such as using a probabilistic sampling engine 1906.

In some implementations of example method 3000, example method 3000 can include deterministically selecting a second plurality of candidate trajectories. The second plurality of candidate trajectories respectively describe a plurality of default actions. For example, a default trajectory generator 1700 can supplement the sampled trajectory set with a set of default template trajectories that vary in control options. For example, default trajectory generator 1700 can provide a standard package of trajectories that follow an engineered template. Default trajectory generator 1700 can include trajectory modes that are selected such that proposed trajectories 410 can guarantee coverage of common trajectory modes. Default trajectory generator 1700 can deterministically select trajectories by deterministically selecting trajectory modes, shapes, etc. and probabilistically or deterministically selecting velocity profiles or other parameter values based on current scene context.

In some implementations of example method 3000, the plurality of default actions can include a stop; an evasive maneuver; a maneuver to a roadway shoulder; a deceleration above a threshold magnitude; or a continuation of a current heading.

Figure 31:
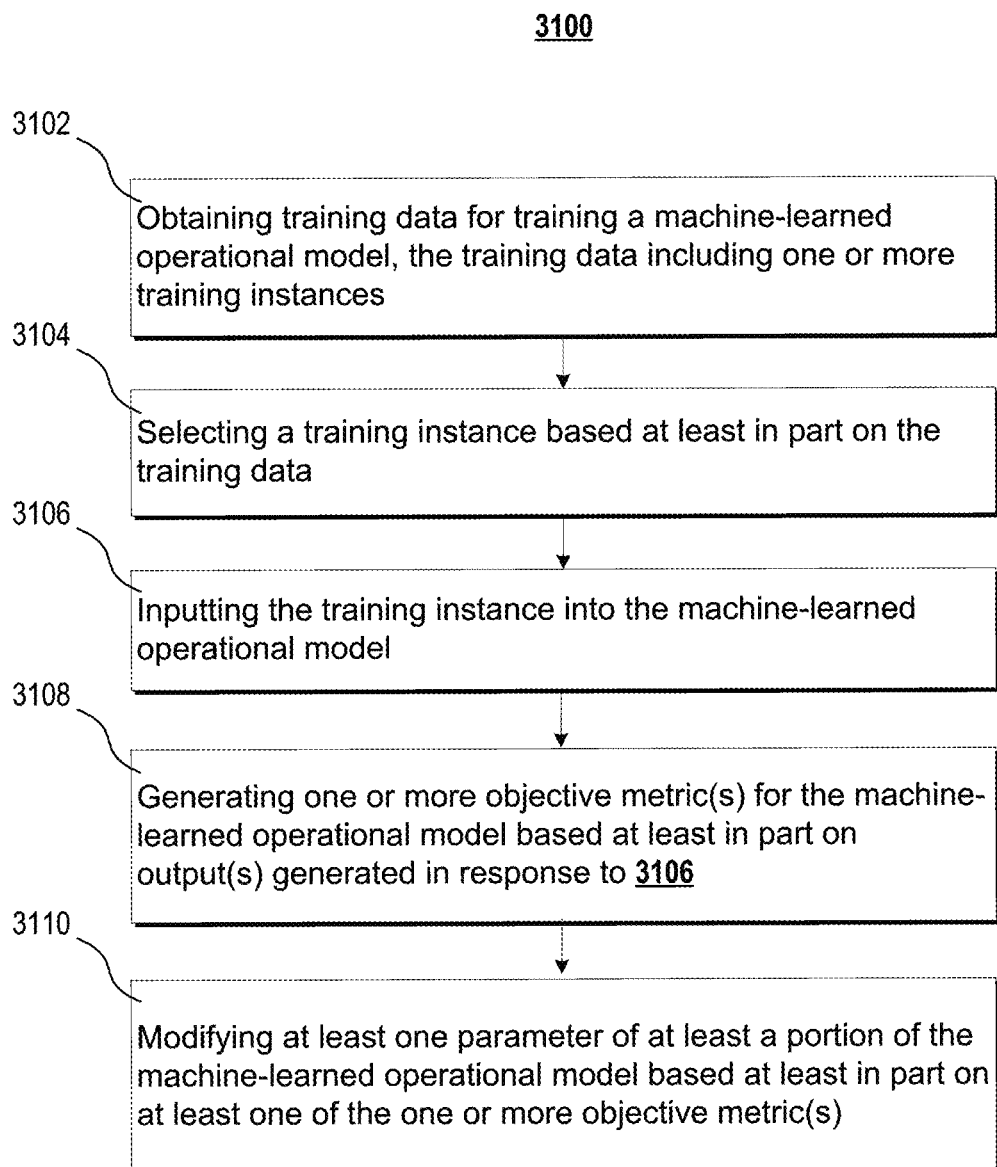
FIG. 31 is a flowchart of an example method for training and validating a machine-learned operational system, according to some implementations of the present disclosure.

FIG. 31 depicts a flowchart of an example method 3100 for training one or more machine-learned operational models according to some aspects of the present disclosure. For instance, an operational system can include a machine-learned operational model (e.g., one or more of localization system 230, perception system 240, planning system 250, or control system 260).

One or more portions of example method 3100 can be implemented by the computing systems described with reference to the other figures (e.g., autonomous platform 110, vehicle computing system 180, remote system 160, a system of FIGS. 1 to 32, etc.). Each respective portion of example method 3100 can be performed by any (or any combination) of one or more computing devices. Moreover, one or more portions of example method 3100 can be implemented on the hardware components of the devices described herein (e.g., as in FIGS. 1 to 32, etc.), for example, to validate one or more systems or models.

FIG. 31 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 31 is described with reference to elements/terms described with respect to other systems and figures for exemplary illustrated purposes and is not meant to be limiting. One or more portions of example method 3100 can be performed additionally, or alternatively, by other systems.

At 3102, example method 3100 can include obtaining training data for training a machine-learned operational model. The training data can include a plurality of training instances (e.g., including portions of constraint-labeled trajectories as described herein).

The training data can be collected using one or more autonomous platforms (e.g., autonomous platform 110) or the sensors thereof as the autonomous platform is within its environment. By way of example, the training data can be collected using one or more autonomous vehicles (e.g., autonomous platform 110, autonomous vehicle 310, autonomous vehicle 350, etc.) or sensors thereof as the vehicle operates along one or more travel ways. In some examples, the training data can be collected using other sensors, such as mobile-device-based sensors, ground-based sensors, aerial-based sensors, satellite-based sensors, or substantially any sensor interface configured for obtaining and/or recording measured data.

The training data can include a plurality of training sequences divided between multiple datasets (e.g., a training dataset, a validation dataset, or testing dataset). Each training sequence can include a plurality of pre-recorded perception datapoints, point clouds, images, etc. In some implementations, each sequence can include LIDAR point clouds (e.g., collected using LIDAR sensors of an autonomous platform), images (e.g., collected using mono or stereo imaging sensors, etc.), and the like. For instance, in some implementations, a plurality of images can be scaled for training and evaluation.

At 3104, example method 3100 can include selecting a training instance based at least in part on the training data.

At 3106, example method 3100 can include inputting the training instance into the machine-learned operational model.

At 3108, example method 3100 can include generating one or more loss metrics and/or one or more objectives for the machine-learned operational model based on outputs of at least a portion of the machine-learned operational model and labels associated with the training instances.

At 3110, example method 3100 can include modifying at least one parameter of at least a portion of the machine-learned operational model based at least in part on at least one of the loss metrics and/or at least one of the objectives. For example, a computing system can modify at least a portion of the machine-learned operational model based at least in part on at least one of the loss metrics and/or at least one of the objectives.

In some implementations, the machine-learned operational model can be trained in an end-to-end manner. For example, in some implementations, the machine-learned operational model can be fully differentiable.

After being updated, the operational model or the operational system including the operational model can be provided for validation (e.g., according to example implementations of example method 3100, etc.). In some implementations, a validation system can evaluate or validate the operational system. The validation system can trigger retraining, decommissioning, etc. of the operational system based on, for example, failure to satisfy a validation threshold in one or more areas.

Figure 32:
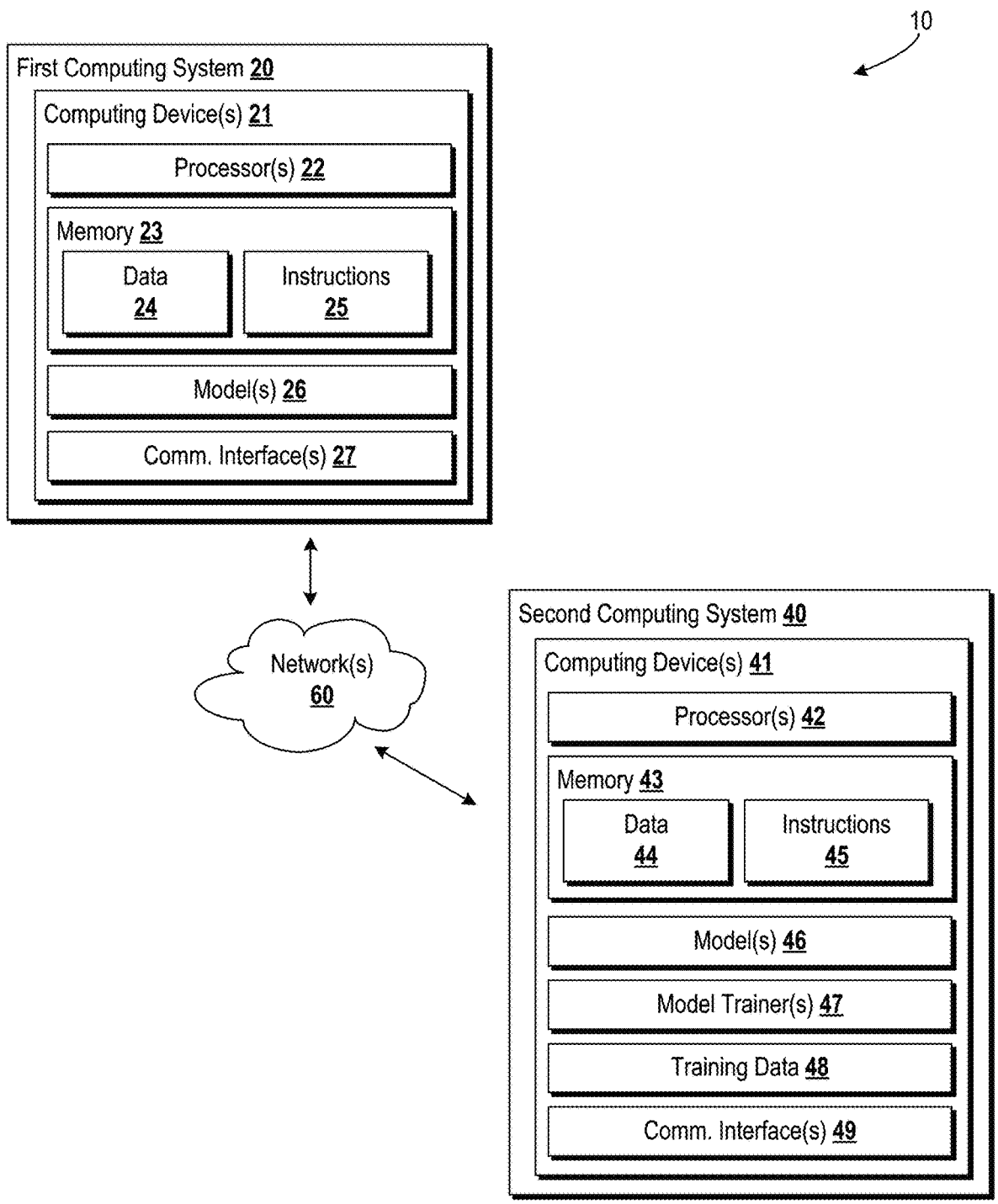
FIG. 32 is a block diagram of an example computing system, according to some implementations of the present disclosure.

FIG. 32 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein for validating one or more systems or operational systems (e.g., the remote system 160, the onboard computing system 180, the autonomy system 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing devices 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. Memory 23 can include one or more non-transitory computer-readable storage media, such as RAM, ROM, EEPROM, EPROM, one or more memory devices, flash memory devices, etc., and combinations thereof.

Memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory devices that are remote from the first computing system 20.

Memory 23 can store computer-readable instructions 25 that can be executed by the one or more processors 22. Instructions 25 can be software written in any suitable programming language or can be implemented in hardware. Additionally, or alternatively, instructions 25 can be executed in logically or virtually separate threads on the processors 22.

For example, the memory 23 can store instructions 25 that are executable by one or more processors (e.g., by the one or more processors 22, by one or more other processors, etc.) to perform (e.g., with the computing devices 21, the first computing system 20, or other systems having processors executing the instructions) any of the operations, functions, or methods/processes (or portions thereof) described herein. For example, operations can include implementing system validation (e.g., as described herein).

In some implementations, the first computing system 20 can store or include one or more models 26. In some implementations, the models 26 can be or can otherwise include one or more machine-learned models (e.g., a machine-learned operational system, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system 200, including any of: the localization system 230, the perception system 240, the planning system 250, or the control system 260.

In some implementations, the first computing system 20 can obtain the one or more models 26 using communication interface 27 to communicate with the second computing system 40 over the network 60. For instance, the first computing system 20 can store the models 26 (e.g., one or more machine-learned models) in memory 23. The first computing system 20 can then use or otherwise implement the models 26 (e.g., by the processors 22). By way of example, the first computing system 20 can implement the models 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

Memory 43 can store information that can be accessed by the one or more processors 42. For instance, the memory 43

(e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory devices that are remote from the second computing system 40.

Memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processors 42.

For example, memory 43 can store instructions 45 that are executable (e.g., by the one or more processors 42, by the one or more processors 22, by one or more other processors, etc.) to perform (e.g., with the computing devices 41, the second computing system 40, or other systems having processors for executing the instructions, such as computing devices 21 or the first computing system 20) any of the operations, functions, or methods/processes described herein. This can include, for example, the functionality of the autonomy system 200 (e.g., localization, perception, planning, control, etc.) or other functionality associated with an autonomous platform (e.g., remote assistance, mapping, fleet management, trip/service assignment and matching, etc.). This can also include, for example, validating a machined-learned operational system.

In some implementations, second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the models 26 at the first computing system 20, the second computing system 40 can include one or more models 46. As examples, the models 46 can be or can otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system 200.

In some implementations, the second computing system 40 or the first computing system 20 can train one or more machine-learned models of the models 26 or the models 46 through the use of one or more model trainers 47 and training data 48. The model trainer 47 can train any one of the models 26 or the models 46 using one or more training or learning algorithms. One example training technique is backwards propagation of errors. In some implementations, the model trainer 47 can perform supervised training techniques using labeled training data. In other implementations, the model trainer 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer 47 for training or testing the models 26 or the models 46. By way of example, the model trainer 47 can train one or more components of a machine-learned model for the autonomy system 200 through unsupervised training techniques using an objective function (e.g., costs, rewards, heuristics, constraints, etc.). In some implementations, the model trainer 47 can perform a number of generalization techniques to improve the generalization capability of the models being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train models 26. For example, in some implementations, the first computing system 20 can include a computing system onboard or otherwise associated with a real or simulated autonomous vehicle. In some implementations, models 26 can include perception or machine vision models configured for deployment onboard or in service of a real or simulated autonomous vehicle. In this manner, for instance, the second computing system 40 can provide a training pipeline for training models 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network 60). In some implementations, the communication interfaces 27, 49 can include, for example, one or more of a communications controller, receiver, transceiver, transmitter, port, conductors, software or hardware for communicating data.

The network 60 can be any type of network or combination of networks that allows for communication between devices. In some implementations, the network can include one or more of a local area network, wide area network, the Internet, secure network, cellular network, mesh network, peer-to-peer communication link or some combination thereof and can include any number of wired or wireless links. Communication over the network 60 can be accomplished, for instance, through a network interface using any type of protocol, protection scheme, encoding, format, packaging, etc.

FIG. 32 illustrates one example computing ecosystem 10 that can be used to implement the present disclosure. For example one or more systems or devices of ecosystem 10 can implement any one or more of the systems and components described in the preceding figures. Other systems can be used as well. For example, in some implementations, the first computing system 20 can include the model trainer 47 and the training data 48. In such implementations, the models 26, 46 can be both trained and used locally at the first computing system 20. As another example, in some implementations, the computing system 20 may not be connected to other computing systems. Additionally, components illustrated or discussed as being included in one of the computing systems 20 or 40 can instead be included in another one of the computing systems 20 or 40.

Computing tasks discussed herein as being performed at computing devices remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A computer-implemented method, comprising:
    (a) obtaining context data descriptive of an environment surrounding an autonomous vehicle, the context data based on map data and perception data;
    (b) generating, by a proposer and based on the context data:
        (i) a plurality of candidate trajectories, and
        (ii) a plurality of actor forecasts for a plurality of actors in the environment;
    (c) generating, by a ranker and based on the context data, the plurality of candidate trajectories, and the plurality of actor forecasts, a ranking of the plurality of candidate trajectories; and
    (d) controlling a motion of the autonomous vehicle based on a candidate trajectory selected based on the ranking of the plurality of candidate trajectories,
        wherein the proposer uses a first machine-learned model to generate the plurality of actor forecasts, and the ranker uses a second machine-learned model to generate the ranking, and wherein:
        the first machine-learned model and the second machine-learned model use a common backbone architecture;
        the first machine-learned model comprises a first decoder that processes outputs of the common backbone architecture;
        the second machine-learned model comprises a second decoder that processes outputs of the common backbone architecture and the plurality of candidate trajectories;
        the first machine-learned model uses a first backbone model characterized by the common backbone architecture;
        the second machine-learned model uses a second backbone model characterized by the common backbone architecture; and
        the first backbone model and the second backbone model are parameterized by different sets of learned weights.

2. The computer-implemented method of claim 1, wherein (i) comprises:
    generating a basis trajectory based on the context data; and
    sampling a plurality of values for one or more parameters of the basis trajectory to generate the plurality of candidate trajectories.

3. The computer-implemented method of claim 2, wherein the plurality of values are sampled based on at least one of the perception data or state data of the autonomous vehicle.

4. The computer-implemented method of claim 1, wherein (i) is at least partially performed in parallel with (ii).

5. The computer-implemented method of claim 1, wherein:
the common backbone architecture comprises a graph neural network architecture.

6. The computer-implemented method of claim 5, wherein:
the environment comprises a roadway with one or more lanes; and
the graph neural network architecture comprises an actor node associated with an actor of the plurality of actors and one or more goal nodes associated with one or more goal locations of the actor in the one or more lanes.

7. The computer-implemented method of claim 1, wherein (c) comprises:
generating the ranking of the plurality of candidate trajectories by processing a latent output of the common backbone architecture using the second machine-learned model.

8. The computer-implemented method of claim 1, wherein (b) comprises:
processing the context data to determine one or more probabilities of an actor in the environment performing one or more actor actions; and
sampling the plurality of candidate trajectories based on the one or more probabilities.

9. The computer-implemented method of claim 1, comprising:
controlling the motion of the autonomous vehicle by executing one or more control parameters of the selected candidate trajectory proposed in (b).

10. The computer-implemented method of claim 1, comprising:
determining, based on the context data, whether to apply an iterative optimization routine to at least one parameter of the selected candidate trajectory.

11. The computer-implemented method of claim 10, wherein the iterative optimization routine optimizes a steering control profile of the candidate trajectory.

12. The computer-implemented method of claim 1, wherein (c) comprises:
for a respective candidate trajectory of the plurality of candidate trajectories:
determining a cost associated with the respective candidate trajectory based on an action of the actor based on the autonomous vehicle executing the respective candidate trajectory.

13. The computer-implemented method of claim 12, wherein (c) comprises:
for the respective candidate trajectory of the plurality of candidate trajectories:
processing the context data to predict the action.

14. The computer-implemented method of claim 1, wherein:
(c) comprises processing, using the common backbone architecture, the plurality of candidate trajectories, wherein the ranker generates forecasts for the one or more actors in the environment that are conditioned on the plurality of candidate trajectories.

15. The computer-implemented method of claim 1, wherein:
the perception data comprises object tracking data.

16. The computer-implemented method of claim 1, wherein (b) (ii) comprises at least one of:
determining an actor goal;
determining an interaction between an actor and another portion of the environment; or
determining an actor trajectory.

17. An autonomous vehicle control system for controlling an autonomous vehicle, the autonomous vehicle control system comprising:
one or more processors; and
one or more non-transitory computer-readable media storing instructions that are executable by the one or more processors to cause the autonomous vehicle control system to perform operations, the operations comprising:
(a) obtaining context data descriptive of an environment surrounding an autonomous vehicle, the context data based on map data and perception data;
(b) generating, by a proposer and based on the context data:
(i) a plurality of candidate trajectories, and
(ii) a plurality of actor forecasts for a plurality of actors in the environment;
(c) generating, by a ranker and based on the context data, the plurality of candidate trajectories, and the plurality of actor forecasts, a ranking of the plurality of candidate trajectories; and
(d) controlling a motion of the autonomous vehicle based on a candidate trajectory selected based on the ranking of the plurality of candidate trajectories,
wherein the proposer uses a first machine-learned model to generate the plurality of actor forecasts, and the ranker uses a second machine-learned model to generate the ranking, and wherein:
the first machine-learned model and the second machine-learned model use a common backbone architecture;
the first machine-learned model comprises a first decoder that processes outputs of the common backbone architecture;
the second machine-learned model comprises a second decoder that processes outputs of the common backbone architecture and the plurality of candidate trajectories;
the first machine-learned model uses a first backbone model characterized by the common backbone architecture;
the second machine-learned model uses a second backbone model characterized by the common backbone architecture; and
the first backbone model and the second backbone model are parameterized by different sets of learned weights.

18. The autonomous vehicle control system of claim 17, the operations comprising:
determining, based on the context data, whether to apply an iterative optimization routine to at least one parameter of the selected candidate trajectory.

19. The autonomous vehicle control system of claim 18, wherein the iterative optimization routine optimizes a steering control profile of the candidate trajectory.

20. One or more non-transitory computer-readable media storing instructions that are executable by one or more processors to cause an autonomous vehicle control system to perform operations, the operations comprising:
(a) obtaining context data descriptive of an environment surrounding an autonomous vehicle, the context data based on map data and perception data;

(b) generating, by a proposer and based on the context data:
  (i) a plurality of candidate trajectories, and
  (ii) a plurality of actor forecasts for a plurality of actors in the environment;
(c) generating, by a ranker and based on the context data, the plurality of candidate trajectories, and the plurality of actor forecasts, a ranking of the plurality of candidate trajectories; and
(d) controlling a motion of the autonomous vehicle based on a candidate trajectory selected based on the ranking of the plurality of candidate trajectories,
  wherein the proposer uses a first machine-learned model to generate the plurality of actor forecasts, and the ranker uses a second machine-learned model to generate the ranking, and wherein:
  the first machine-learned model and the second machine-learned model use a common backbone architecture;
  the first machine-learned model comprises a first decoder that processes outputs of the common backbone architecture;
  the second machine-learned model comprises a second decoder that processes outputs of the common backbone architecture and the plurality of candidate trajectories;
  the first machine-learned model uses a first backbone model characterized by the common backbone architecture;
  the second machine-learned model uses a second backbone model characterized by the common backbone architecture; and
  the first backbone model and the second backbone model are parameterized by different sets of learned weights.

* * * * *